(12) United States Patent
Arakawa

(10) Patent No.: US 11,528,385 B2
(45) Date of Patent: Dec. 13, 2022

(54) INFORMATION PROCESSING APPARATUS AND METHOD FOR BLOCKCHAIN-BASED DOCUMENT MANAGEMENT

(71) Applicant: CANON KABUSHIKI KAISHA, Tokyo (JP)

(72) Inventor: Junya Arakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 17/146,945

(22) Filed: Jan. 12, 2021

(65) Prior Publication Data

US 2021/0227093 A1 Jul. 22, 2021

(30) Foreign Application Priority Data

Jan. 16, 2020 (JP) .............................. JP2020-005256

(51) Int. Cl.
- *H04N 1/387* (2006.01)
- *H04N 1/44* (2006.01)
- *G06F 21/60* (2013.01)
- *H04L 9/06* (2006.01)

(52) U.S. Cl.
CPC ......... *H04N 1/4486* (2013.01); *G06F 21/602* (2013.01); *G06F 21/608* (2013.01); *H04L 9/0643* (2013.01); *H04N 1/3876* (2013.01)

(58) Field of Classification Search
None
See application file for complete search history.

(56) References Cited

U.S. PATENT DOCUMENTS

| 11,301,429 B2* | 4/2022 | Bastide | G06F 21/6209 |
| 2018/0316502 A1* | 11/2018 | Nadeau | H04L 9/0637 |
| 2019/0354724 A1* | 11/2019 | Lowagie | H04L 9/3263 |
| 2020/0162236 A1* | 5/2020 | Miller | H04L 9/0643 |
| 2020/0162266 A1* | 5/2020 | Miller | H04L 9/3247 |
| 2020/0184095 A1* | 6/2020 | Ansari | G06F 21/64 |
| 2020/0311688 A1* | 10/2020 | Lipman | G06Q 10/1053 |
| 2020/0341702 A1* | 10/2020 | Kosaka | G06F 21/608 |

FOREIGN PATENT DOCUMENTS

| JP | 2019121946 A | * | 7/2019 |
| JP | 2019121946 A | | 7/2019 |

* cited by examiner

*Primary Examiner* — Dung D Tran

(74) *Attorney, Agent, or Firm* — Canon U.S.A., Inc., IP Division

(57) ABSTRACT

An information processing apparatus which cooperates with a management service for receiving a document via a network and storing the document and a blockchain service for managing information about the document on a block-by-block basis, defining an association with a previous and/or subsequent block for each block, and then managing a plurality of blocks with a plurality of nodes includes an editing unit configured to perform editing processing on a source document to generate a new document, a transmission unit configured to transmit the generated document to the management service, and a cooperation unit configured to register information indicating that the source document was edited with the blockchain service, wherein, in response to the editing unit being confirmed to be a service trusted by the blockchain service, the information indicating that the source document was edited is registered with the blockchain service.

11 Claims, 29 Drawing Sheets

```
Web Browser                                          _ ▭ ✕
[FILE] [EDIT] [VIEW] [FAVORITES] [TOOL] [HELP]
[ADDRESS] [http://conon.copier.com/document_registration]

■ DOCUMENT REGISTRATION
  Please select a stored document to register.
  [ Document A   2019/05/20 12:00:00    ▼ ]

Please specify the path of a document management
  apparatus serving as a storage destination.
  [ Document/                                      ]

[✓] Register a document with the blockchain.   [REGISTER]
```

```
Web Browser                                          _ ▭ ✕
[FILE] [EDIT] [VIEW] [FAVORITES] [TOOL] [HELP]
[ADDRESS] [http://conon.copier.com/document_registration]

■ DOCUMENT REGISTRATION
  Please select a stored document to register.
  [ Document A   2019/05/20 12:00:00    ▼ ]

Please specify the path of a document management
  apparatus serving as a storage destination.
  [ Document/                                      ]

[REGISTER]
```

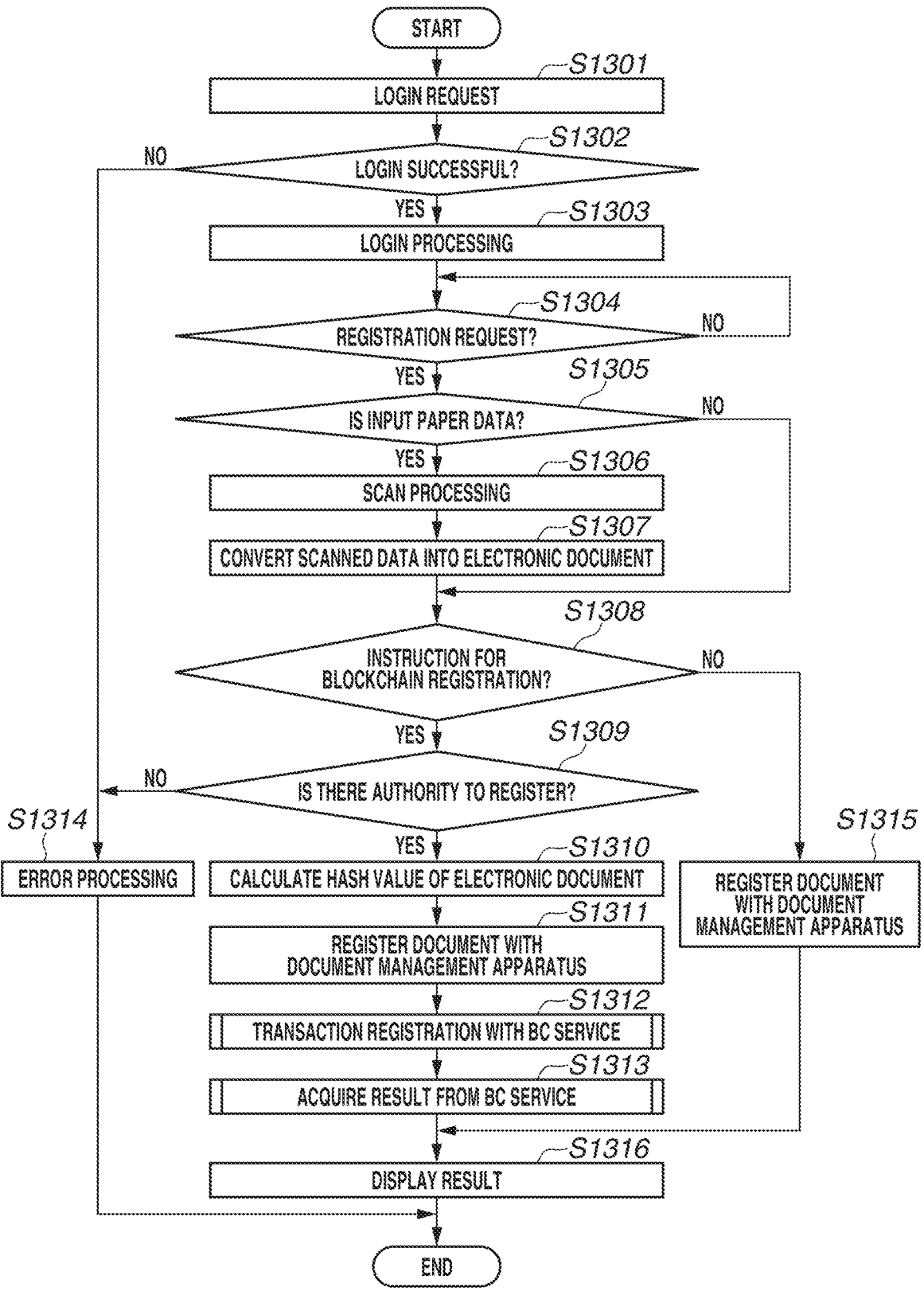

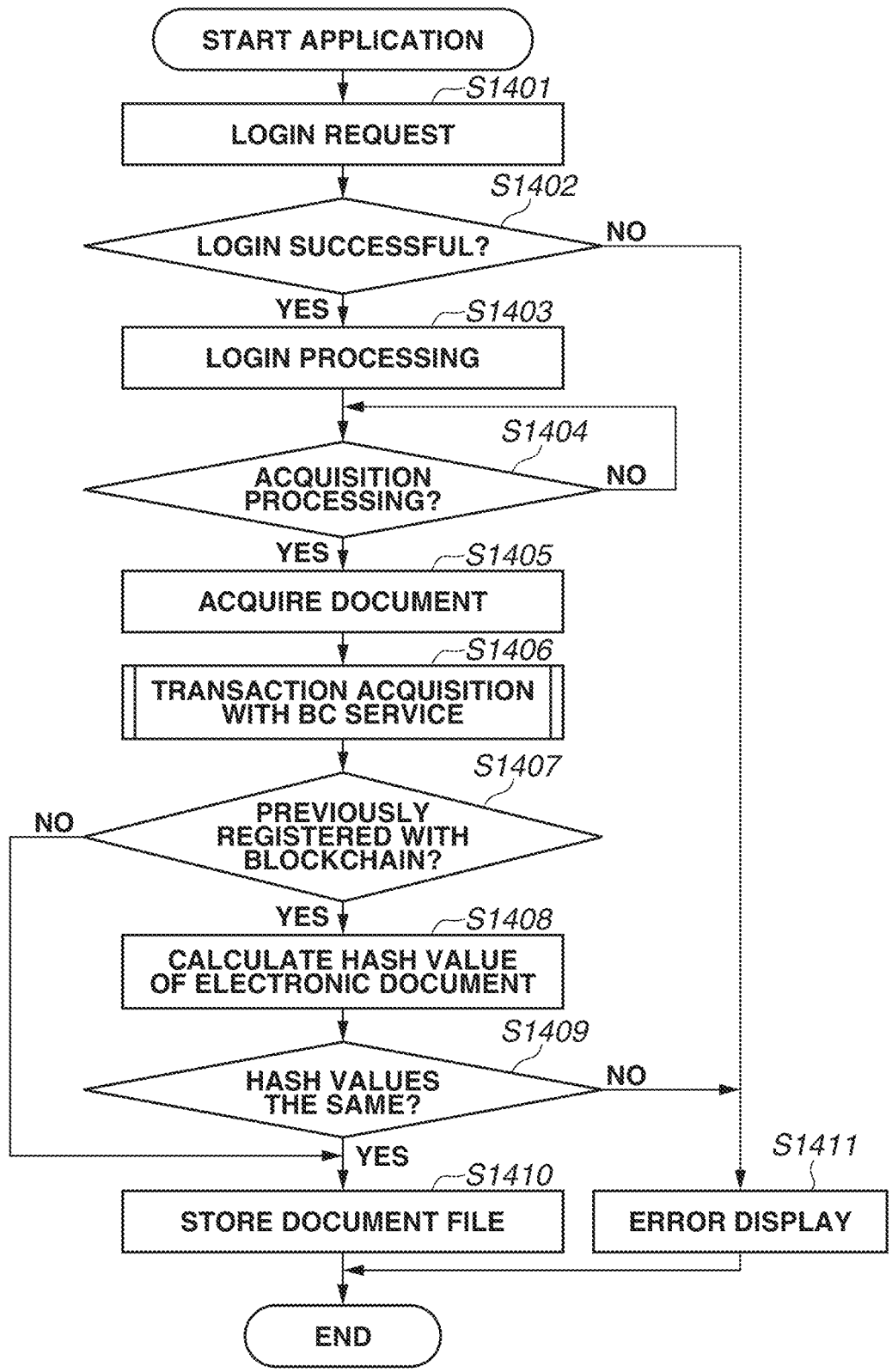

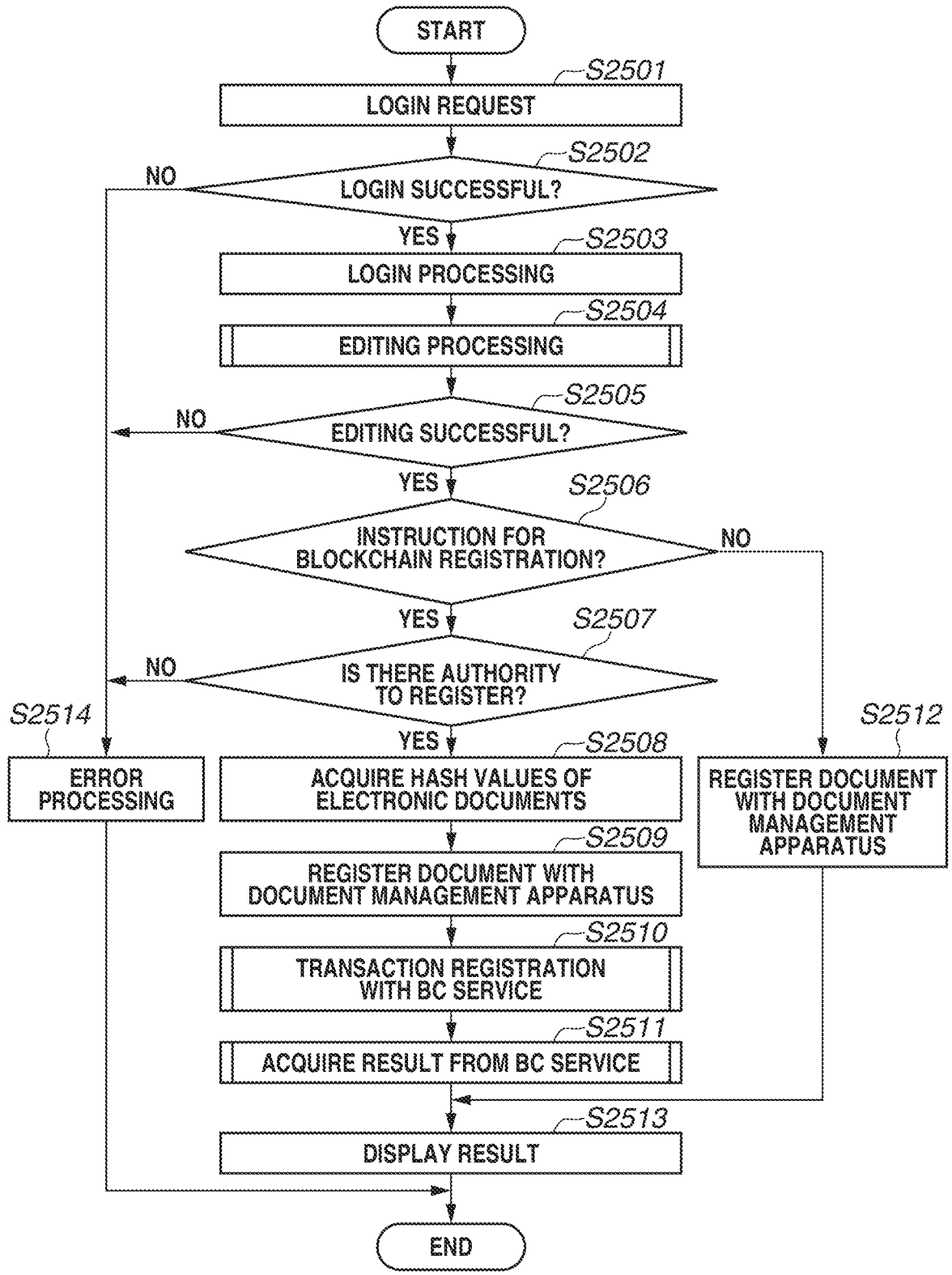

INFORMATION PROCESSING APPARATUS AND METHOD FOR BLOCKCHAIN-BASED DOCUMENT MANAGEMENT

BACKGROUND

Field

Aspects of the present disclosure generally relate to an information processing apparatus, a control method, and a storage medium.

Description of the Related Art

Countries and companies retain documents that are important such as official documents and management documents. Tampering or falsification of such documents has been becoming a serious issue, so that a mechanism for disabling tampering or falsification of a document or detecting such tampering or falsification has become required. Therefore, usage of a document management apparatus is known, including a file server, which has the function of computerizing a document file to be stored and recording an operation which was performed on the stored document file (information indicating when who performed what operation).

Moreover, in addition to storing a document in such a document management apparatus so as to enable verifying that the stored document file is in a correct state, it is generally known to register information about the document file with a blockchain. Separating management of a document file and management of information representing the document file from each other enables managing a correct state of the document file. Additionally, there is also a technique of, in a case where a document file has been edited, registering, with a blockchain, information about the edited document file together with association information indicating an association between the edited document file and the source document file previously registered with the blockchain, such as that discussed in Japanese Patent Application Laid-Open No. 2019-121946).

In the case of performing rigorous management of document files, it has to be ensured that a document file obtained after editing is really the one obtained by editing a previously registered source document. The technique discussed in Japanese Patent Application Laid-Open No. 2019-121946 is able to track an association between documents with a blockchain by registering hash values of document files obtained before and after editing with the blockchain, but is not able to ensure that unauthorized or fraudulent editing has not been performed in the process of editing.

SUMMARY

According to an aspect of the present disclosure, an information processing apparatus which cooperates with a management service for receiving a document via a network and storing the document and a blockchain service for managing information about the document on a block-by-block basis, defining an association with a previous and/or subsequent block for each block, and then managing a plurality of blocks with a plurality of nodes, the information processing apparatus includes at least one processor and at least one memory coupled to the at least one processor and having instructions stored thereon that, when executed by the at least one processor, cooperate to act as an editing unit configured to perform editing processing on a source document to generate a new document, a transmission unit configured to transmit the generated document to the management service, and a cooperation unit configured to register information indicating that the source document was edited with the blockchain service, wherein, in response to the editing unit being confirmed to be a service trusted by the blockchain service, the information indicating that the source document was edited is registered with the blockchain service.

Further features of the present disclosure will become apparent from the following description of exemplary embodiments with reference to the attached drawings.

BRIEF DESCRIPTION OF THE DRAWINGS

FIGS. 10A, 10B, 10C, and 10D are diagrams illustrating examples of document registration screens for an application A.

FIG. 13 is a flowchart illustrating processing for registering information about a document with the blockchain apparatus.

FIG. 14 is a flowchart illustrating processing for acquiring an electronic document from the document management apparatus and storing the acquired electronic document.

FIG. 25 is a flowchart illustrating the entirety of processing for editing an electronic document.

DESCRIPTION OF THE EMBODIMENTS

Aspects of the present disclosure are generally directed to causing editing processing on a document with document information thereabout previously registered with a blockchain to be performed by a trusted editing module.

Figure 1:
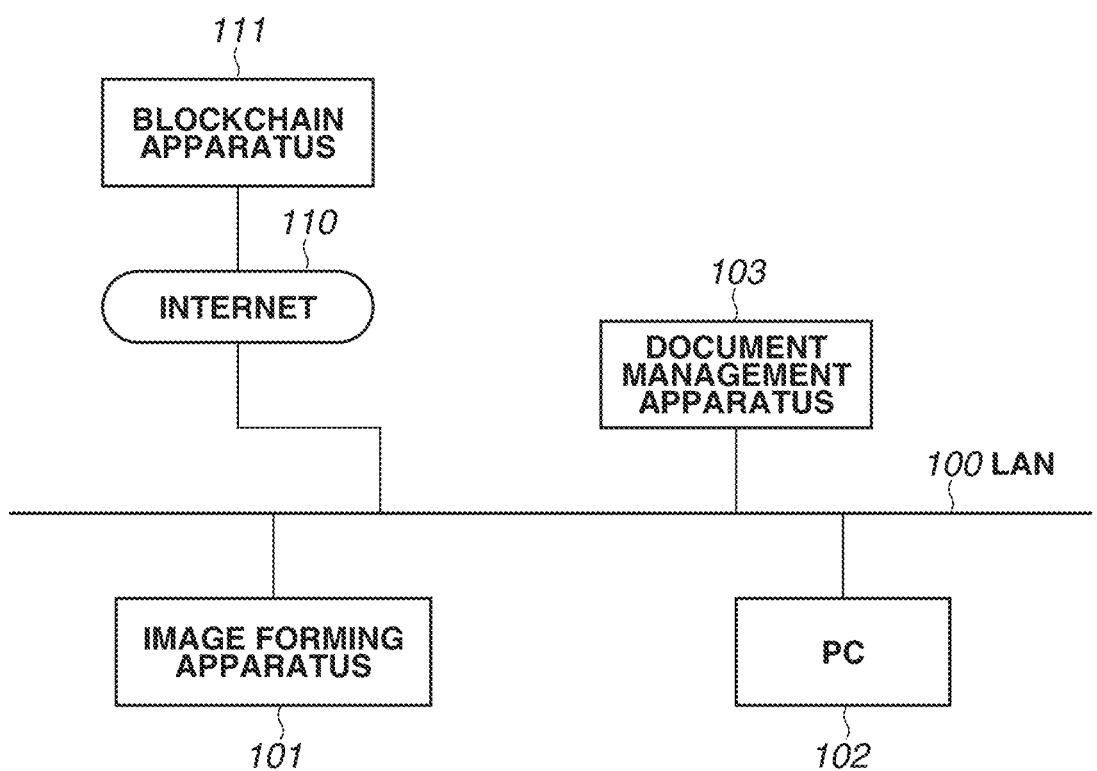
FIG. 1 is a diagram illustrating a configuration of a system.

Various exemplary embodiments, features, and aspects of the disclosure will be described in detail below with reference to the drawings. FIG. 1 is an overall view of a system associated with an image forming apparatus 101. The image forming apparatus 101, a personal computer (PC) 102, and a document management apparatus 103 are located in an intranet while being connected to a local area network (LAN) 100, and perform communication with a blockchain apparatus 111 via the Internet 110. The PC 102 is used to manage the image forming apparatus 101 with use of a web browser and to perform printing with the image forming apparatus 101 with use of a printer driver.

The blockchain apparatus 111 is a blockchain service which is used to insure the validity of each electronic document by collectively managing values uniquely indicating electronic documents generated by the image forming apparatus 101 or the PC 102 on a block-by-block basis. The document management apparatus 103 is a document management service which stores an electronic document generated by the image forming apparatus 101 or the PC 102, which is an information processing apparatus.

The image forming apparatus 101 cooperates with services of the blockchain apparatus 111 and the document management apparatus 103 and thus provides a solution which is capable of storing a generated and/or edited document and then ensuring that the stored document has not been tampered or falsified. Furthermore, while each of the blockchain apparatus 111 and the document management apparatus 103 is illustrated as a single apparatus, a service which is configured with a plurality of blockchain apparatuses 111 and a plurality of document management apparatuses 103 is supposed. Furthermore, the document management apparatus 103 can be a single apparatus.

Figure 2:
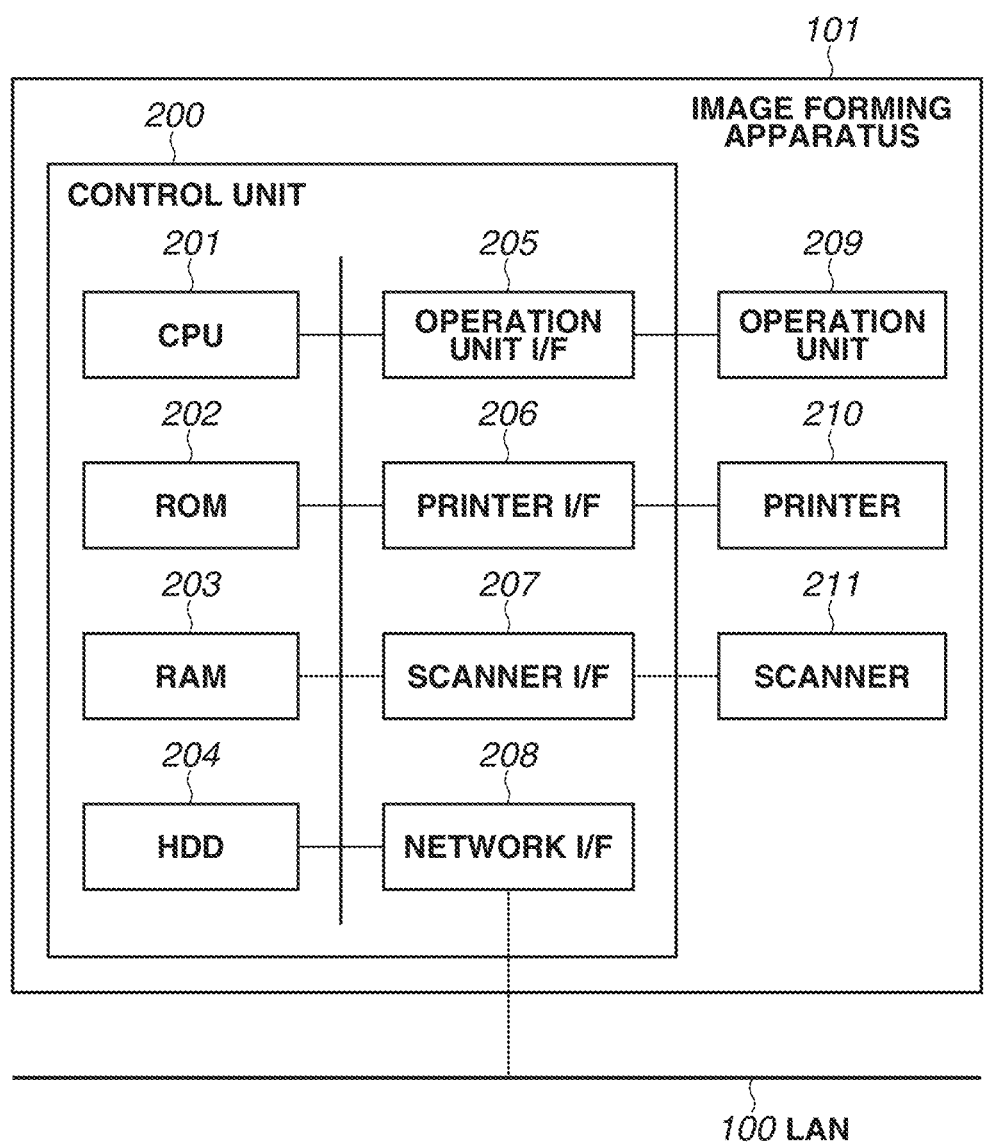
FIG. 2 is a diagram illustrating a hardware configuration of an image forming apparatus.

FIG. 2 is a block diagram illustrating a hardware configuration of the image forming apparatus 101. A control unit 200, which includes a central processing unit (CPU) 201, controls operations of the entire image forming apparatus 101. The CPU 201 reads out control programs stored in a read-only memory (ROM) 202 and performs various control operations, such as read control and transmission control, based on the control programs. A random access memory (RAM) 203 is used as a temporary storage region, such as a main memory and a work area, for the CPU 201. A hard disk drive (HDD) 204 stores image data and various programs or various pieces of data described below. An operation unit interface (I/F) 205 interconnects an operation unit 209 and the control unit 200.

A printer I/F 206 interconnects a printer 210 and the control unit 200. Image data to be printed by the printer 210 is transferred from the control unit 200 via the printer I/F 206 and is then printed on a recording medium by the printer 210. A scanner I/F 207 interconnects a scanner 211 and the control unit 200. The scanner 211 reads an image on an original to generate image data, and then inputs the generated image data to the control unit 200 via the scanner I/F 207. A network I/F 208 connects the control unit 200 (i.e., the image forming apparatus 101) to the LAN 100. The network I/F 208 transmits image data or information to an external apparatus on the LAN 100 and receives various pieces of information from an external apparatus on the LAN 100.

Figure 3:
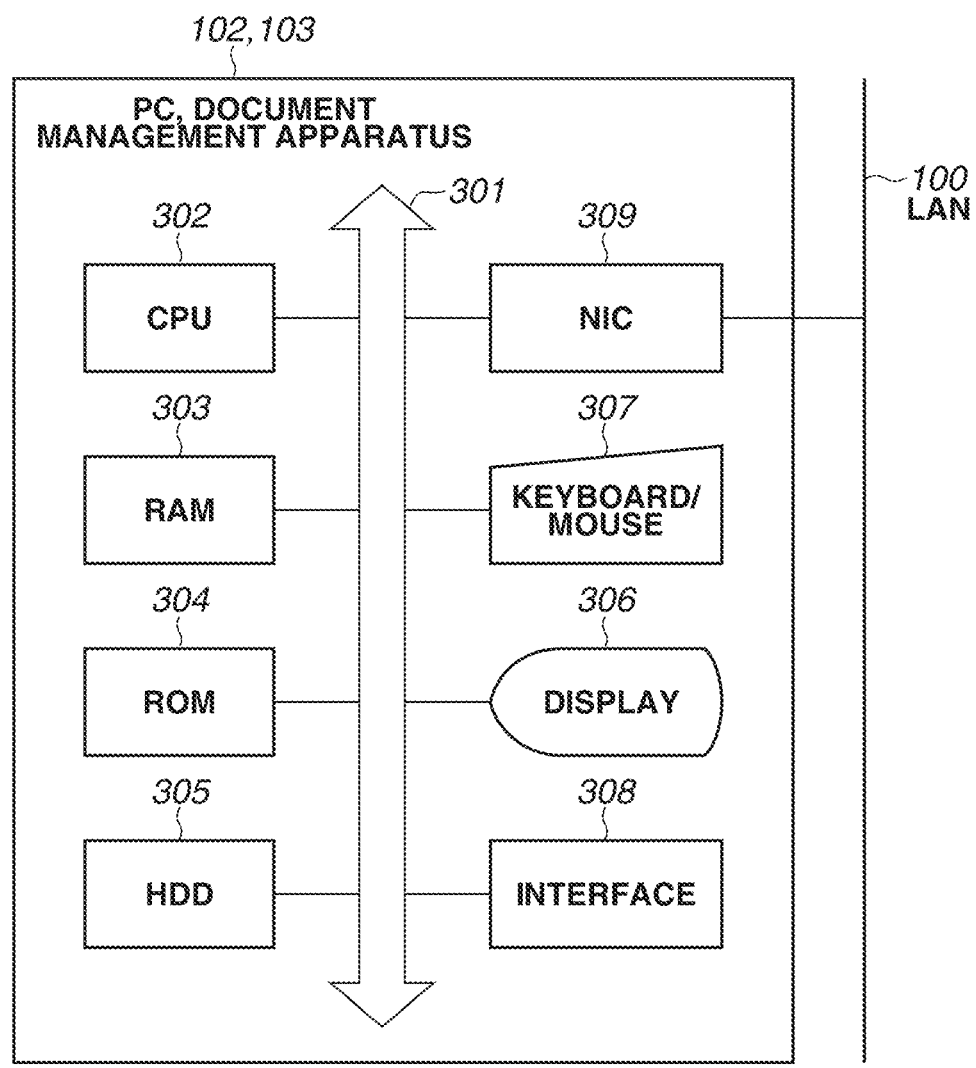
FIG. 3 is a diagram illustrating a hardware configuration of each of a personal computer (PC) and a document management apparatus.

FIG. 3 is a block diagram illustrating a hardware configuration of each of the PC 102 and the document management apparatus 103. A CPU 302 controls the entire PC 102 or document management apparatus 103. The CPU 302 executes, for example, an application program and an operating system (OS) stored in an HDD 305 and performs control to temporarily store, for example, information and files required for execution of the program in a RAM 303. A ROM 304, which is a storage unit, stores therein various pieces of data such as a basic input-output (I/O) program. The RAM 303, which is a temporary storage unit, serves as, for example, a main memory and a work area for the CPU 302. The HDD 305, which is an external storage unit, serves as a large-capacity memory and stores, for example, application programs such as an office application and a web browser, an OS, and relevant programs.

A display 306, which is a display unit, displays, for example, a command input via a keyboard/mouse 307, which is an instruction input unit. An interface 308, which is an external apparatus interface (I/F), is used to connect to a printer, a Universal Serial Bus (USB) device, or a peripheral device. A system bus 301 is used for data to flow between the respective units of the PC 102 or the document management apparatus 103. A network interface card (NIC) 309 performs exchange of data with an external apparatus via the LAN 100. Furthermore, the above-mentioned configuration of each computer is merely an example, and is in no way limited to the configuration example illustrated in FIG. 3.

For example, the storage location of data or programs can be changed between, for example, the ROM 304, the RAM 303, and the HDD 305 depending on characteristics thereof. Unless otherwise specifically described in the present exemplary embodiment, respective processing operations are assumed to be implemented by the CPU 302 loading programs stored in, for example, the ROM 304 onto, for example, the RAM 303 and executing the programs.

Figure 4:
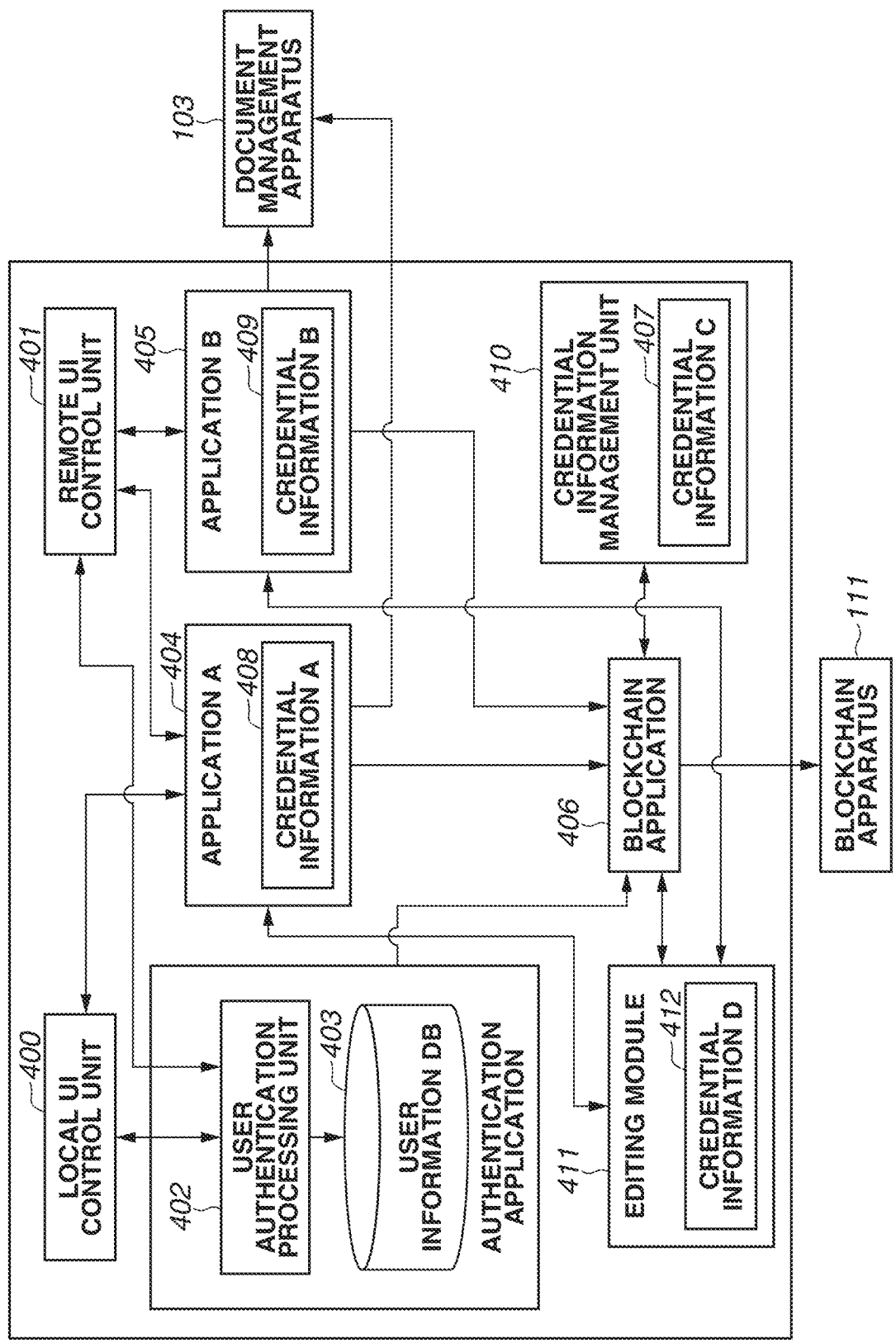
FIG. 4 is a diagram illustrating a software configuration of the image forming apparatus.

FIG. 4 is a block diagram illustrating a software configuration related to the present exemplary embodiment in the image forming apparatus 101. Unless otherwise described, each processing unit is a function which is implemented by the CPU 202 executing a control program stored in the ROM 202.

Figure 9A:
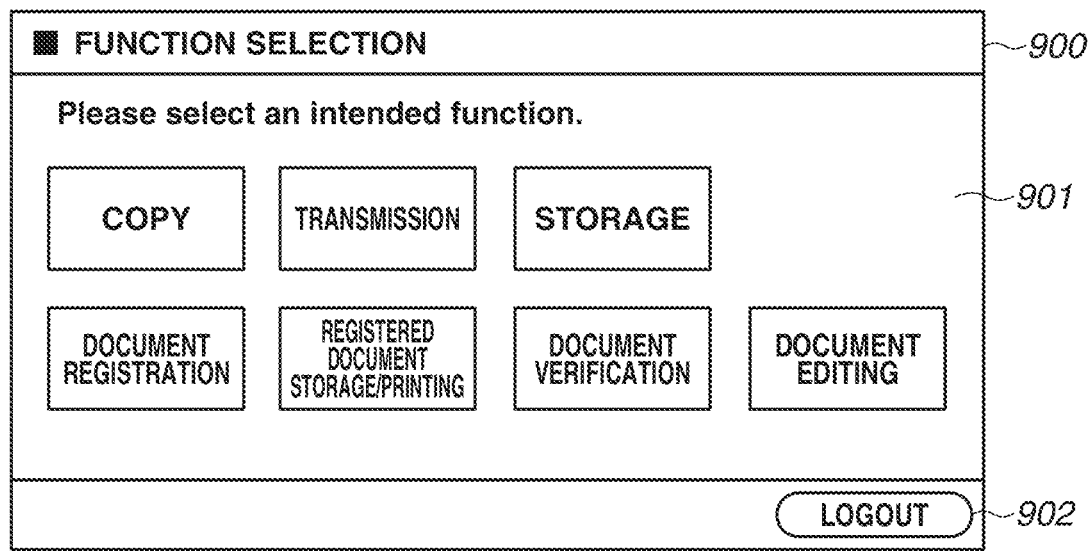
FIGS. 9A and 9B are diagrams illustrating examples of function selection screens.

A local user interface (UI) control unit 400 provides the function of controlling the operation unit 209 via the operation unit I/F 205. The local UI control unit 400 communicates the content of an operation performed by the user via the operation unit 209 to a user authentication processing unit 402 or an application A 404. The local UI control unit 400 displays a function selection screen 900 on the operation unit 209. FIG. 9A illustrates an example of the function selection screen 900. The local UI control unit 400 performs control to display a screen on the operation unit 209 upon receiving a screen display request from the user authentication processing unit 402 or the application A 404. Unless otherwise described, the user authentication processing unit 402 or the application A 404 displays a screen on the operation unit 209 via the local UI control unit 400.

Figure 9B:
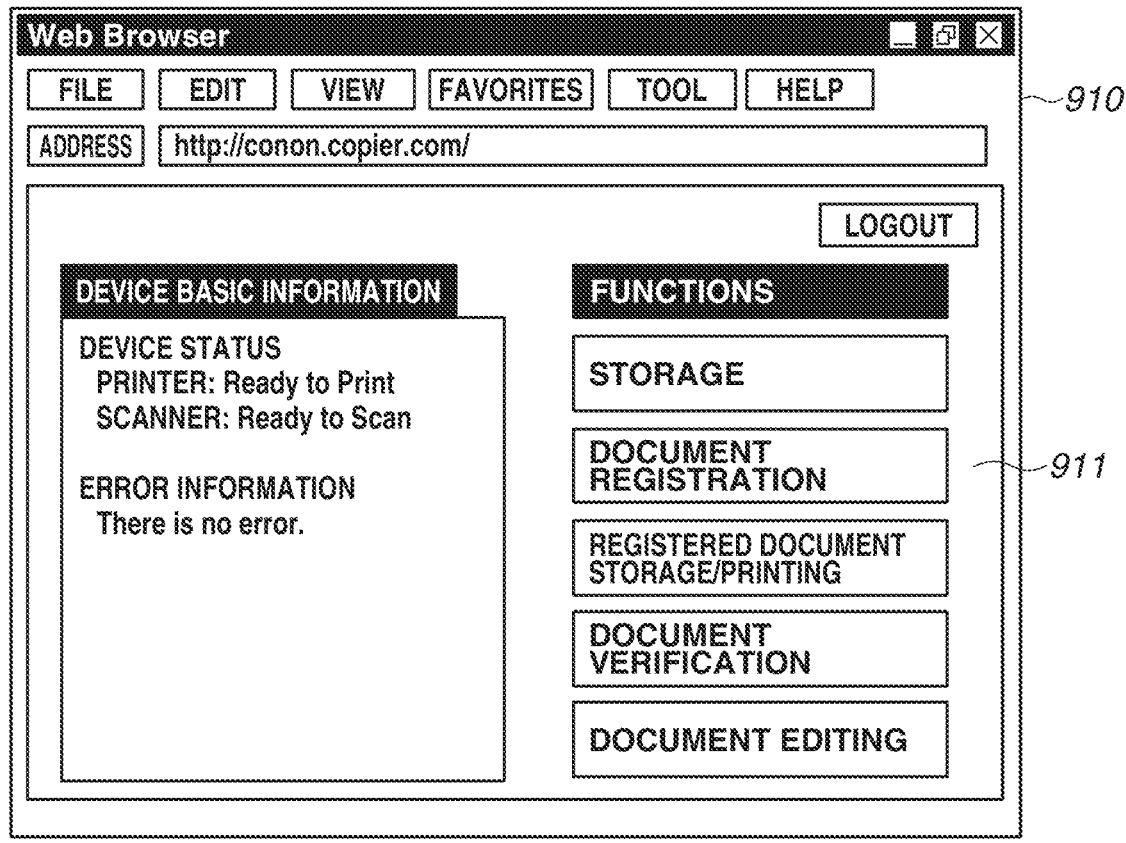

A remote UI control unit 401 provides a web page to a web browser on the PC 102 via the network I/F 208. The remote UI control unit 401 communicates the content of an operation performed by the user on the web browser to the user authentication processing unit 402, the application A 404, or an application B 405. The remote UI control unit 401 displays a function selection screen 910 in a web browser on the PC 102. FIG. 9B illustrates an example of the function selection screen 910. The remote UI control unit 401 performs control to display a web page in the web browser upon receiving a request from the user authentication processing unit 402, the application A 404, or the application B 405. Unless otherwise described, the user authentication processing unit 402, the application A 404, or the application B 405 causes the web browser to display a web page via the remote UI control unit 401.

Figure 7A:
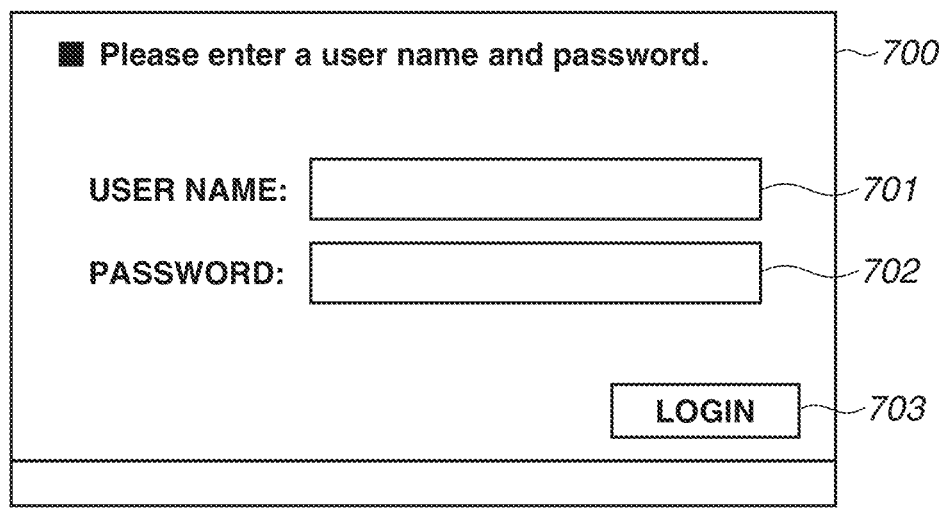
FIGS. 7A and 7B are diagrams illustrating examples of authentication screens.

The user authentication processing unit 402 provides the function of authenticating a user who uses the image forming apparatus 101. Therefore, the user authentication processing unit 402 displays an authentication screen 700, an example of which is illustrated in FIG. 7A, on the operation unit 209. The user authentication processing unit 402 performs user authentication by receiving, via the authentication screen 700, authentication information including a user name and a password input by the user and then comparing the received authentication information with user information stored in a user information database (DB) 403.

The user information DB 403 provides the function of storing user information which is information about users who use the image forming apparatus 101. The user information DB 403 is created in the HDD 204, and pieces of information constituting the user information DB 403 are stored in the HDD 204. Examples of pieces of information which are stored in the user information DB 403 are shown in Table 1 and Table 2.

TABLE 1

| User Information Table | | |
| --- | --- | --- |
| User name | Password | Role |
| User A | **** | Administrator |
| User B | **** | General User |
| Guest | — | Guest User |

The user information table shown in Table 1 is configured with columns "user name", "password", and "role". The column "user name" indicates a name for uniquely identifying a user. The column "password" indicates a password which is used for user authentication, and is allowed to be set to an optional value for each user. The column "role" indicates the name of a role which is an authority to be conferred to each user of the image forming apparatus 101, and, in the present exemplary embodiment, includes three roles, i.e., "administrator", "general user", and "guest user". The role "administrator" is a role allocated to an administrator user of the image forming apparatus 101, and the role "general user" is a role allocated to a general user who uses the image forming apparatus 101. The role "guest user" is a role allocated to a user with respect to whom functions allowed to be used are intended to be restricted. It is possible to impose restrictions on the use of functions of the image forming apparatus 101 for each role according to the value of the column "role" of the logged-in user.

TABLE 2

| Role Information Table | | | | |
| --- | --- | --- | --- | --- |
| Role | Copy | Transmission | Storage | BC registration |
| Administrator | Allowed | Allowed | Allowed | Allowed |
| General User | Allowed | Inhibited | Allowed | Allowed |
| Guest User | Allowed | Inhibited | Inhibited | Inhibited |

| Role Information Table | | |
| --- | --- | --- |
| Role | BC storage/printing | BC verification |
| Administrator | Allowed | Allowed |
| General User | Allowed | Allowed |
| Guest User | Inhibited | Allowed |

| Role Information Table | | |
| --- | --- | --- |
| | Document editing | |
| Role | BC registration present | BD registration absent |
| Administrator | Allowed | Allowed |
| General User | Inhibited | Allowed |
| Guest User | Inhibited | Inhibited |

The role information table shown in Table 2 is configured with columns "role", "copy", "transmission", "storage", "BC registration", "BC storage/printing", "BC verification", "document editing—BC registration present", and "document editing—BC registration absent". The column "role" is the name of a role which is an authority to be conferred to the user. The columns "copy", "transmission", "storage", "BC registration", "BC storage/printing", "BC verification", "document editing—BC registration present", and "document editing—BC registration absent" represent the respective functions included in the image forming apparatus 101. Values of the respective columns in the role information table represent whether the use of each function is allowed or inhibited with respect to each role.

The columns "copy", "transmission", and "storage" represent authorities regarding a copy function, a function for transmitting a scanned document to the PC 102, and a function for storing a scanned electronic document in the HDD 204, respectively. The column "BC registration" represents an authority for the function of registering information about a document with the blockchain apparatus 111. The column "BC storage/printing" represents an authority for the function of storing, in the image forming apparatus 101, or printing a document stored in the document management apparatus 103 associated with document information registered with the blockchain apparatus 111. The column "BC verification" represents an authority for the function of verifying whether the document is a valid document based on document information registered with the blockchain apparatus 111.

The columns "document editing—BC registration present" and "document editing—BC registration absent" represent authorities for a function used in common up to a portion for editing, in the image forming apparatus 101, a document stored in the document management apparatus 103 associated with document information registered with the blockchain apparatus 111. Then, while the column "document editing—BC registration present" represents an authority which allows document information about the edited document to be registered with the blockchain apparatus 111, the column "document editing—BC registration absent" represents an authority which does not allow document information about the edited document to be registered with the blockchain apparatus 111. Applications included in the image forming apparatus 101 perform restrictions on the respective functions according to the authority of a role in the role information table corresponding to the role of the logged-in user.

Application A 404 provides a function of, for example, converting a scanned document into an electronic document and then registering information about the document with the blockchain apparatus 111 via a blockchain application 406 and registering the document with the document management apparatus 103. Application A 404 performs transmission of scanned data to an external apparatus by controlling the scanner 211 via the scanner I/F 207 and transmitting data to the LAN 100 via the network I/F 208.

Figure 10A:
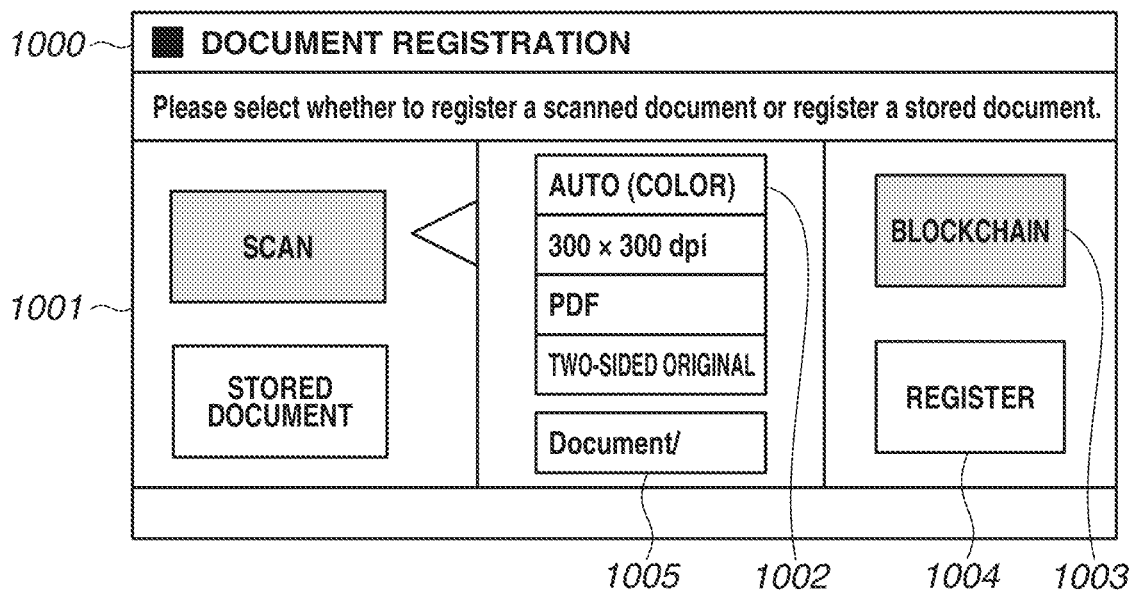
Figure 11A:
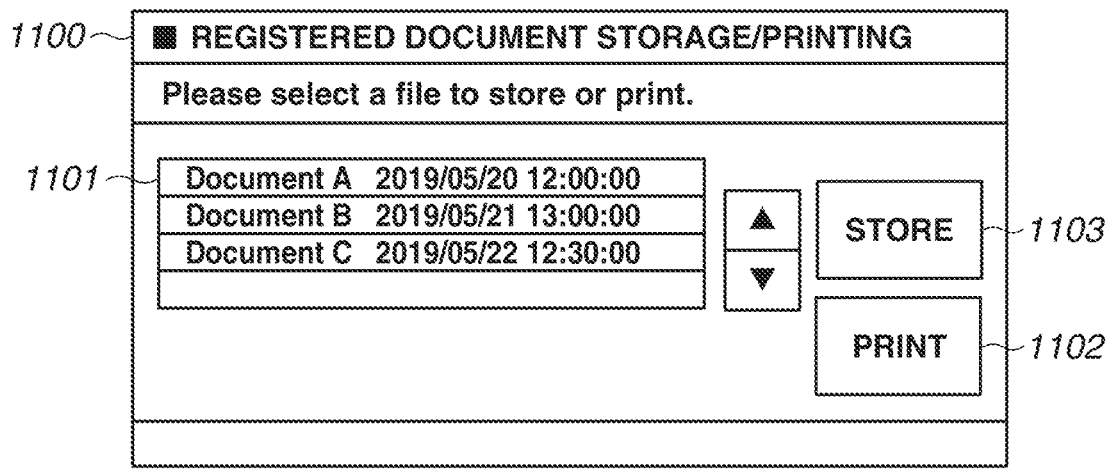
FIGS. 11A and 11B are diagrams illustrating examples of registered document storage/printing screens for the application A.
Figure 11B:
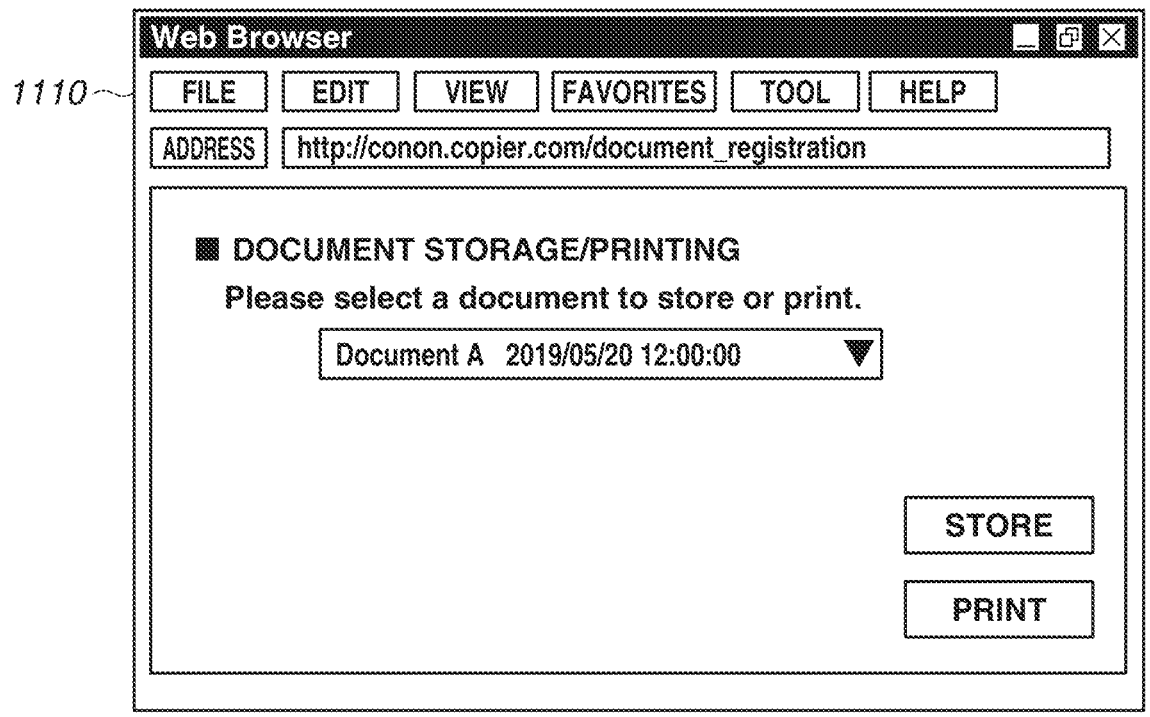
Figure 12A:
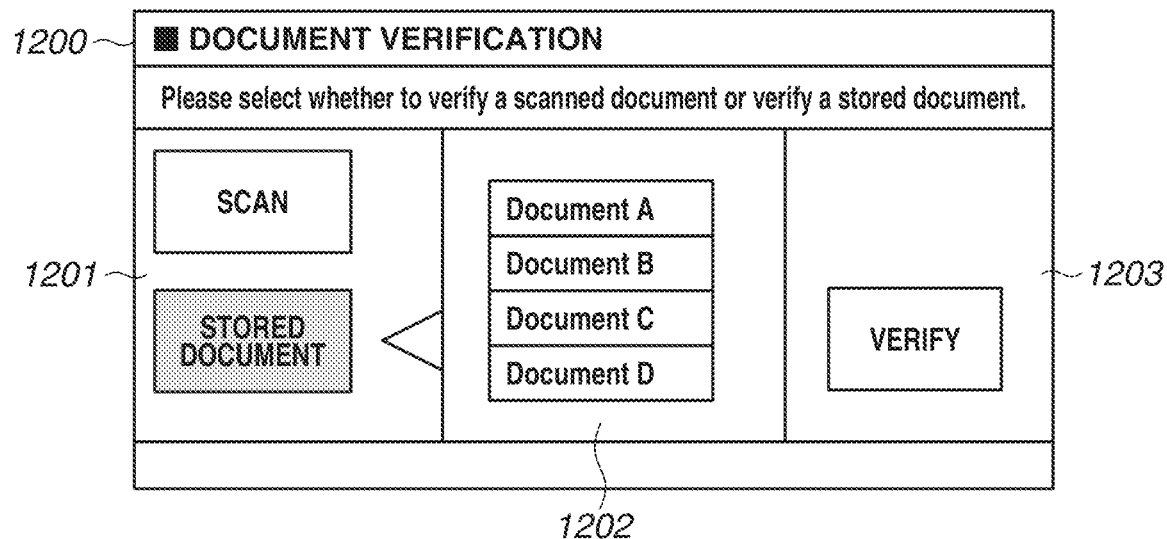
FIGS. 12A and 12B are diagrams illustrating examples of registered document verification screens for the application A.
Figure 12B:
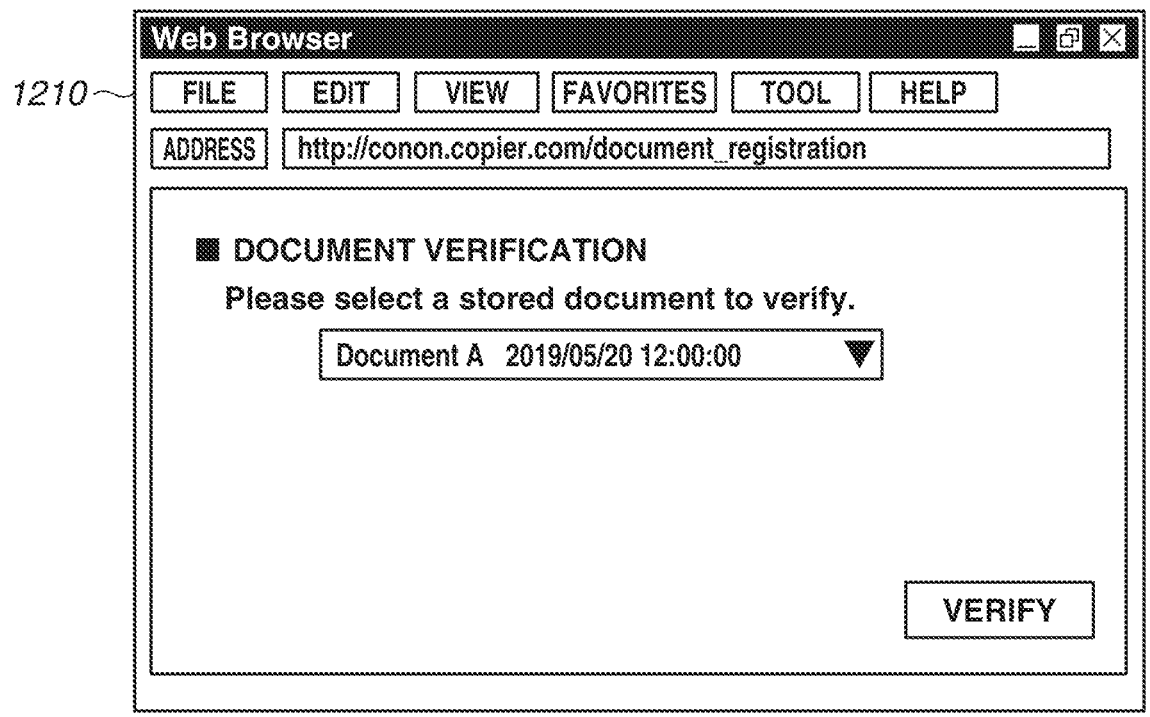
Figure 18A:
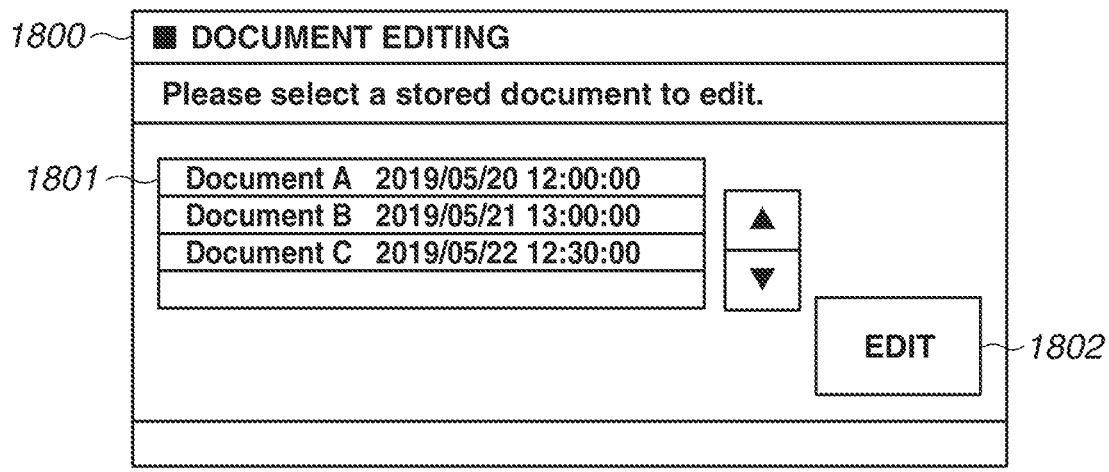
FIGS. 18A and 18B are diagrams illustrating examples of document selection screens for a document editing function of the application A.
Figure 18B:
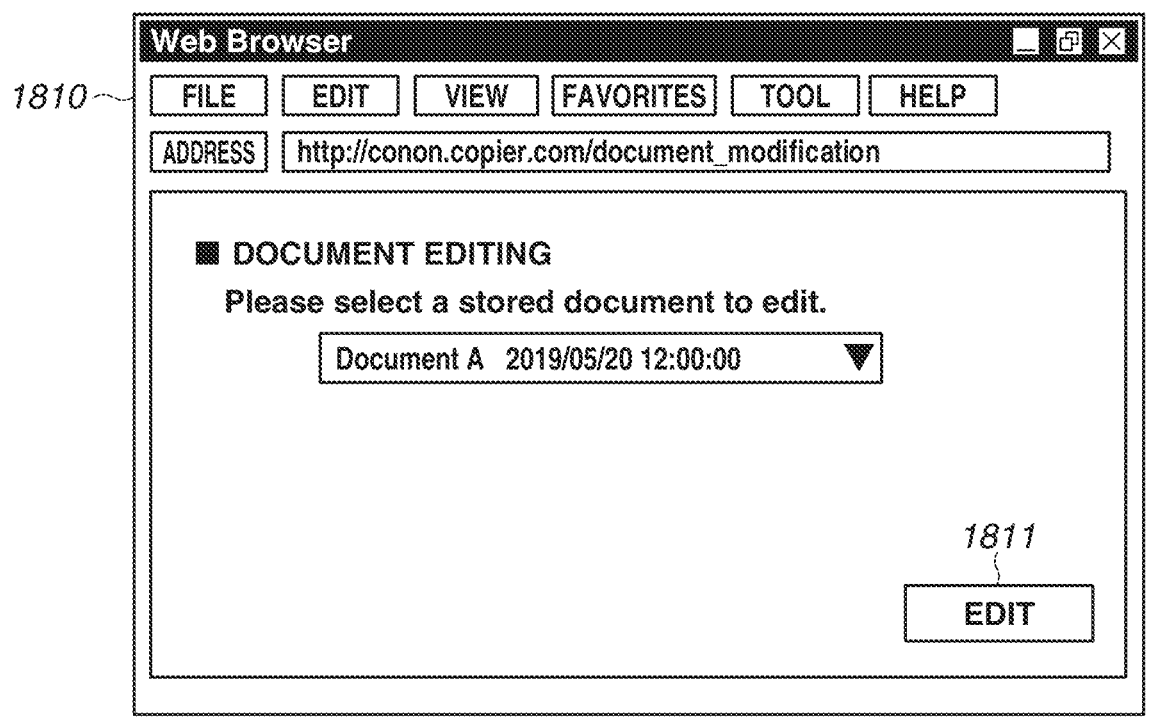

Application A 404 receives an input to a screen displayed on the operation unit 209 via the local UI control unit 400, and performs processing according to the received input. Application A 404 displays a registration screen 1000, a registered document storage/printing screen 1100, a document verification screen 1200, and an editing screen 1800 on the operation unit 209. An example of the registration screen 1000 is illustrated in FIG. 10A, an example of the registered document storage/printing screen 1100 is illustrated in FIG. 11A, an example of the document verification screen 1200 is illustrated in FIG. 12A, and an example of the editing screen 1800 is illustrated in FIG. 18A. Moreover, application A 404 receives an input from a web browser on the PC 102 via the remote UI control unit 401, and performs processing according to the received input. Application A 404 displays a registration screen 1020, a registered document storage/printing screen 1110, a document verification screen 1210, and an editing screen 1810 in the web browser on the PC 102. An example of the registration screen 1020 is illustrated in FIG. 10C, an example of the registered document storage/printing screen 1110 is illustrated in FIG. 11B, an example of the document verification screen 1210 is illustrated in FIG. 12B, and an example of the editing screen 1810 is illustrated in FIG. 18B.

Application B 405 provides a function of, for example, converting a scanned document into an electronic document and then registering information about the document with the blockchain apparatus 111 via the blockchain application 406 and registering the document with the document management apparatus 103, as with application A 404. While application A 404 treats inputs and outputs from both a local UI and a remote UI via the local UI control unit 400 and the remote UI control unit 401, application B 405 treats inputs and outputs from only a remote UI via the remote UI control unit 401, unlike application A 404.

An editing module 411 provides a function of editing a document upon receiving an instruction from application A 404 or application B 405. The editing module 411 performs verification processing for a document via the blockchain application 406, editing processing based on an instruction from the user, and generation of editing information. The editing information is provided with a signature affixed by the editing module 411, and the editing module 411 also guarantees the descriptive content of the editing information. The editing information has a descriptive content about, for example, information about documents obtained before and after editing and the outline of editing processing, and is thus used to guarantee that editing processing described in the editing information was performed by the editing module 411. A specific example of the editing information is document editing information 608 described below. Furthermore, the present exemplary embodiment is based on the premise that the editing module 411 is a module trusted by the blockchain service.

Figure 6:
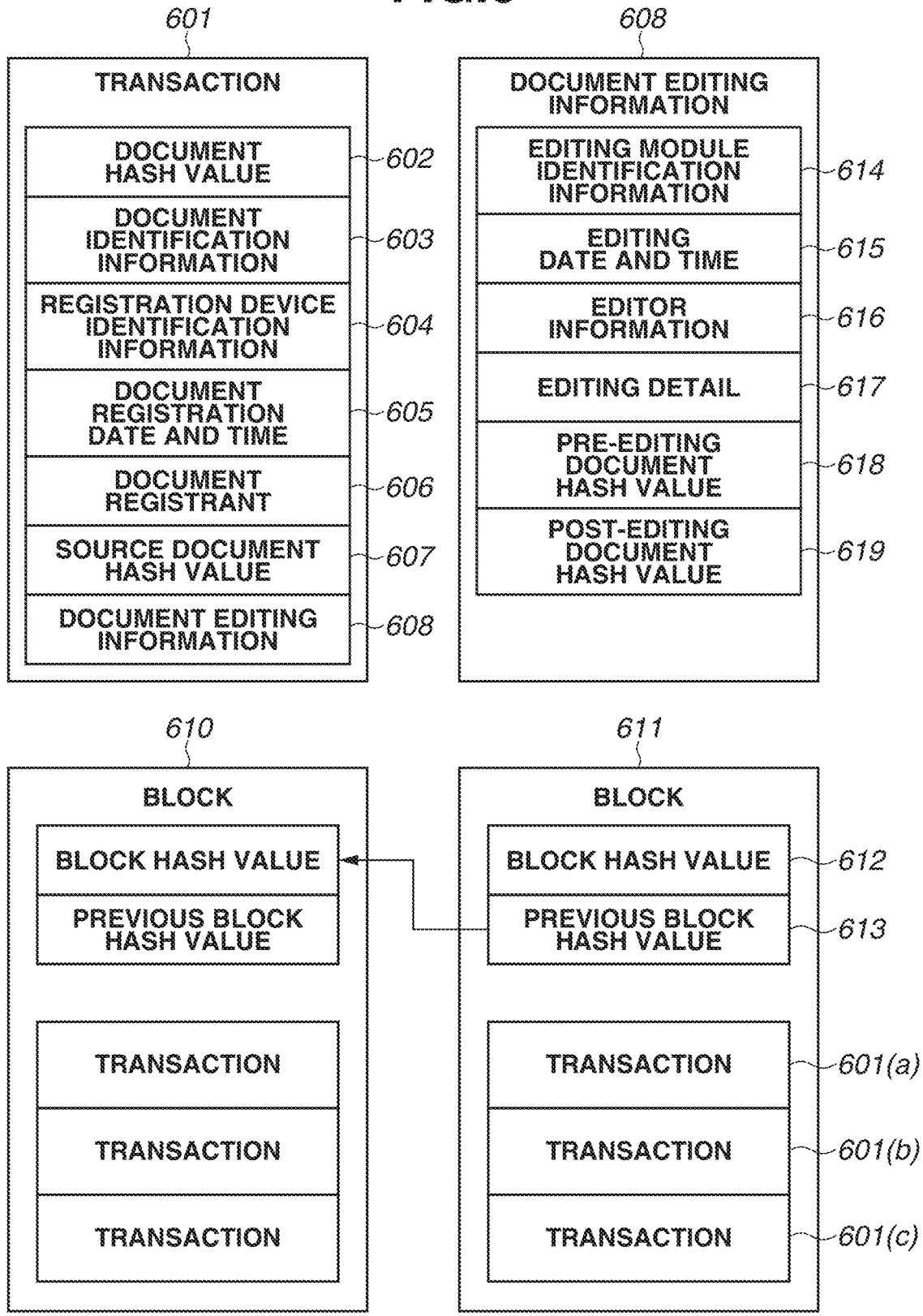
FIG. 6 is a diagram illustrating a data configuration for a blockchain apparatus.

The blockchain application 406 provides the function of receiving an instruction from application A 404 or application B 405 and registering, acquiring, and verifying information about a document with use of the blockchain apparatus 111. Moreover, the blockchain application 406 also provides the function of receiving an instruction from the editing module 411 and verifying information about a document with use of the blockchain apparatus 111. Examples of the data structures of a transaction 601 and blocks which the blockchain application 406 registers with the blockchain apparatus 111 are illustrated in FIG. 6.

When receiving an instruction for the blockchain apparatus 111 from an application, the blockchain application 406 also receives credential information from a credential information management unit 410. The blockchain application 406 performs verification of the received credential information, and performs processing with respect to the blockchain apparatus 111 only when such verification is successful.

Credential information A 408 is credential information for insuring that application A 404 is a legitimate application which is allowed to use the blockchain apparatus 111. The credential information A 408 is issued with respect to an application which has been verified to be performing correct processing, and application with the credential information incorporated therein is loaded on the image forming apparatus 101.

The substance of the credential information A 408 can be a digital certificate or a key pair including a private key and a public key or can be a predetermined data value. The content of the credential information A 408 can be a content varying with applications. Moreover, a configuration in which a default certificate is previously incorporated in an application, the application, after being installed on the image forming apparatus 101, communicates with the blockchain apparatus 111, and the credential information A 408 is issued based on the certificate and is then incorporated in application A 404 can also be employed.

Credential information B 409 is credential information for insuring that application B 405 is a legitimate application which is allowed to use the blockchain apparatus 111. The credential information B 409 is loaded on the image forming apparatus 101 as with the credential information A 408.

Credential information C 407 is credential information for insuring that the image forming apparatus 101 is a legitimate apparatus which is allowed to use the blockchain apparatus 111. The credential information C 407 can be issued for each apparatus manufacturer by, for example, an organization which administrates the present system.

The credential information C 407 can be shipped out in the state of being incorporated in firmware of the image forming apparatus 101, or can be installed on the image forming apparatus 101 after being shipped out. Moreover, a configuration in which a default certificate is previously incorporated in the image forming apparatus 101, the image forming apparatus 101 later communicates with the blockchain apparatus 111, and the credential information C 407 is issued based on the certificate and is then incorporated in the credential information management unit 410 can also be employed.

The credential information management unit 410 provides the function of managing credential information included in the image forming apparatus 101. In the present exemplary embodiment, upon receiving an instruction from the blockchain application 406, the credential information management unit 410 passes the credential information C 407 to the blockchain application 406.

The credential information D 412 is credential information for insuring that the editing module 411 is a legitimate editing module which is allowed to use the blockchain apparatus 111. The credential information D 412 is issued with respect to an editing module which has been verified to be performing correct processing, and the editing module 411 with the credential information D 412 incorporated therein is loaded on the image forming apparatus 101.

The substance of the credential information D 412 can be a digital certificate or a key pair including a private key and a public key or can be a predetermined data value. The content of the credential information D 412 can be a content varying with applications. The credential information D 412 can be issued for each apparatus manufacturer by, for example, an organization which administrates the present system. The editing module 411 with the credential information D 412 incorporated therein can be shipped out in the state of being incorporated in firmware of the image forming apparatus 101, or can be installed on the image forming apparatus 101 after being shipped out. Moreover, a configuration in which a default certificate is previously incorporated in the editing module 411, the editing module 411 later communicates with the blockchain apparatus 111, and the credential information D 412 is issued based on the certificate and is then incorporated in the editing module 411 can also be employed.

Figure 5:
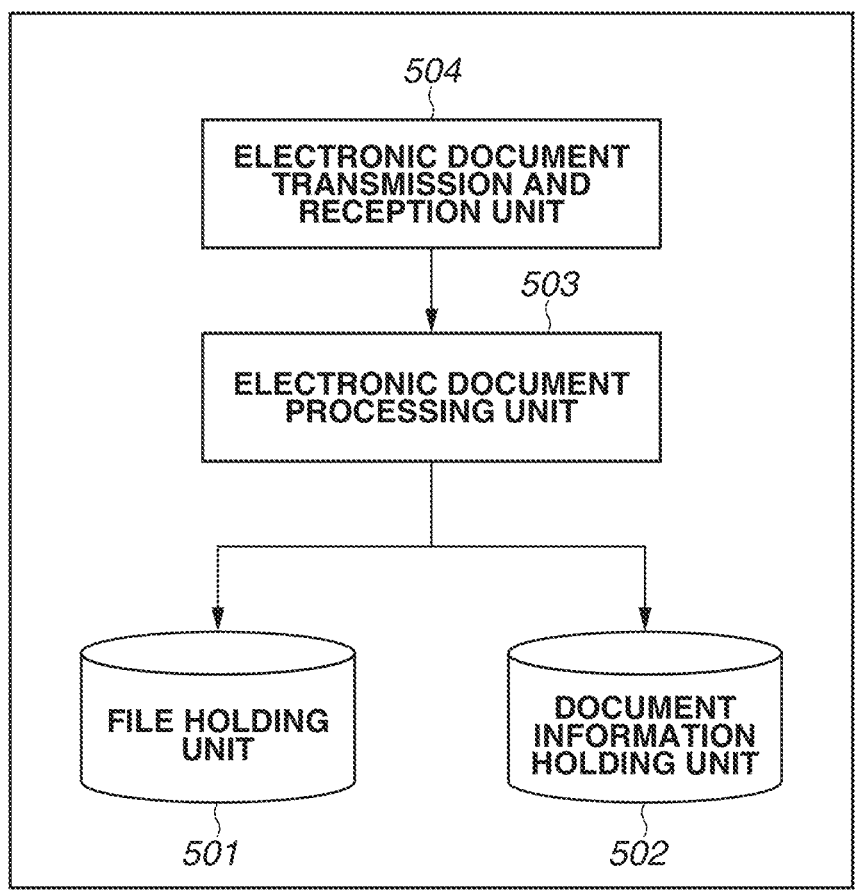
FIG. 5 is a diagram illustrating a software configuration of the document management apparatus.

FIG. 5 is a block diagram illustrating a software configuration related to the present exemplary embodiment in the document management apparatus 103. Electronic documents which the document management apparatus 103 manages include document files, which are stored in a file holding unit 501, and pieces of information indicating respective documents, which are stored in a document information holding unit 502. Data to be stored in the document information holding unit 502 is information set forth in a document information table shown in Table 3.

holding unit 501 is stored. In the present exemplary embodiment, the file path is expressed as a path on a file system, but does not need to be a path as long as it is information uniquely representing a storage location.

While these columns are configured with minimum items required for describing the present exemplary embodiment, for example, information for classifying documents can be additionally stored. An electronic document processing unit 503 has the function of accessing the file holding unit 501 and the document information holding unit 502 and controlling processing operations such as registration and acquisition of an electronic document and acquisition of a list. These processing operations to be performed by the electronic document processing unit 503 can be performed by being started up by an electronic document transmission and reception unit 504 having received a request for input-output processing about an electronic document from the outside of the document management apparatus 103, such as the image forming apparatus 101 or the PC 102.

FIG. 6 is a block diagram illustrating data structures of a transaction 601 and blocks each storing a plurality of such transactions, which are stored in the blockchain apparatus 111. The blockchain apparatus 111 is an apparatus which manages data in a formation called a blockchain. The blockchain treats information in units of transactions, and manages the transactions in units of blocks each containing a plurality of transactions. Since each block has a defined association with blocks occurring before and after the block, the respective blocks are configured in such a way as to maintain a beaded state.

Moreover, the blockchain service is configured with a plurality of blockchain apparatuses 111 called nodes, and has a decentralized equipment configuration in which all of the nodes equally manage block data. Therefore, since, in the case of tampering with block data, updating has to be performed on a plurality of nodes constituting the blockchain service, the blockchain service is known as a data management method strong in anti-tampering property.

In the present exemplary embodiment, during processing of an electronic document by the image forming apparatus 101, a transaction representing the electronic document is transmitted to the blockchain apparatus 111 and is then subjected to block management, so that a correct state of the electronic document is held. This enables checking whether no tampering has been performed on an electronic document stored in the document management apparatus 103.

TABLE 3

| ID | Document name | Registration date and time | File path |
|---|---|---|---|
| 1 | Document A | 2019 May 20 12:00:00 | D:\Document\document0001.pdf |
| 2 | Document B | 2019 May 21 13:00:00 | D:\Document\document0002.pdf |
| 3 | Document C | 2019 May 22 12:30:00 | D:\Document\document0003.pdf |

The document information table shown in Table 3 is configured with columns "ID", "document name", "registration date and time", and "file path". The column "ID" indicates identification information for uniquely managing an electronic document. The column "document name" indicates a name which is allocated for the user to discriminate an electronic document. The document name can overlap between a plurality of electronic documents. The column "registration date and time" indicates a date and time at which an electronic document was stored in the document management apparatus 103. The column "file path" indicates a location at which a document file stored in the file A transaction 601, which represents processing for registration and outputting of an electronic document with the document management apparatus 103, includes the following seven pieces of information. A document hash value 602 is a hash value calculated to uniquely represent a target electronic document. The document hash value 602 is a value calculated from the entire electronic document, so that a hash value to be calculated changes according to a change being made to the electronic document itself. However, a method for calculation other than the above-mentioned method can be employed without being limited.

Document identification information 603 is information which is held to be associated with an electronic document managed in the document management apparatus 103, and, in the present exemplary embodiment, stores an ID value shown in Table 3. Registration device identification information 604 is information for identifying an image forming apparatus 101 which has performed document registration, and, in the present exemplary embodiment, stores a hash value of the credential information C 407. A document registration date and time 605 is information representing a point of time at which a document was registered, and, in the present exemplary embodiment, stores a value of the registration date and time shown in Table 3.

A document registrant 606 is information representing a user who performed document registration, and, in the present exemplary embodiment, stores a hash value of the user name of a user who logged in to the image forming apparatus 101. Here, since information about, for example, a user name which is previously registered to use the image forming apparatus 101 is able to be directly used as information to be registered with the blockchain apparatus 111, an administrative work load on the administrator of the system can be reduced.

A source document hash value 607 is information representing an association between documents. The source document hash value 607 serves as a region for storing a hash value of a source electronic document in a case where, for example, printing, electronic data save, or editing processing has been performed on an electronic document stored in the document management apparatus 103. This information enables associating a source document and a document serving as a hash calculation source for the document hash value 602 with each other. In a case where no source document is present, no information is stored in the present region.

The document editing information 608 is information indicating an editing content obtained when editing processing for a document has been performed. In a case where editing processing has not been performed, no information is stored in this region. The entire editing processing information can be the one previously signed by the editing module 411. The document editing information 608 includes the following six pieces of information.

Editing module identification information 614 is information for identifying an editing module 411 which performed document editing, and, in the present exemplary embodiment, stores a hash value of the credential information D 412.

An editing date and time 615 is information representing a point of time at which a document was edited, and, in the present exemplary embodiment, stores a value of the date and time at which the document editing information 608 was generated in the editing module 411. Editor information 616 is information representing a user who performed document editing, and, in the present exemplary embodiment, stores a hash value of the user name of a user who logged in to the image forming apparatus 101.

Editing detail 617 is information indicating what editing processing was performed to change a source document into an electronic document obtained after editing targeted for transaction. Since storing detailed editing information is not desirable in terms of information leak and in terms of data amount, the editing detail 617 stores abstract editing information. An example of the editing detail is shown in Table 4.

TABLE 4

| Editing ID | Source document editing target page | Edited document editing target page | Editing content | Position (upper left X-coordinate, upper left Y-coordinate, width, height) | Number of characters |
|---|---|---|---|---|---|
| 1 | P.3 | P.3 | Mask processing | 115 mm, 120 mm, 16 mm, 4 mm | 4 characters |
| 2 | P.3 | P.3 | Comment addition | 120 mm, 60 mm, 36 mm, 4 mm | 9 characters |
| 3 | — | P.4 | Insertion processing | — | — |
| 4 | P.4 | — | Deletion processing | — | — |

The editing detail table shown in Table 4 is configured with columns "editing ID", "source document editing target page", "edited document editing target page", "position", and "number of characters". The column "editing ID" is identification information used for uniquely managing editing processing. The column "source document editing target page" indicates a page targeted for editing processing in a source document. The column "edited document editing target page" indicates a page targeted for editing processing in an edited document. The column "editing content" indicates a type of editing processing. The column "position" is information for indicating a position in a page in which editing was performed with regard to editing processing in which information about the editing position is present. The column "position" expresses an editing region with a rectangle and includes the upper left X-coordinate, upper left Y-coordinate, width, and height. The column "number of characters" is information for indicating information about the number of characters which were edited.

For example, in the editing processing the editing ID of which is "1", "mask processing" was performed on "page 3" of the source document. This page is equivalent to "page 3" even in the edited document. The masked region is a "rectangular region with 16 mm in width and 4 mm in height with respect to a position with an upper left X-coordinate of 115 mm and an upper left Y-coordinate of 120 mm". The number of masked characters is "4 characters".

In the editing processing the editing ID of which is "2", "comment addition" was performed on "page 3" of the source document. This page is equivalent to "page 3" even in the edited document. The region to which a comment was added is a "rectangular region with 36 mm in width and 4 mm in height with respect to a position with an upper left X-coordinate of 120 mm and an upper left Y-coordinate of 60 mm". The number of characters of the added comment is "9 characters".

In the editing processing the editing ID of which is "3", "insertion processing" was performed on "page 4" of the edited document. This page is an inserted page and is, therefore, not present in the source document. In the editing processing the editing ID of which is "4", "deletion processing" was performed on "page 4" of the source document. This page is a deleted page and is, therefore, not present in the edited document.

These columns are configured with several items for the purpose of describing the present exemplary embodiment, but can additionally include, for example, information obtained in a case where editing for permuting pages was performed. A pre-editing document hash value 618 is a hash value of a document serving as an editing source, and, in the present exemplary embodiment, stores a hash value of a document which the editing module 411 acquired as a document targeted for editing. A post-editing document hash value 619 is a hash value of a document obtained after editing, and, in the present exemplary embodiment, stores a hash value of a document which the editing module 411 generated by performing editing thereon.

Next, a structure of a block which holds the transaction 601 is described with reference to a block 611. The block 611 is obtained by schematizing a general blockchain structure. The block 611 holds a plurality of transactions 601(a) to 601(c) and a block hash value 612 calculated from these transactions 601. While, in the present exemplary embodiment, the number of transactions 601 included in a block is set to three, the number of transactions is not limited. Moreover, the block 611 further holds a previous block hash value 613 for coupling blocks with each other. In the present exemplary embodiment, a block hash value of a block 610 is stored in the previous block hash value 613, thus indicating that the respective blocks 610 and 611 have an association with each other.

Figure 7B:
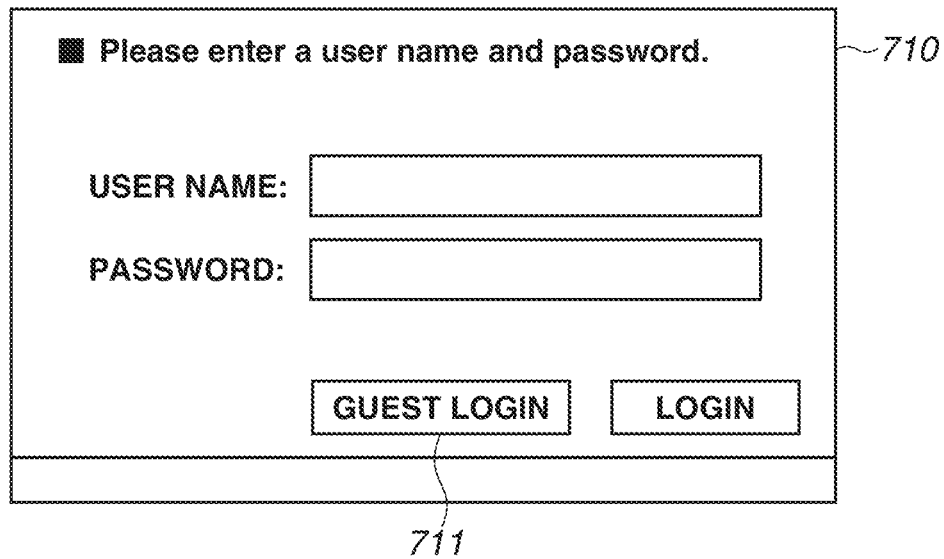

FIGS. 7A and 7B are diagrams illustrating examples of authentication screens. The authentication screen 700 illustrated in FIG. 7A is a screen used to provide the function of allowing the user to perform user authentication to use a function of the image forming apparatus 101. A user name entry field 701 is a field into which the user of the image forming apparatus 101 enters a user name. A password entry field 702 is a field into which the user of the image forming apparatus 101 enters a password. A login button 703 is a button used to initiate user authentication. When the user presses the login button 703, the user authentication processing unit 402 performs user authentication based on values entered in the user name entry field 701 and the password entry field 702.

The authentication screen (guest login) 710 illustrated in FIG. 7B is an example of an authentication screen in which guest login is provided, and is a screen used to provide the function of allowing the user to perform user authentication to use a function of the image forming apparatus 101. In the following description, only differences from the authentication screen 700 are described.

A guest login button 711 is a button used to initiate user authentication as a guest user. When the user presses the guest login button 711, the user authentication processing unit 402 permits login without performing authentication using a user name and a password. The user, who has logged in by pressing the guest login button 711, is set to have a user name of "guest" and a role of "guest user", so that the functions which the user is allowed to use are limited according to the authority set forth in the role information table shown in Table 2. Furthermore, in the present exemplary embodiment, although details are omitted from description, the user authentication processing unit 402 can be set to switch which of the authentication screen 700 and the authentication screen (guest login) 710 to display.

Figure 8A:
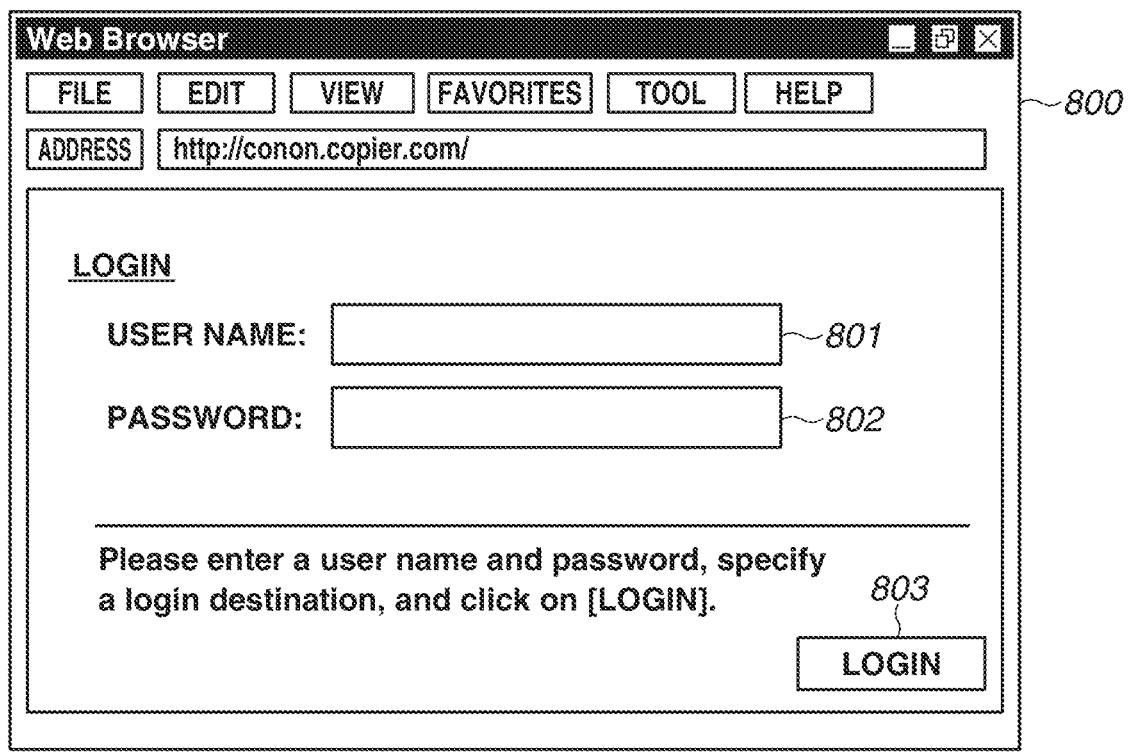
FIGS. 8A and 8B are diagrams illustrating examples of remote authentication screens.
Figure 8B:
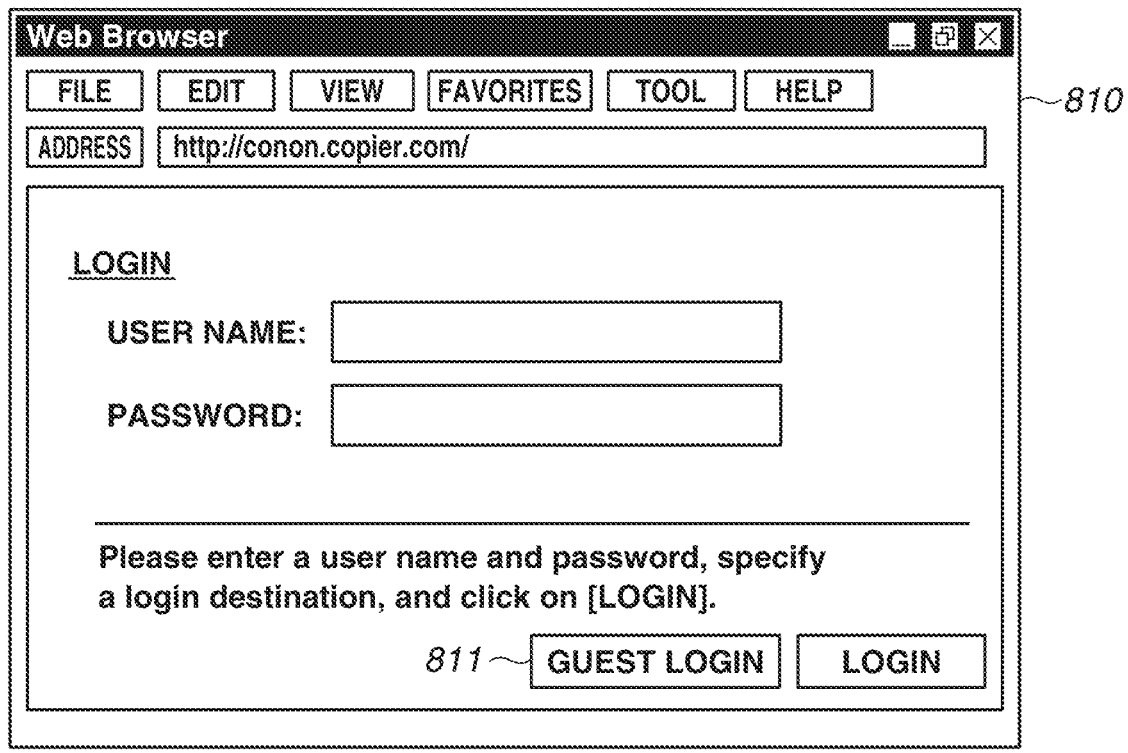

FIGS. 8A and 8B are diagrams illustrating examples of remote authentication screens. The remote authentication screen 800 illustrated in FIG. 8A is a screen used to perform user authentication for the user to use a function of the image forming apparatus 101 via a web browser on the PC 102. A user name entry field 801 is a field into which the user of the image forming apparatus 101 enters a user name. A password entry field 802 is a field into which the user of the image forming apparatus 101 enters a password. A login button 803 is a button used to initiate user authentication. When the user presses the login button 803, the user authentication processing unit 402 performs user authentication based on values entered in the user name entry field 801 and the password entry field 802.

The remote authentication screen (guest login) 810 illustrated in FIG. 8B is a screen used to provide the function of allowing the user to perform user authentication to use a function of the image forming apparatus 101. In the following description, only differences from the remote authentication screen 800 are described.

A guest login button 811 is a button used to initiate user authentication as a guest user. When the user presses the guest login button 811, the user authentication processing unit 402 permits login without performing authentication using a user name and a password. The user, who has logged in by pressing the guest login button 811, is set to have a user name of "guest" and a role of "guest user", so that the functions which the user is allowed to use are limited according to the authority set forth in the role information table shown in Table 2. Furthermore, in the present exemplary embodiment, although details are omitted from description, the user authentication processing unit 402 can be set to switch which of the remote authentication screen 800 and the remote authentication screen (guest login) 810 to display.

FIGS. 9A and 9B are diagrams illustrating examples of function selection screens which the local UI control unit 400 and the remote UI control unit 401 display, respectively. Each of the function selection screens illustrated in FIGS. 9A and 9B indicates a list of functions included in the image forming apparatus 101. The user of the image forming apparatus 101 is able to press a button displayed in each screen to use each function included in the image forming apparatus 101.

The function selection screen 900 illustrated in FIG. 9A is a screen which is displayed on the operation unit 209 by the local UI control unit 400 immediately after login is performed via the authentication screen 700 or the authentication screen (guest login) 710. Function selection buttons 901 are buttons operable to use the respective functions of the image forming apparatus 101. A copy button is a button used to display a screen operable to use a copy function, a transmission button is a button used to display a screen operable to use the function of transmitting a scanned document to the PC 102, and a storage button is a button used to display a screen operable to use the function of storing a scanned electronic document in the HDD 204.

While, in the present exemplary embodiment, screens which are displayed after the respective buttons are pressed are omitted from description, each of screens operable to use the various functions is displayed. Furthermore, buttons related to functions which are not allowed to use depending on the role of the user are not displayed. When a document registration button is pressed, the registration screen 1000 or the registration screen 1010 is displayed. When a registered document storage/printing button is pressed, the registered document storage/printing screen 1100 is displayed. When a document verification button is pressed, the document verification screen 1200 is displayed. When a document editing button is pressed, the editing screen 1800 is displayed.

A logout button 902 is a button used to perform logout processing, which is displayed during login. When the logout button 902 is pressed, logout processing is performed, and, after that, the authentication screen 700 or the authentication screen (guest login) 710 is displayed.

The function selection screen 910 illustrated in FIG. 9B is an example of a screen which is displayed in a web browser on the PC 102 by the remote UI control unit 401 immediately after login is performed via the remote authentication screen 800 or the remote authentication screen (guest login) 810.

Function selection buttons 911 are buttons operable to use the respective functions. A screen which is displayed after a storage button is pressed is omitted from description, as with the function selection screen 900. When a document registration button is pressed, the registration screen 1020 or the registration screen 1030 is displayed. When a registered document storage/printing button is pressed, the registered document storage/printing screen 1110 is displayed. When a document verification button is pressed, the document verification screen 1210 is displayed. When a document editing button is pressed, the editing screen 1810 is displayed.

FIGS. 10A, 10B, 10C, and 10D are diagrams illustrating examples of document registration screens which application A 404 and application B 405 display. In the present exemplary embodiment, application A 404 displays a screen on the operation unit 209 and in a web browser on the PC 102 via the local UI control unit 400 and the remote UI control unit 401, and application B 405 displays a screen only in a web browser on the PC 102. Furthermore, application B 405 can also display a screen both on the operation unit 209 and in a web browser on the PC 102.

The registration screen 1000 illustrated in FIG. 10A is a screen used to provide the function of registering a document with the blockchain apparatus 111 and the document management apparatus 103. A document selection setting 1001 is a setting for selecting a document targeted for registration from a scanned paper document or a document stored in the image forming apparatus 101, and thus enables selecting either "scan" or "stored document". A scan setting 1002 includes various settings regarding scan. A blockchain button 1003 is a button used to select whether to register information about a document with the blockchain apparatus 111. In a case where the blockchain button 1003 is selected, it is selected to register information about a document with the blockchain apparatus 111, and, in a case where the blockchain button 1003 is not selected, it is not selected to register information about a document with the blockchain apparatus 111.

In a case where "scan" is selected at the document selection setting 1001, a register button 1004 is used to perform scanning of a document to generate an electronic document. In a case where "stored document" is selected, the register button 1004 is used to display a list of stored documents and acquire a document selected by the user from the list. After that, in a case where the blockchain button 1003 is selected, the register button 1004 is used to register the electronic document with the document management apparatus 103 and register information about the electronic document with the blockchain apparatus 111. In a case where the blockchain button 1003 is not selected, the register button 1004 is used to register the electronic document with the document management apparatus 103 without registering information about the electronic document with the blockchain apparatus 111. A storage destination setting 1005 is a setting used to designate in which path of the document management apparatus 103 to store a document.

Figure 10B:
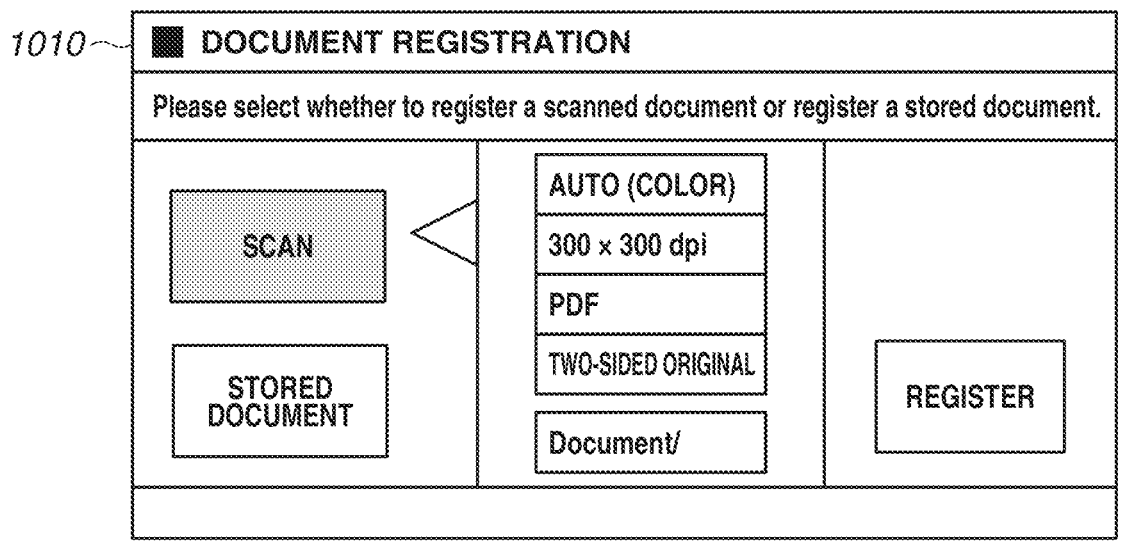

The registration screen 1010 illustrated in FIG. 10B is a screen used to provide the function of registering a document with the blockchain apparatus 111 and the document management apparatus 103, and is a screen which is displayed to, for example, a user who has guest-logged in or a user who does not have the authority of using the function of the blockchain apparatus 111. Since, in the present exemplary embodiment, the guest user does not have the authority of registering document information with the blockchain apparatus 111, the registration screen 1010 differs from the registration screen 1000 in that the blockchain button 1003 is not displayed.

The registration screen 1020 illustrated in FIG. 10C is a screen used to provide the function of registering a document with the blockchain apparatus 111 and the document management apparatus 103, and is an example of a screen which is displayed in a web browser on the PC 102. The registration screen 1030 illustrated in FIG. 10D is a screen used to provide the function of registering a document with the blockchain apparatus 111 and the document management apparatus 103, and is a screen which is displayed in a web browser on the PC 102 to, for example, a user who has guest-logged in.

FIGS. 11A and 11B are diagrams illustrating examples of screens used to store or print a registered document, which application A 404 displays. The registered document storage/printing screen 1100 illustrated in FIG. 11A is a screen used to provide the function of storing or printing a document managed by the blockchain apparatus 111 and the document management apparatus 103. A document selection list 1101 is a list used to select a document to be stored or printed, and application A 404 displays, in the document selection list 1101, documents which are currently managed by the document management apparatus 103. A print button 1102 is a button used to perform printing of a document selected in the document selection list 1101. A store button 1103 is a button used to store a document selected in the document selection list 1101 in the HDD 204 of the image forming apparatus 101.

The registered document storage/printing screen 1110 illustrated in FIG. 11B is a screen used to provide the function of storing or printing a document managed by the blockchain apparatus 111 and the document management apparatus 103, and is an example of a screen which is displayed in a web browser on the PC 102.

FIGS. 12A and 12B are diagrams illustrating examples of screens used to verify a document which application A 404 displays. The document verification screen 1200 illustrated in FIG. 12A is a screen used to provide the function of verifying that a scanned document or a document stored in the image forming apparatus 101 is a right document, with use of the blockchain apparatus 111.

A document selection setting 1201 is a setting used to select a document targeted for verification from a scanned paper document or a document stored in the image forming apparatus 101. A document selection list 1202 is a list used to select a document targeted for verification, and is a list of documents which are currently stored in the HDD 204. A verify button 1203 is a button used to perform scanning of a document in a case where "scan" is selected in the document selection setting 1201 and, after that, perform verification of the document with use of the blockchain apparatus 111. In a case where "stored document" is selected in the document selection setting 1201, the verify button 1203 is used to verify a document selected in the document selection list 1202.

The document verification screen 1210 illustrated in FIG. 12B is a screen used to provide the function of verifying that a document stored in the HDD 204 is a right document, with use of the blockchain apparatus 111, and is an example of a screen which is displayed in a web browser on the PC 102.

FIGS. 18A and 18B illustrate screen examples of screens used for selecting a document targeted for editing from among registered documents, each of which application A 404 displays. The editing screen 1800 for registered documents illustrated in FIG. 18A is a screen for providing the function of selecting a document targeted for editing from among documents registered with the blockchain apparatus 111 and the document management apparatus 103. A document selection list 1801 is a list used for selecting a document to be edited, and application A 404 displays, in the document selection list 1801, documents which are currently managed by the document management apparatus 103. An edit button 1802 is a button used to perform editing of a document selected in the document selection list 1801. When the edit button 1802 has been pressed, application A 404 displays an editing method selection screen 1900 (FIG. 19A).

The editing screen 1810 for registered documents illustrated in FIG. 18B is a screen for providing the function of selecting a document targeted for editing from among documents registered with the blockchain apparatus 111 and the document management apparatus 103, and is an example of a screen to be displayed in a web browser on the PC 102. When an edit button 1811 has been pressed, application A 404 displays an editing method selection screen 1910 (FIG. 19B).

Figure 19A:
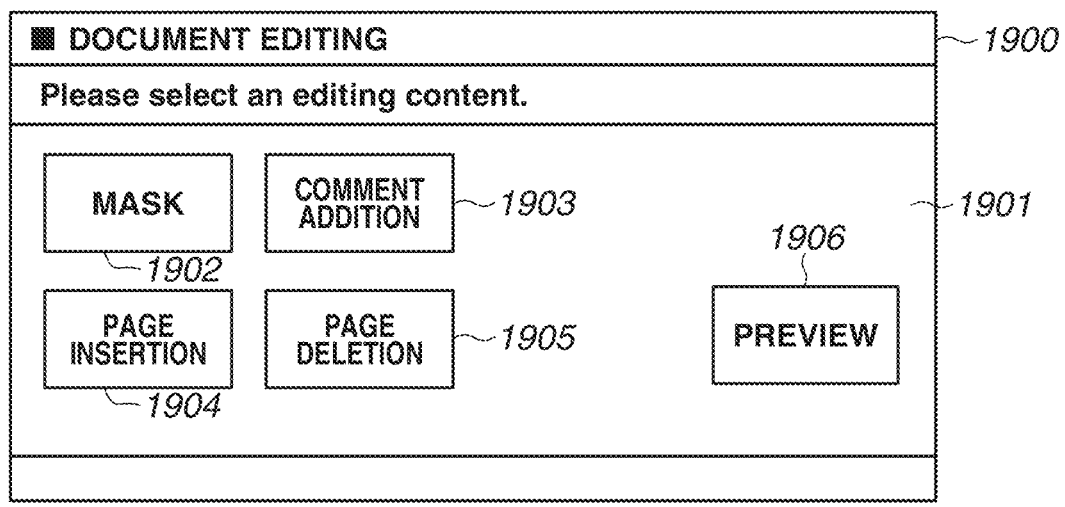
FIGS. 19A and 19B are diagrams illustrating examples of editing content selection screens for the document editing function of the application A.
Figure 19B:
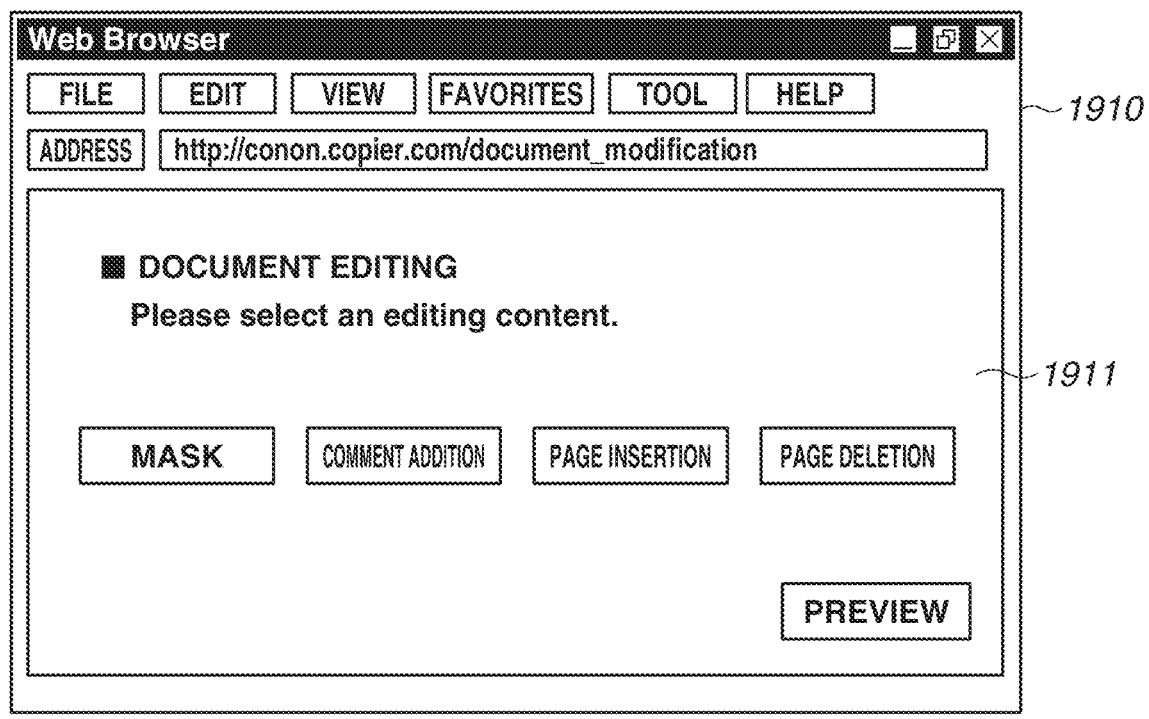
Figure 20A:
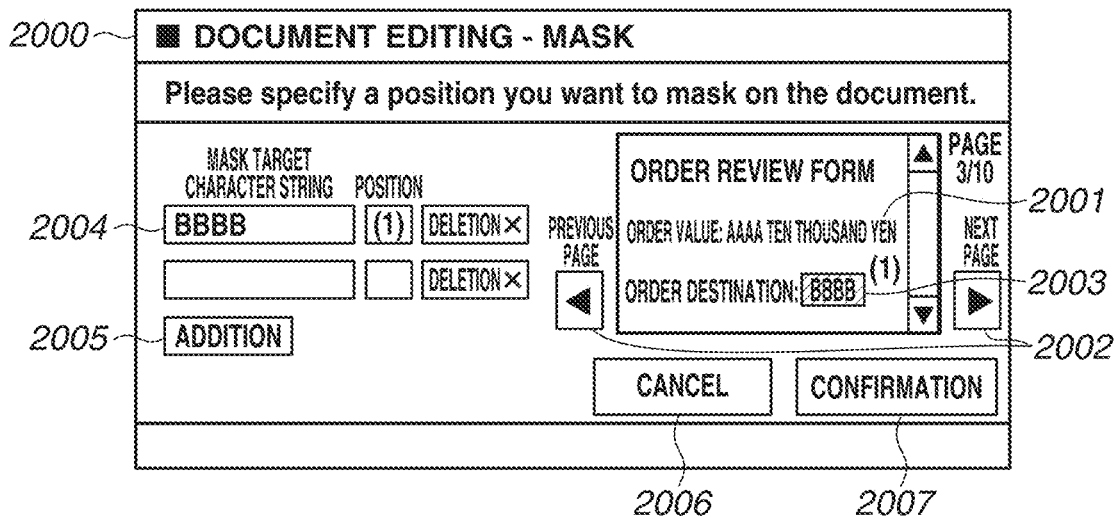
FIGS. 20A and 20B are diagrams illustrating examples of mask processing screens for the document editing function of the application A.
Figure 21A:
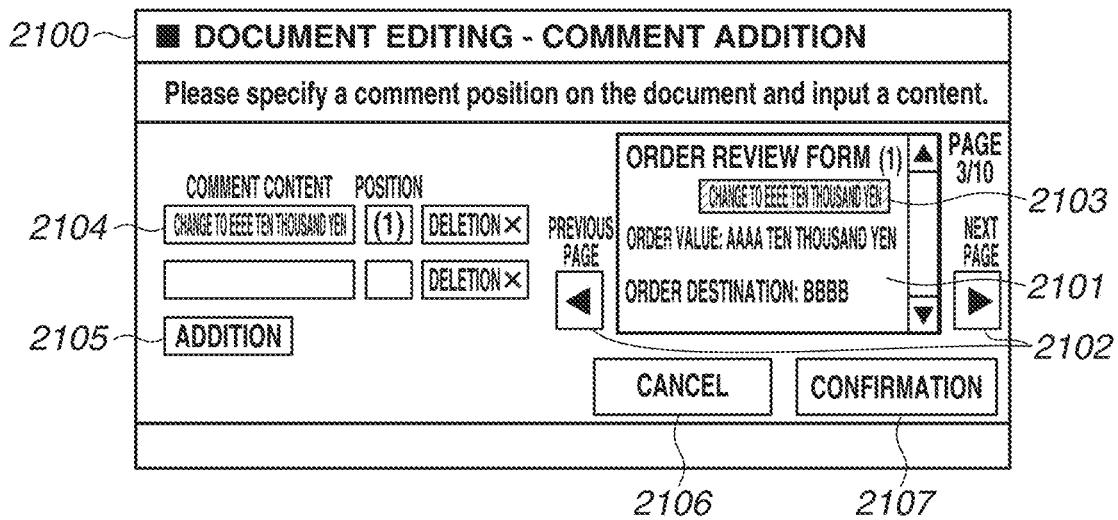
FIGS. 21A and 21B are diagrams illustrating examples of comment addition processing screens for the document editing function of the application A.
Figure 22A:
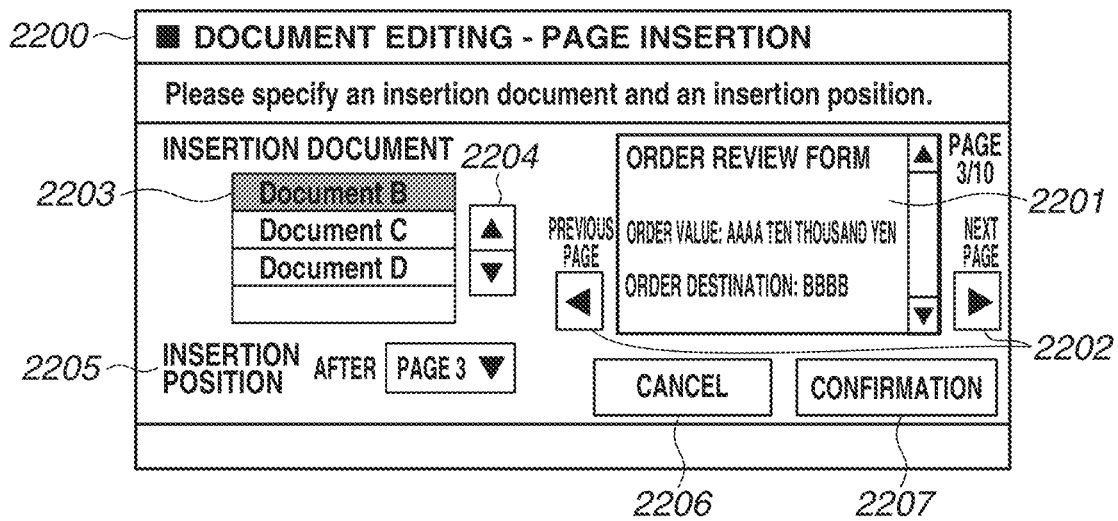
FIGS. 22A and 22B are diagrams illustrating examples of page insertion processing screens for the document editing function of the application A.
Figure 23A:
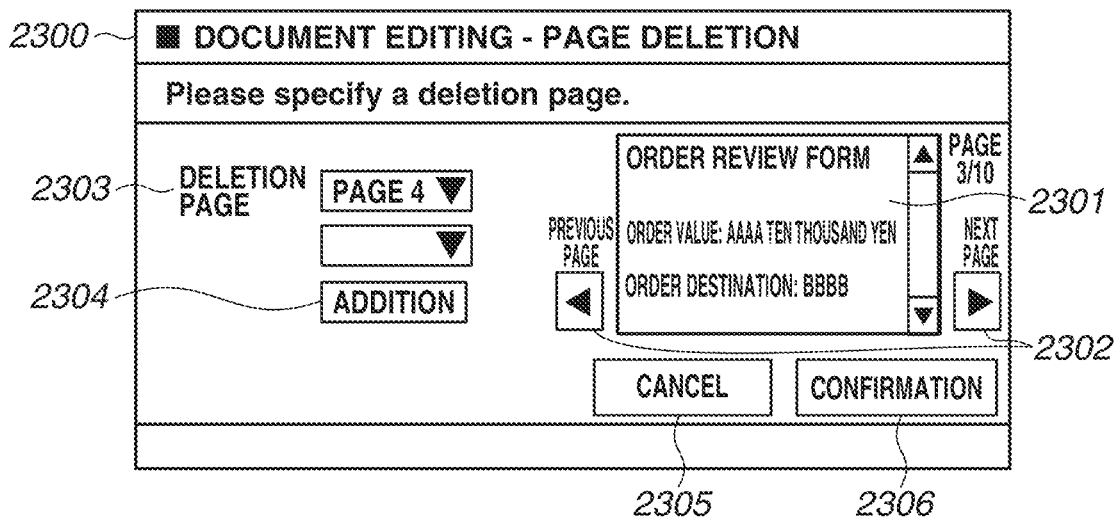
FIGS. 23A and 23B are diagrams illustrating examples of page deletion processing screens for the document editing function of the application A.

FIGS. 19A and 19B illustrate screen examples of screens used for selecting an editing method for a document, each of which application A 404 displays. The editing method selection screen 1900 illustrated in FIG. 19A is a screen for providing the function of selecting what editing to perform on a document targeted for editing. Editing method selection buttons 1901 are buttons used to select the respective editing functions. When a mask button 1902 has been pressed, application A 404 displays a mask processing screen 2000 (FIG. 20A). When a comment addition button 1903 has been pressed, application A 404 displays a comment addition processing screen 2100 (FIG. 21A). When a page insertion button 1904 has been pressed, application A 404 displays a page insertion processing screen 2200 (FIG. 22A). When a page deletion button 1905 has been pressed, application A 404 displays a page deletion processing screen 2300 (FIG. 23A). When a preview button 1906 has been pressed, application A 404 displays an editing result preview screen 2400 (FIG. 24A) or 2410 (FIG. 24B).

Figure 20B:
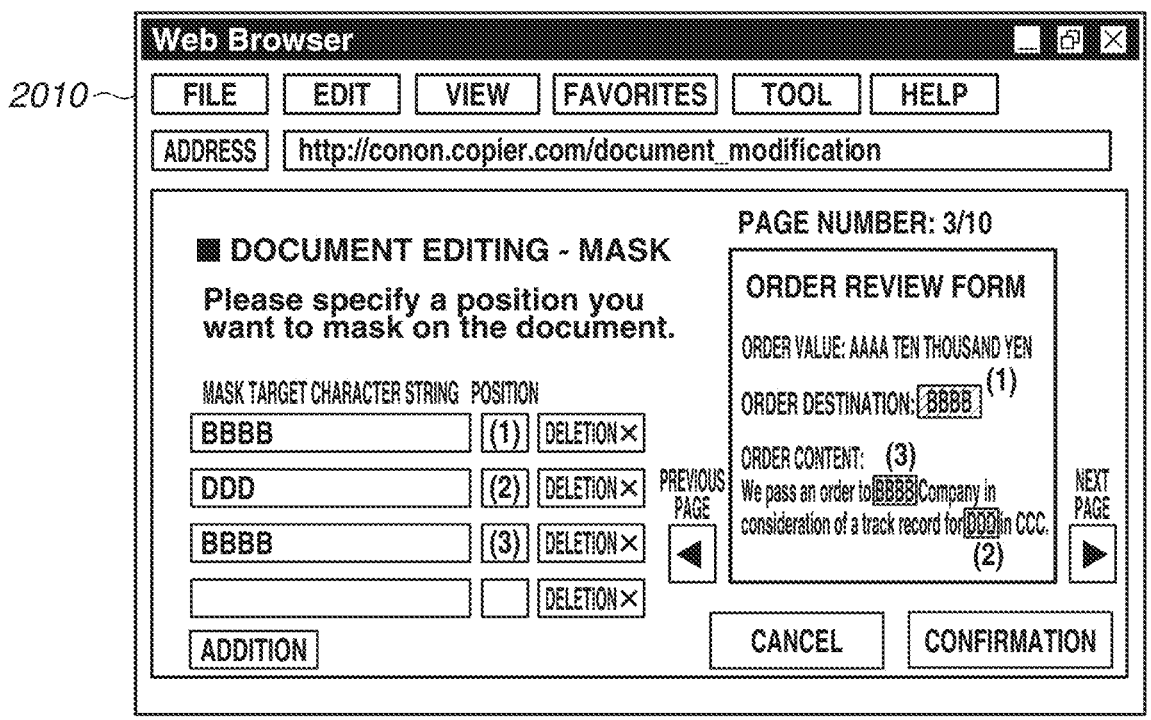
Figure 21B:
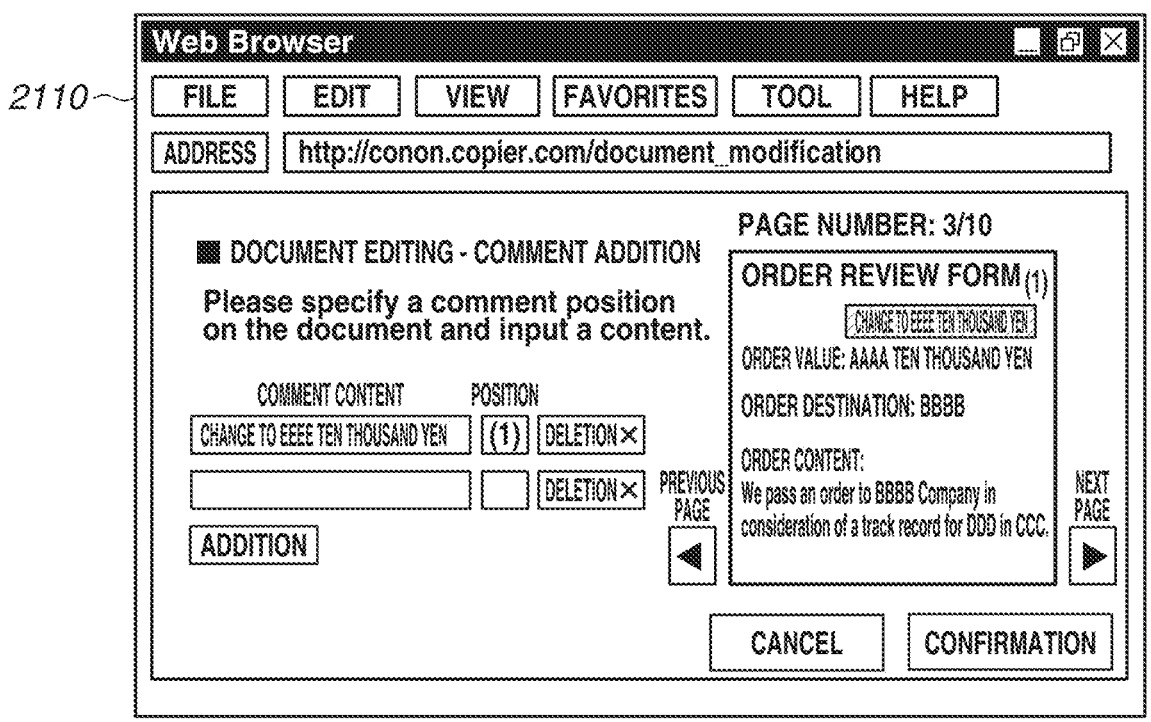
Figure 22B:
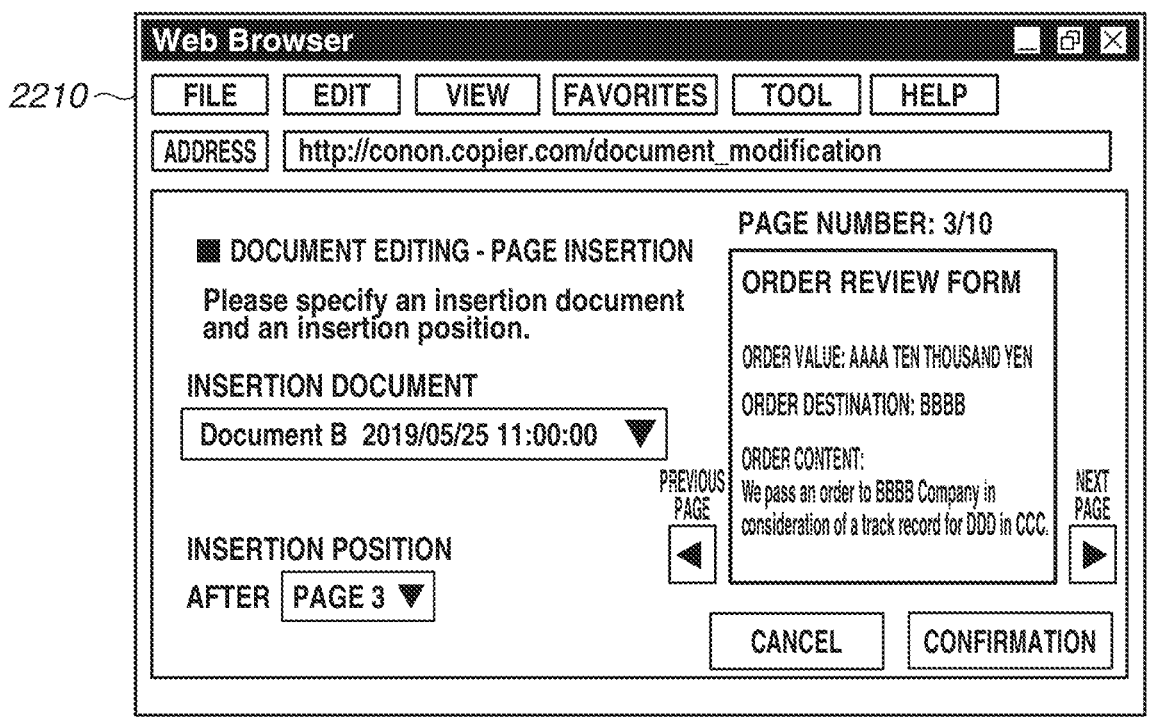
Figure 23B:
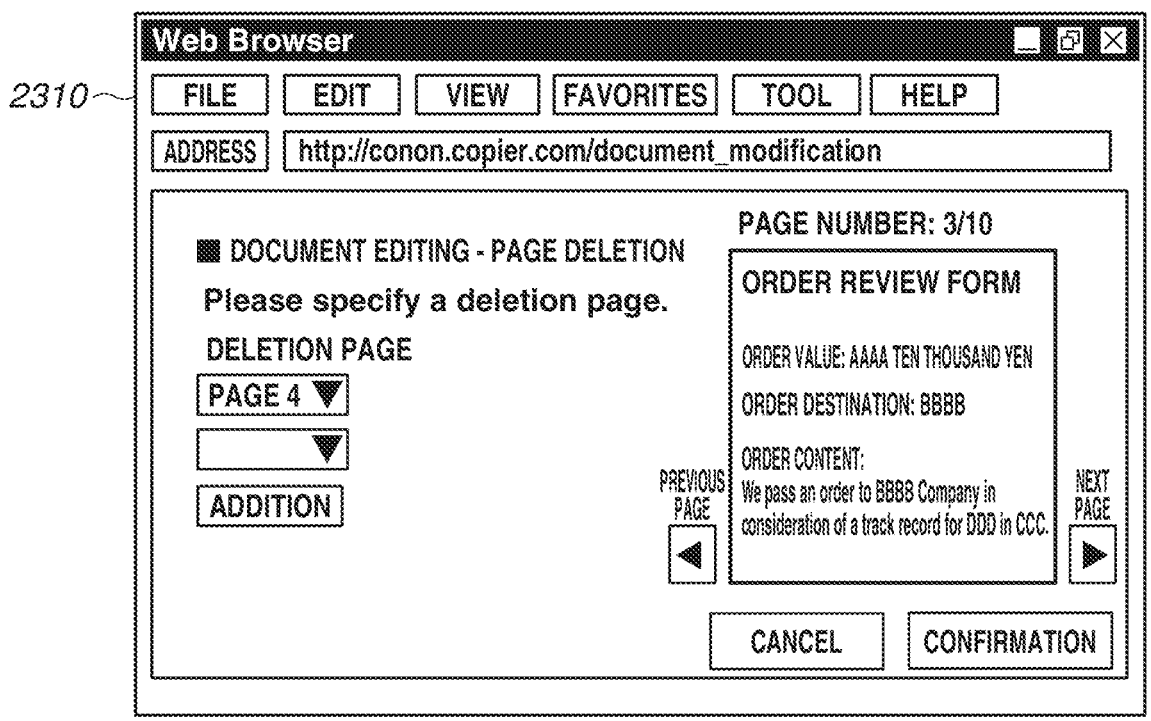

The editing method selection screen 1910 illustrated in FIG. 19B is a screen for providing the function of selecting what editing to perform on a document targeted for editing, and is an example of a screen to be displayed in a web browser on the PC 102. Editing method selection buttons 1911 are buttons used to select the respective editing functions. When a mask button has been pressed, application A 404 displays a mask processing screen 2010 (FIG. 20B). When a comment addition button has been pressed, application A 404 displays a comment addition processing screen 2110 (FIG. 21B). When a page insertion button has been pressed, application A 404 displays a page insertion processing screen 2210 (FIG. 22B). When a page deletion button has been pressed, application A 404 displays a page deletion processing screen 2310 (FIG. 23B). When a preview button has been pressed, application A 404 displays an editing result preview screen 2420 (FIG. 24C) or 2430 (FIG. 24D).

FIGS. 20A and 20B illustrate screen examples of screens used for performing mask processing as document editing processing, which application A 404 displays. The mask processing screen 2000 illustrated in FIG. 20A is a screen used for providing the function of performing mask processing on a document targeted for editing. An editing target document display portion 2001 is a sub-screen used for designating a target region on which to perform mask processing. In response to a page selection button 2002 being pressed, a desired page is displayed in the editing target document display portion 2001. An example of a mask processing portion which the user has designated in the editing target document display portion 2001 is a mask region 2003. Information about the selected mask is displayed in a mask region information display portion 2004. For example, in the mask region information display portion 2004, information about the mask region 2003 is displayed. Pressing a deletion button enables deleting a mask region. When wanting to add a row for mask region information, the user can press an addition button 2005 or designate an additional mask region in the editing target document display portion 2001.

A cancel button 2006 is a button used to cancel mask processing. When the cancel button 2006 has been pressed, the content concerning mask processing is not transmitted to application A 404 and application A 404 displays the editing method selection screen 1900. A confirmation button 2007 is a button used to confirm mask processing. When the confirmation button 2007 has been pressed, the content concerning mask processing is transmitted to application A 404 and application A 404 displays the editing method selection screen 1900.

The mask processing screen 2010 illustrated in FIG. 20B is a screen for providing the function of performing mask processing on a document targeted for editing, and is an example of a screen to be displayed in a web browser on the PC 102. From this screen, application A 404 transitions to displaying of the editing method selection screen 1910.

FIGS. 21A and 21B illustrate screen examples of screens used for performing comment addition processing as document editing processing, each of which application A 404 displays. The comment addition processing screen 2100 illustrated in FIG. 21A is a screen for providing the function of performing comment addition processing on a document targeted for editing. An editing target document display portion 2101 is a sub-screen used for designating a target region on which to perform comment addition processing. In response to a page selection button 2102 being pressed, a desired page is displayed in the editing target document display portion 2101. An example of a comment addition processing portion which the user has designated in the editing target document display portion 2101 is a comment addition region 2103. Information about the selected comment addition region is displayed in a comment addition region information display portion 2104.

For example, in the comment addition region information display portion 2104, information about the comment addition region 2103 is displayed. The content of an added comment is input by the user in a comment content region of the comment addition region information display portion 2104. Pressing a deletion button enables deleting a comment addition region. When wanting to add a row for comment addition region information, the user can press an addition button 2105 or designate an additional comment addition region in the editing target document display portion 2101. A cancel button 2106 is a button used to cancel comment addition processing.

When the cancel button 2106 has been pressed, the content concerning comment addition processing is not transmitted to application A 404 and application A 404 displays the editing method selection screen 1900. A confirmation button 2107 is a button used to confirm comment addition processing. When the confirmation button 2107 has been pressed, the content concerning comment addition processing is transmitted to application A 404 and application A 404 displays the editing method selection screen 1900.

The comment addition processing screen 2110 illustrated in FIG. 21B is a screen for providing the function of performing comment addition processing on a document targeted for editing, and is an example of a screen to be displayed in a web browser on the PC 102. From this screen, application A 404 transitions to displaying of the editing method selection screen 1910.

FIGS. 22A and 22B illustrate screen examples of screens used for performing page insertion processing as document editing processing, each of which application A 404 displays. The page insertion processing screen 2200 illustrated in FIG. 22A is a screen for providing the function of performing page insertion processing on a document targeted for editing. An editing target document display portion 2201 is a sub-screen used for displaying an editing target document to select a target page targeted for page insertion processing. In response to a page selection button 2202 being pressed, a desired page is displayed in the editing target document display portion 2201. An insertion document selection list 2203 is a list used for selecting an insertion document.

In response to an insertion document selection button 2204 being pressed, a desired document is selected. In the present example, "Document B" is currently selected. An insertion position selection list 2205 is a list of page numbers used for selecting an insertion position. Pressing the insertion position selection list 2205 enables selecting a page intended to be inserted. In the present example, "page 3" is currently selected.

A cancel button 2206 is a button used to cancel page insertion processing. When the cancel button 2206 has been pressed, the content concerning page insertion processing is not transmitted to application A 404 and application A 404 displays the editing method selection screen 1900. A confirmation button 2207 is a button used to confirm page insertion processing. When the confirmation button 2207 has been pressed, the content concerning page insertion processing is transmitted to application A 404 and application A 404 displays the editing method selection screen 1900.

The page insertion processing screen 2210 illustrated in FIG. 22B is a screen for providing the function of performing page insertion processing on a document targeted for editing, and is an example of a screen to be displayed in a web browser on the PC 102. From this screen, application A 404 transitions to displaying of the editing method selection screen 1910.

FIGS. 23A and 23B illustrate screen examples of screens used for performing page deletion processing as document editing processing, each of which application A 404 displays. The page deletion processing screen 2300 illustrated in FIG. 23A is a screen for providing the function of performing page deletion processing on a document targeted for editing. An editing target document display portion 2301 is a sub-screen used for displaying an editing target document to select a target page targeted for page deletion processing.

In response to a page selection button 2302 being pressed, a desired page is displayed in the editing target document display portion 2301. A deletion document selection list 2303 is a list of page numbers used for selecting a deletion page. Pressing the deletion document selection list 2303 enables selecting a page targeted for deletion. In the present example, "page 4" is currently selected. When wanting to add a row for the list, the user can press an addition button 2304. A cancel button 2305 is a button used to cancel page deletion processing.

When the cancel button 2305 has been pressed, the content concerning page deletion processing is not transmitted to application A 404 and application A 404 displays the editing method selection screen 1900. A confirmation button 2306 is a button used to confirm page deletion processing. When the confirmation button 2306 has been pressed, the content concerning page deletion processing is transmitted to application A 404 and application A 404 displays the editing method selection screen 1900.

The page deletion processing screen 2310 illustrated in FIG. 23B is a screen for providing the function of performing page deletion processing on a document targeted for editing, and is an example of a screen to be displayed in a web browser on the PC 102. From this screen, application A 404 transitions to displaying of the editing method selection screen 1910.

Figure 24A:
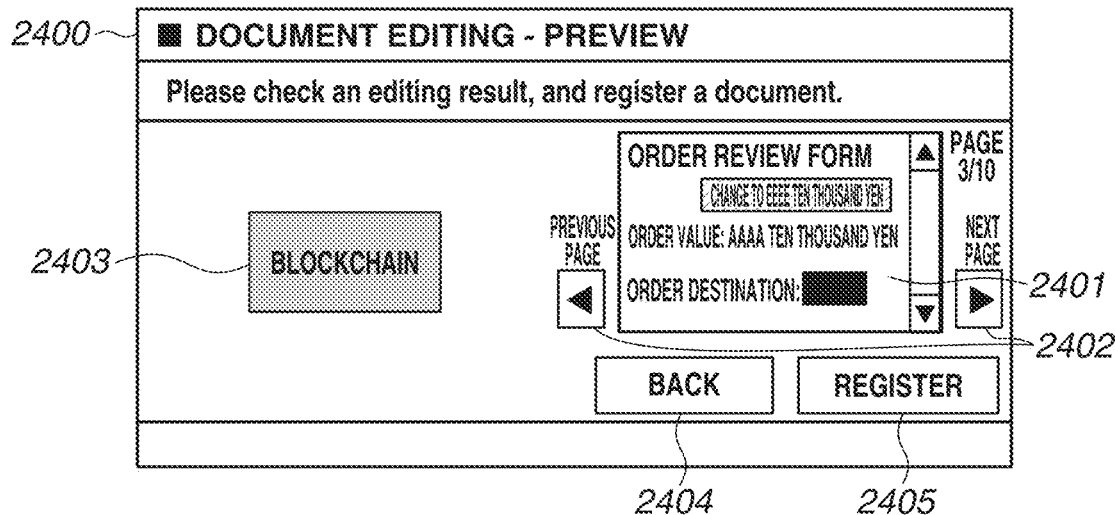
FIGS. 24A, 24B, 24C, and 24D are diagrams illustrating examples of preview screens for the document editing function of the application A.
Figure 24B:
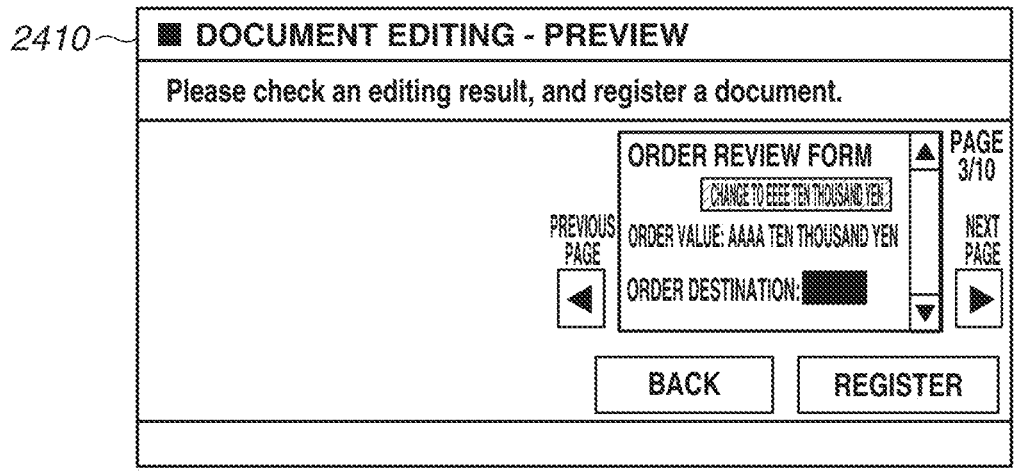
Figure 24C:
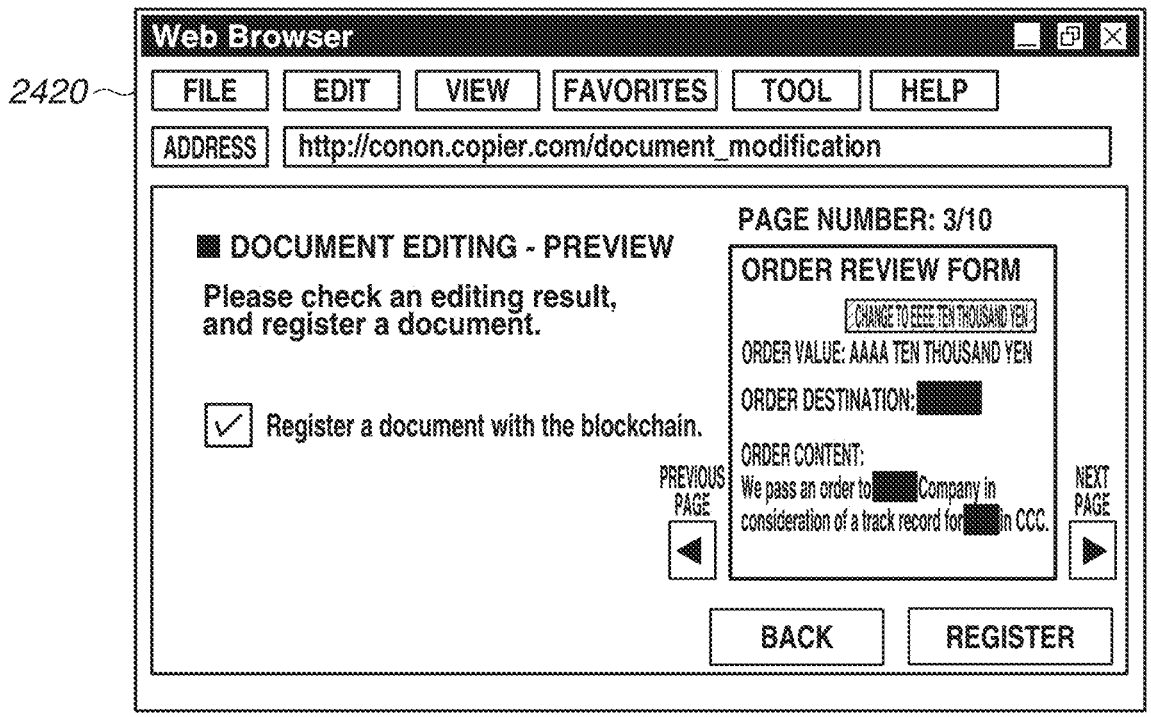
Figure 24D:
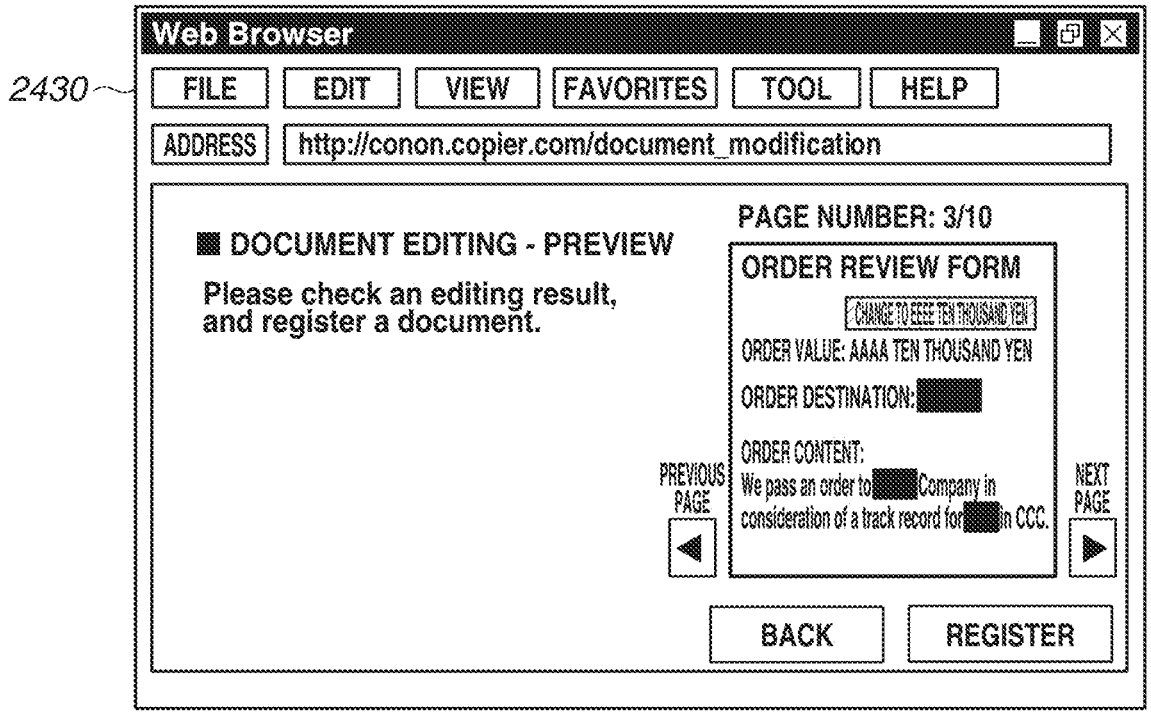

FIGS. 24A, 24B, 24C, and 24D illustrate examples of screens used for providing the function of registering a post-editing document (a document obtained after editing) generated as a result of document editing processing with the blockchain apparatus 111 and the document management apparatus 103, each of which application A 404 displays. A registration screen 2400 illustrated in FIG. 24A is a screen used for providing the function of registering a post-editing document with the blockchain apparatus 111 and the document management apparatus 103. A post-editing document display portion 2401 is a sub-screen for displaying a post-editing document to check an editing result. In response to a page selection button 2402 being pressed, a desired page is displayed in the post-editing document display portion 2401.

A blockchain button 2403 is a button used to select whether to register information about a post-editing document with the blockchain apparatus 111. When the blockchain button 2403 is currently selected, application A 404 registers information about a post-editing document with the blockchain apparatus 111, and, when the blockchain button 2403 is not currently selected, application A 404 does not register information about a post-editing document with the blockchain apparatus 111. A back button 2404 is a button used to cause application A 404 to go back to displaying of the editing method selection screen 1900. When the back button 2404 has been pressed, application A 404 displays the editing method selection screen 1900.

A register button 2405 is a button used to actually perform registration of a post-editing document with the blockchain apparatus 111 and the document management apparatus 103. When the register button 2405 has been pressed while the blockchain button 2403 is currently selected, application A 404 registers a post-editing document with the document management apparatus 103 and registers information about the post-editing document with the blockchain apparatus 111. In a case where the blockchain button 2403 is not currently selected, application A 404 registers a post-editing document with the document management apparatus 103 and does not register information about the post-editing document with the blockchain apparatus 111. When the register button 2405 has been pressed, application A 404 displays a standard dialog (not illustrated) for displaying a registration result.

A registration screen 2410 illustrated in FIG. 24B is a screen used for providing the function of registering a post-editing document with the blockchain apparatus 111 and the document management apparatus 103, and is a screen which is displayed to a user the role of which is "general user". Since, in the present exemplary embodiment, the "general user" does not have the authority of registering information about a post-editing document with the blockchain apparatus 111, the blockchain button 2403 is not displayed in the registration screen 2410, unlike the registration screen 2400.

A registration screen 2420 illustrated in FIG. 24C is a screen used for providing the function of registering a post-editing document with the blockchain apparatus 111 and the document management apparatus 103, and is a screen which is displayed in a web browser on the PC 102. When a back button has been pressed, application A 404 transitions to displaying of the editing method selection screen 1910. When a register button has been pressed, application A 404 displays a standard dialog (not illustrated) for displaying a registration result.

A registration screen 2430 illustrated in FIG. 24D is a screen used for providing the function of registering a post-editing document with the blockchain apparatus 111 and the document management apparatus 103, and is a screen which is displayed in a web browser on the PC 102 to a user the role of which is "general user".

FIG. 13 is a flowchart illustrating processing for registering information about a document with the blockchain apparatus 111 in the image forming apparatus 101. While, in the present exemplary embodiment, a case where the user uses the image forming apparatus 101 via the control unit 200 is described, the user can use the image forming apparatus 101 via a web browser on the PC 102. The present flowchart is started by the login button 703 being pressed in the authentication screen 700, and, is first executed by the CPU 201 serving as the user authentication processing unit 402.

At the time of starting of the present flowchart, a user name and a password entered by the user of the image forming apparatus 101 via the authentication screen 700 are passed to the user authentication processing unit 402. In step S1301, the user authentication processing unit 402 receives the user name and the password as a login request. In step S1302, the user authentication processing unit 402 checks whether the received user name and password match a user name and password included in the user information table shown in Table 1, and, if it is determined that the received user name and password match a user name and password included in the user information table (YES in step S1302), the user authentication processing unit 402 determines that the user authentication is successful and then advances the processing to step S1303. If it is determined that the received user name and password do not match a user name and password included in the user information table (NO in step S1302), the user authentication processing unit 402 determines that the user authentication is failed and then advances the processing to step S1314.

In step S1303, the user authentication processing unit 402 performs login processing to store the user name received in step S1301 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the document registration button included in the function selection buttons 901 is pressed by the user, and the subsequent processing is executed by the CPU 201 serving as application A 404.

Application A 404, which has taken over the processing, displays a screen in which function restriction is reflected based on a role of the currently logged-in user. Specifically, in a case where the user name of the logged-in user is "guest", since the corresponding role "guest user" is inhibited from performing BC registration, application A 404 displays, on the operation unit 209, the registration screen 1010, in which the document registration function with the blockchain apparatus 111 is restricted. In a case where the user name of the logged-in user is other than "guest", since the corresponding role is allowed to perform BC registration, application A 404 displays the registration screen 1000 on the operation unit 209.

In step S1314, application A 404 performs error processing to display, on the operation unit 209 via the operation unit I/F 205, the failure of user authentication or the absence of an authority to use the blockchain apparatus 111, and then ends the processing. In step S1304, application A 404 waits for the register button 1004 to be pressed in the registration screen 1000, and, if it is determined that the register button 1004 has been pressed (YES in step S1304), application A 404 advances the processing to step S1305. In step S1305, if it is determined that "scan" has been selected in the registration screen 1000 (YES in step S1305), application A 404 advances the processing to step S1306, and, if it is determined that "stored document" has been selected (NO in step S1305), application A 404 advances the processing to step S1308.

In step S1306, application A 404 performs scan processing on a paper document with use of the scanner 211. In step S1307, application A 404 generates an electronic document from data obtained by scanning in step S1306 according to the scan setting 1002, and temporarily stores the generated electronic document in the HDD 204. Application A 404 deletes such temporary data at the time of ending of the present flowchart.

In step S1308, in a case where the user name of the logged-in user is other than "guest" and the blockchain button 1003 has been selected in the registration screen 1000 (YES in step S1308), application A 404 advances the processing to step S1309. In a case where the user name of the logged-in user is "guest" or in a case where the user name of the logged-in user is other than "guest" but the blockchain button 1003 has not been selected in the registration screen 1000 (NO in step S1308), application A 404 advances the processing to step S1315.

In step S1309, application A 404 checks whether the user of the image forming apparatus 101 has authority to use the blockchain apparatus 111, and, if it is determined that the user has such authority (YES in step S1309), application A 404 advances the processing to step S1310, and, if it is determined that the user does not have such authority (NO in step S1309), application A 404 advances the processing to step S1314. Furthermore, in order to allow only a legitimate user of the image forming apparatus 101 to use the blockchain apparatus 111, a method in which the user is deemed to have authority in a case where the role of the user name held in step S1303 is not "guest user" can also be employed. Moreover, with regard to the authority to use the blockchain apparatus 111, a role exclusively used for blockchain can be prepared and the presence or absence of such authority can be determined based on the prepared role.

In step S1310, application A 404 calculates a hash value of the electronic document generated in step S1307. In step S1311, application A 404 requests the document management apparatus 103 to register the electronic document generated in step S1307, and, as a result, acquires an ID indicating an electronic document the registration of which has been completed and date and time information indicating the date and time at which registration was completed. While, until step S1311, the processing is performed by application A 404, in step S1312, the processing is performed by the blockchain application 406.

In step S1312, the blockchain application 406 registers the electronic document with the blockchain apparatus 111. Processing for registration with the blockchain apparatus 111 is described below with reference to FIG. 17. Here, values to be designated to the transaction 601 for registration and credential information are described.

The hash value calculated in step S1310 is designated as the document hash value 602. The ID representing the electronic document received in step S1311 is designated as the document identification information 603. A hash value of the credential information C 407 of the image forming apparatus 101 which has performed printing is designated as the registration device identification information 604. The date and time information representing the date and time at which registration was completed received in step S1311 is designated as the document registration date and time 605. A hash value of the user name of the user who is logged in to the image forming apparatus 101 in which a registration operation has been performed is designated as the document registrant 606. Furthermore, since, in the present flow, there is no source document, no value is designated as the source document hash value 607. Moreover, since the present flow is not directed to editing processing, no value is designated as the document editing information 608.

Application A 404 also passes the credential information A 408 to the blockchain application 406 in addition to the values to be designated to the transaction 601. The credential information A 408 is used by the blockchain application 406 to verify that a series of processing operations concerning registration is being performed by a legitimate application.

In step S1313, application A 404 acquires, from the blockchain application 406, a result of registration processing with the blockchain apparatus 111. In step S1315, application A 404 performs the same processing as that in step S1311, and then advances the processing to step S1316. In step S1316, application A 404 displays the result of registration processing acquired in step S1313 on the operation unit 209 via the operation unit I/F 205. In this respect, application A 404 displays, on a screen, information (not illustrated) about, for example, the success or failure of registration with the document management apparatus 103 or the success or failure of registration with the blockchain apparatus 111. After that, application A 404 ends the processing.

FIG. 14 is a flowchart illustrating processing for storing, in the image forming apparatus 101, an electronic document stored in the document management apparatus 103. While, in the present exemplary embodiment, a case where the user uses the image forming apparatus 101 via the control unit 200 is described, the user can use the image forming apparatus 101 via a web browser on the PC 102. The present flowchart is started in response to the login button 703 being pressed in the authentication screen 700, and is first executed by the CPU 201 serving as the user authentication processing unit 402.

At the time of starting of the present flowchart, a user name and a password entered by the user of the image forming apparatus 101 via the authentication screen 700 are passed to the user authentication processing unit 402. In step S1401, the user authentication processing unit 402 receives the user name and the password as a login request. In step S1402, the user authentication processing unit 402 checks whether the received user name and password match a user name and password included in the user information table shown in Table 1, and, if it is determined that the received user name and password match a user name and password included in the user information table (YES in step S1402), the user authentication processing unit 402 determines that the user authentication is successful and then advances the processing to step S1403. If it is determined that the received user name and password do not match a user name and password included in the user information table (NO in step S1402), the user authentication processing unit 402 determines that the user authentication is failed and then advances the processing to step S1411.

In step S1403, the user authentication processing unit 402 performs login processing to store the user name received in step S1401 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the registered document storage/printing button included in the function selection buttons 901 is pressed by the user, and the subsequent processing is executed by the CPU 201 serving as application A 404. Application A 404, which has taken over the processing, displays the registered document storage/printing screen 1100 on the operation unit 209.

In step S1404, application A 404 displays the registered document storage/printing screen 1100 illustrated in FIG. 11A on the operation unit 209 via the operation unit I/F 205 and waits for the store button 1103 to be pressed, and, if it is determined that the store button 1103 has been pressed (YES in step S1404), application A 404 advances the processing to step S1405. In step S1405, application A 404 acquires, from the document management apparatus 103, an electronic document selected in the document selection list 1101 displayed in the registered document storage/printing screen 1100. Application A 404 temporarily stores document information about the acquired electronic document in the RAM 203 and temporarily stores a document file of the acquired electronic document in the HDD 204.

While, until step S1405, the processing is performed by application A 404, in step S1406, the processing is performed by the blockchain application 406. In step S1406, the blockchain application 406 acquires a transaction 601 which holds, in the document identification information 603 thereof, an ID of the document information stored in the RAM 203. Such acquisition processing is described below with reference to FIG. 17.

Here, application A 404 passes the credential information A 408 to the blockchain application 406. The credential information A 408 is used by the blockchain application 406 to verify that a series of processing operations concerning acquisition of an electronic document is being performed by a legitimate application.

In step S1407, application A 404 determines whether the applicable transaction information has been acquired in step S1406. If it is determined that the applicable transaction information is not present (NO in step S1407), since the applicable transaction information is information which is not currently managed by the blockchain apparatus 111, application A 404 advances the processing to step S1410. If it is determined that the applicable transaction information is present (YES in step S1407), application A 404 advances the processing to step S1408.

In step S1408, application A 404 calculates a hash value of the document data stored in the HDD 204. In step S1409, application A 404 determines whether the calculated hash value is the same as the document hash value 602 of the transaction information acquired in step S1406. If it is determined that the respective hash values are not the same value (NO in step S1409), since the document file stored in the document management apparatus 103 is invalid data, application A 404 advances the processing to step S1411 for error display. If it is determined that the respective hash values are the same value (YES in step S1409), the application A 404 advances the processing to step S1410.

In step S1410, the application A 404 transfers and stores the document data temporarily stored in the HDD 204 in step S1405 to a legitimate storage location inside the HDD 204. While, in the present exemplary embodiment, a configuration in which the document data is stored in the HDD 204 of the image forming apparatus 101 is employed, a configuration in which a path of the storage destination is allowed to be designated in the registered document storage/printing screen 1100 and the document data is stored in the designated location can also be employed. In step S1411, the user authentication processing unit 402 performs error display indicating a case where acquisition processing is not allowed in the present flowchart. In this respect, the user authentication processing unit 402 displays an error dialog (not illustrated) on the screen. At this time, the user authentication processing unit 402 deletes the document file temporarily stored in the HDD 204.

Figure 15:
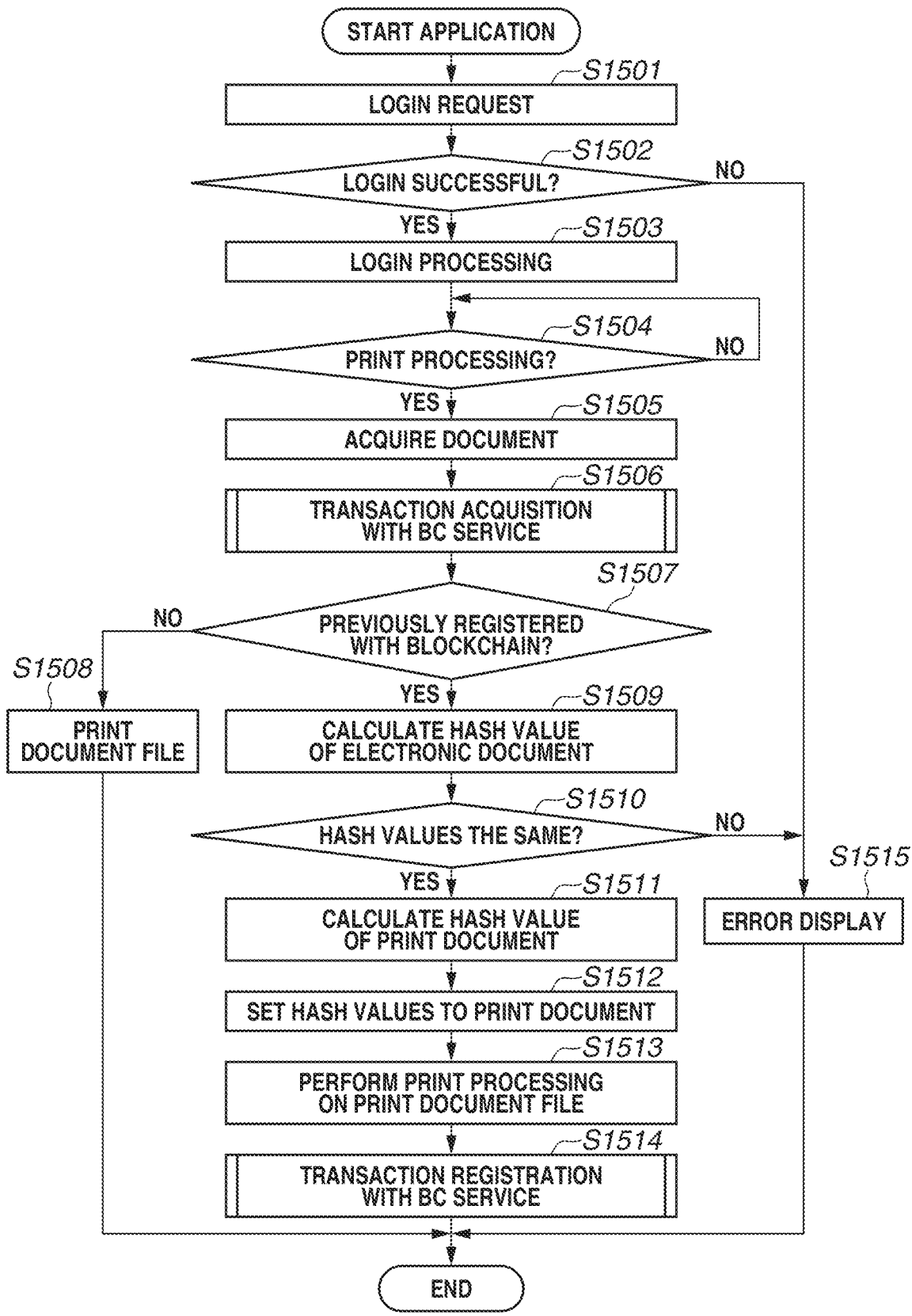
FIG. 15 is a flowchart illustrating processing for printing an electronic document by the image forming apparatus.

FIG. 15 is a flowchart illustrating processing for printing an electronic document, which is stored in the document management apparatus 103, by the image forming apparatus 101. While, in the present exemplary embodiment, a case where the user uses the image forming apparatus 101 via the control unit 200 is described, the user can use the image forming apparatus 101 via a web browser on the PC 102. The present flowchart is started in response to the login button 703 being pressed in the authentication screen 700, and is first executed by the CPU 201 serving as the user authentication processing unit 402.

At the time of starting of the present flowchart, a user name and a password entered by the user of the image forming apparatus 101 via the authentication screen 700 are passed to the user authentication processing unit 402. In step S1501, the user authentication processing unit 402 receives the user name and the password as a login request. In step S1502, the user authentication processing unit 402 checks whether the received user name and password match a user name and password included in the user information table shown in Table 1, and, if it is determined that the received user name and password match a user name and password included in the user information table (YES in step S1502), the user authentication processing unit 402 determines that the user authentication is successful and then advances the processing to step S1503. If it is determined that the received user name and password do not match a user name and password included in the user information table (NO in step S1502), the user authentication processing unit 402 determines that the user authentication is failed and then advances the processing to step S1515.

In step S1503, the user authentication processing unit 402 performs login processing to store the user name received in step S1501 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the registered document storage/printing button included in the function selection buttons 901 is pressed by the user, and the subsequent processing is executed by the CPU 201 serving as application A 404. Application A 404, which has taken over the processing, displays the registered document storage/printing screen 1100 on the operation unit 209.

In step S1504, application A 404 displays the registered document storage/printing screen 1100 illustrated in FIG. 11A on the operation unit 209 via the operation unit I/F 205 and waits for the print button 1102 to be pressed, and, if it is determined that the print button 1102 has been pressed (YES in step S1504), application A 404 advances the processing to step S1505. In step S1505, application A 404 acquires, from the document management apparatus 103, an electronic document selected in the document selection list 1101 displayed in the registered document storage/printing screen 1100. Application A 404 temporarily stores document information about the acquired electronic document in the RAM 203 and temporarily stores a document file of the acquired electronic document in the HDD 204.

While, until step S1505, the processing is performed by application A 404, in step S1506, the processing is performed by the blockchain application 406. In step S1506, the blockchain application 406 acquires a transaction 601 which holds, in the document identification information 603 thereof, an ID of the document information stored in the RAM 203. Such acquisition processing is described below with reference to FIG. 17. Here, application A 404 passes the credential information A 408 to the blockchain application 406. The credential information A 408 is used by the blockchain application 406 to verify that a series of processing operations concerning acquisition of an electronic document is being performed by a legitimate application.

In step S1507, application A 404 determines whether the applicable transaction information has been acquired in step S1506. If it is determined that the applicable transaction information is not present (NO in step S1507), since the applicable transaction information is not information which is not currently managed by the blockchain apparatus 111, application A 404 advances the processing to step S1508. If it is determined that the applicable transaction information is present (YES in step S1507), application A 404 advances the processing to step S1509. In step S1508, application A 404 performs print processing with the printer 210 to print the document data stored in the HDD 204 via the printer I/F 206 of the image forming apparatus 101.

In step S1509, application A 404 calculates a hash value of the document data stored in the HDD 204. In step S1510, application A 404 determines whether the calculated hash value is the same as the document hash value 602 of the transaction information acquired in step S1506. If it is determined that the respective hash values are not the same value (NO in step S1510), since the document file stored in the document management apparatus 103 is invalid data, application A 404 advances the processing to step S1515 for error display. If it is determined that the respective hash values are the same value (YES in step S1510), application A 404 advances the processing to step S1511.

In step S1511, application A 404 calculates a hash value to be set for a print document. Application A 404 calculates this hash value using the document hash value 602 of the transaction information acquired in step S1506, the credential information C 407 in the image forming apparatus 101 performing processing, and date and time information in the image forming apparatus 101 at the time of processing in this step. In step S1512, application A 404 sets the hash value representing a print document calculated in step S1511 and the document hash value 602 of the transaction information representing a source image into a file to be printed in step S1513. The format to be set in this step is a format which is scannable when a printed sheet of paper is scanned at the time of verification described below, and can be information which is able to be determined on a printed product as a two-dimensional barcode or can be information embedded as invisible information.

In step S1513, application A 404 performs print processing to cause the printer 210 to print the document file with the hash value set therein via the printer I/F 206 of the image forming apparatus 101.

While, until step S1513, the processing is performed by application A 404, in step S1514, the processing is performed by the blockchain application 406. In step S1514, the blockchain application 406 registers information about the print processing with the blockchain apparatus 111. This registration processing is described below with reference to FIG. 17. Here, values to be designated to the transaction 601 for registration are described.

The hash value of the print document calculated in step S1511 is designated as the document hash value 602, and the ID representing the electronic document received as an argument is designated as the document identification information 603. A hash value of the credential information C 407 of the image forming apparatus 101 which has performed printing is designated as the registration device identification information 604. The date and time information representing the date and time at which a hash value was searched for in step S1511 is designated as the document registration date and time 605. A hash value of the user name of the user who is logged in to the image forming apparatus 101 which has performed printing is designated as the document registrant 606. The document hash value 602 of transaction information representing a source image acquired in step S1506 is designated as the source document hash value 607. Furthermore, since the present flow is not directed to editing processing, no value is designated as the document editing information 608.

Here, application A 404 passes the credential information A 408 to the blockchain application 406. The credential information A 408 is used by the blockchain application 406 to verify that a series of processing operations concerning acquisition of an electronic document is being performed by a legitimate application. In step S1515, the user authentication processing unit 402 performs error display indicating a case where printing is not allowed in the present flowchart. In this respect, the user authentication processing unit 402 displays an error dialog (not illustrated) on the screen.

Figure 16:
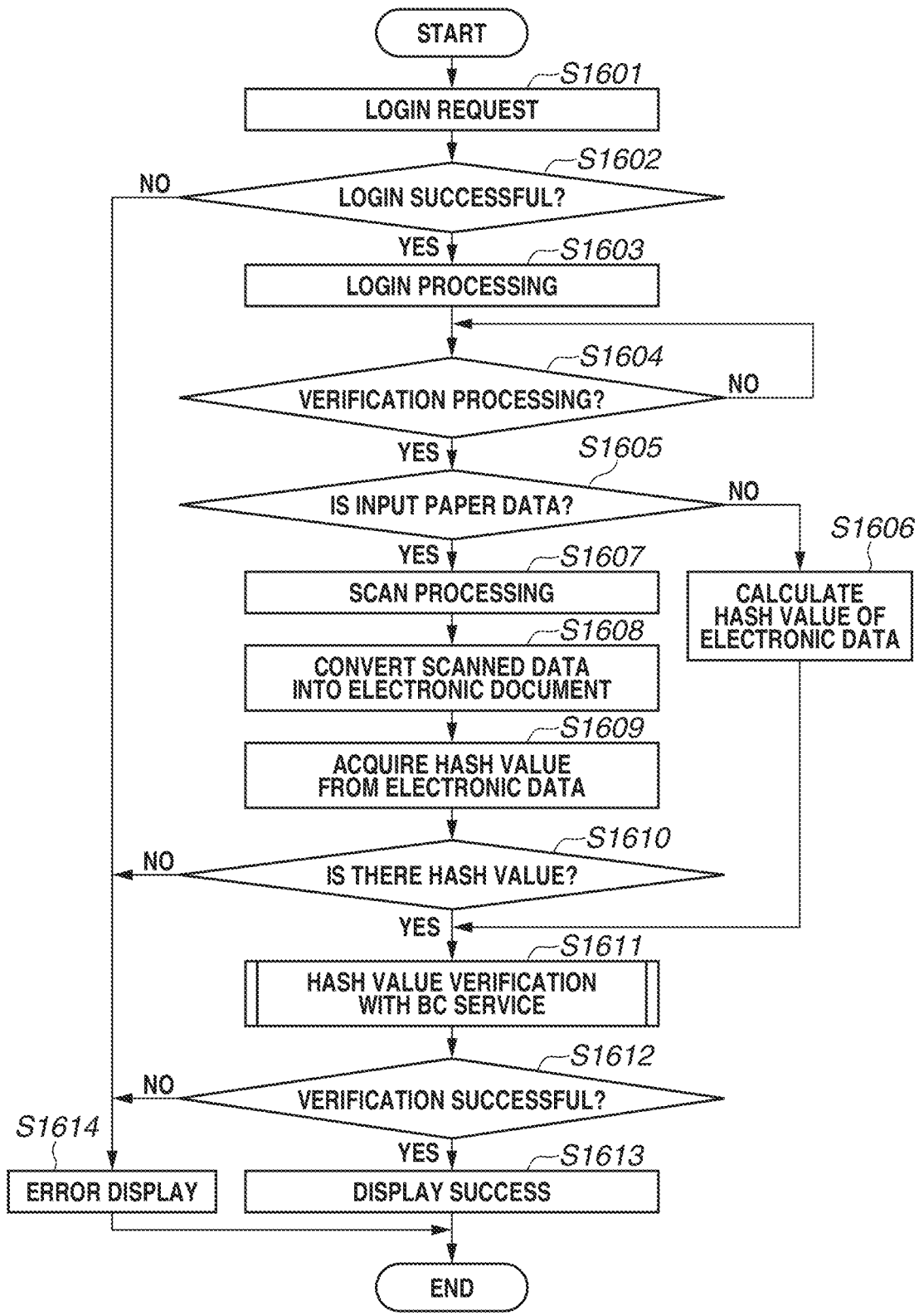
FIG. 16 is a flowchart illustrating processing for verifying an electronic document.

FIG. 16 is a flowchart illustrating processing for performing verification processing on a document file designated by the user or a printed paper document with the image forming apparatus 101. The present flowchart is started in response to the login button 703 or the guest login button 711 being pressed in the authentication screen 700 or 710 of the image forming apparatus 101 illustrated in FIG. 7A or 7B, and is first executed by the CPU 201 serving as the user authentication processing unit 402. At the time of starting of the present flowchart, a user name and a password entered by the user of the image forming apparatus 101 via the authentication screen 700 are passed to the user authentication processing unit 402.

In step S1601, the user authentication processing unit 402 receives the user name and the password as a login request. In step S1602, the user authentication processing unit 402 checks whether the received user name and password match a user name and password included in the user information table shown in Table 1, and, if it is determined that the received user name and password match a user name and password included in the user information table (YES in step S1602), the user authentication processing unit 402 determines that the user authentication is successful and then advances the processing to step S1603. If it is determined that the received user name and password do not match a user name and password included in the user information table (NO in step S1602), the user authentication processing unit 402 determines that the user authentication is failed and then advances the processing to step S1614. In step S1603, the user authentication processing unit 402 performs login processing to store the user name received in step S1601 as the currently logged-in user in the RAM 203, and then passes the processing to the local UI control unit 400. The local UI control unit 400, which has taken over the processing, displays the function selection screen 900 on the operation unit 209.

In the present flowchart, after that, in the function selection screen 900, the document verification button included in the function selection buttons 901 is pressed by the user, and the subsequent processing is executed by the CPU 201 serving as application A 404. Application A 404, which has taken over the processing, displays the document verification screen 1200 on the operation unit 209. In step S1604, application A 404 displays the document verification screen 1200 illustrated in FIG. 12A on the operation unit 209 via the operation unit I/F 205 and waits for the verify button 1203 to be pressed, and, if it is determined that the verify button 1203 has been pressed (YES in step S1604), application A 404 advances the processing to step S1605.

In step S1605, application A 404 determines whether the target data is paper data based on the value of the document selection setting 1201 received at the time of start-up. If it is determined that the target data is paper data (YES in step S1605), application A 404 advances the processing to step S1607, and, if it is determined that the target data is electronic data (NO in step S1605), application A 404 advances the processing to step S1606. In step S1606, application A 404 identifies the selected electronic data stored in the HDD 204 and then calculates a hash value of the electronic data. The calculated hash value represents a document targeted for verification, and is used for verification processing in step S1611.

In step S1607, application A 404 performs scan processing on a paper document set on the image forming apparatus 101. In the scan processing, application A 404 causes the scanner 211 to read the paper document via the scanner I/F 207, thus generating image data. In step S1608, application A 404 converts the image data generated by scanner 211 into electronic data, and then temporarily stores the electronic data in the HDD 204. Application A 404 deletes such temporary data at the time of ending of the present flowchart.

In step S1609, the blockchain application 406 acquires a hash value embedded in the electronic data stored in the HDD 204 in step S1608. In this acquisition processing, application A 404 performs processing for acquiring a hash value coordinating with the above-mentioned method in which a hash value is embedded in step S1512 in the printing flowchart described above with reference to FIG. 15. In step S1610, application A 404 determines whether a hash value has been acquired from the electronic data. If it is determined that there is a hash value (YES in step S1610), application A 404 advances the processing to step S1611, and, if it is determined that there is no hash value (NO in step S1610), application A 404 advances the processing to step S1614.

While, until step S1610, the processing is performed by application A 404, in step S1611, the processing is performed by the blockchain application 406. In step S1611, the blockchain application 406 performs document verification processing using transaction information recorded in the blockchain apparatus 111. The document verification processing is described below with reference to FIG. 17. At that time, the type of processing set as document verification, a document hash value calculated or acquired in step S1606 or step S1609, and the credential information A 408 are passed to the blockchain application 406. In step S1612, upon receiving a response indicating a result of the requested processing, application A 404 determines a verification result.

If it is determined that verification is successful (YES in step S1612), then in step S1613, application A 404 displays a standard dialog (not illustrated) displaying a message indicating that, for example, verification is successful. Moreover, if it is determined that verification is failed (NO in step S1612), then in step S1614, application A 404 displays a standard dialog (not illustrated) displaying a message indicating that verification is failed or verification is unable to be performed. After displaying the applicable message, application A 404 ends the present flowchart in response to an instruction to close the dialog being issued by the user.

FIG. 25 is a flowchart illustrating processing for performing editing of a document in the image forming apparatus 101 and registering information about the edited document with the blockchain apparatus 111. While, in the present exemplary embodiment, a case where the user uses the image forming apparatus 101 via the control unit 200 is described, the user can use the image forming apparatus 101 via a web browser on the PC 102. The present flowchart is started in response to the login button 703 being pressed in the authentication screen 700, and is first executed by the CPU 201 serving as the user authentication processing unit 402.

At the time of starting of the present flowchart, a user name and a password entered by the user of the image forming apparatus 101 via the authentication screen 700 are passed to the user authentication processing unit 402. In step S2501, the user authentication processing unit 402 receives the user name and the password as a login request. In step S2502, the user authentication processing unit 402 checks whether the received user name and password match a user name and password included in the user information table shown in Table 1, and, if it is determined that the received user name and password match a user name and password included in the user information table (YES in step S2502), the user authentication processing unit 402 determines that the user authentication is successful and then advances the processing to step S2503. If it is determined that the received user name and password do not match a user name and password included in the user information table (NO in step S2502), the user authentication processing unit 402 determines that the user authentication is failed and then advances the processing to step S2514.

In step S2503, the user authentication processing unit 402 performs login processing to store the user name received in step S2501 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the document editing button included in the function selection buttons 901 is pressed by the user, and the subsequent processing is performed by the CPU 201 serving as application A 404.

Furthermore, the document editing button included in the function selection buttons 901 is displayed only to a user having a role in which the function of executing "document editing—BC registration present" or "document editing—BC registration absent" is allowed. In the case of users other than such a user, since the document editing button is not displayed, the processing does not proceed to the present step and subsequent steps. Thus, in a case where the user name of the lobbed-in user is "guest", since "guest user", which is a corresponding role, is not allowed to perform any of "document editing—BC registration present" and "document editing—BC registration absent", application A 404 is not able to perform the present processing and subsequent processing operations. Application A 404, which has taken over the processing, displays the document editing screen 1800 on the operation unit 209.

In step S2504, application A 404 performs editing processing based on an instruction from the user. Details of the editing processing are described below. A post-editing document is generated as a result of editing processing, so that pre-editing and post-editing documents, information concerning editing processing, and information indicating whether the blockchain button 2403 is currently selected in the registration screen 2400 are acquired. Here, the information concerning editing processing includes information corresponding to the document editing information 608 and the credential information D 412 included in the editing module 411. In a case where editing processing is failed, error information is acquired.

In step S2505, application A 404 determines whether the editing processing performed in step S2504 is successful. In a case where error information has been acquired in step S2504, application A 404 determines that the editing processing is failed. If, as no error information has been acquired, it is determined that the editing processing is successful (YES in step S2505), application A 404 advances the processing to step S2506. If it is determined that the editing processing is failed (NO in step S2505), application A 404 advances the processing to step S2514.

In step S2506, in a case where the user name of the logged-in user is "user A" and the blockchain button 2403 has been selected in the registration screen 2400 (YES in step S2506), application A 404 advances the processing to step S2507. In a case where the user name of the logged-in user is "user B" or in a case where the user name of the logged-in user is "user A" and the blockchain button 2403 has not been selected in the registration screen 2400 (NO in step S2506), application A 404 advances the processing to step S2512. Here, in a case where the user name of the logged-in user is "user A", the "administrator", which is a corresponding role, is allowed to perform "document editing—BC registration present". On the other hand, in a case where the user name of the logged-in user is "user B", the "general user", which is a corresponding role, is inhibited from performing "document editing—BC registration present" but is allowed to perform "document editing—BC registration absent".

In step S2507, application A 404 checks whether the user of the image forming apparatus 101 has authority to register information about the edited document with the blockchain apparatus 111, and, if it is determined that the user has such authority (YES in step S2507), application A 404 advances the processing to step S2508, and, if it is determined that the user does not have such authority (NO in step S2507), application A 404 advances the processing to step S2514. Furthermore, in order to allow only a legitimate user of the image forming apparatus 101 to use the blockchain apparatus 111, a method in which the user is deemed to have authority in a case where the role of the user name held in step S2503 is not "guest user" can also be employed. Moreover, with regard to the authority to use the blockchain apparatus 111, a role exclusively used for blockchain can be prepared and the presence or absence of such authority can be determined based on the prepared role.

In step S2508, application A 404 acquires a hash value of the pre-editing document acquired in step S2504 and a hash value of the post-editing document generated in step S2504. The hash value of the pre-editing document to be acquired is a value calculated in step S2605 in a detailed flow described below of step S2504. The hash value of the post-editing document to be acquired is a post-editing document hash value 619 included in the document editing information 608 obtained in step S2504. Furthermore, application A 404 can calculate hash values of the respective documents anew in the present step.

In step S2509, application A 404 requests the document management apparatus 103 to register the post-editing document generated in step S2504, and then acquires, as a result, an ID indicating an electronic document the registration of which has been completed and date and time information indicating the date and time at which registration was completed. While, until step S2509, the processing is performed by application A 404, in step S2510, the processing is performed by the blockchain application 406.

In step S2510, the blockchain application 406 registers the post-editing document with the blockchain apparatus 111. Processing for registration with the blockchain apparatus 111 is described below with reference to FIG. 17. Here, values to be designated to the transaction 601 for registration and credential information are described. The hash value of the post-editing document calculated in step S2508 is designated as the document hash value 602. The ID indicating the post-editing document received in step S2509 is designated as the document identification information 603. A hash value of the credential information C 407 of the image forming apparatus 101 which has performed printing is designated as the registration device identification information 604. The date and time information indicating the date and time at which registration was completed received in step S2509 is designated as the document registration date and time 605.

A hash value of the user name of the user who is logged in to the image forming apparatus 101 in which a registration operation has been performed is designated as the document registrant 606. The hash value of the post-editing document calculated in step S2508 is designated as the source document hash value 607. The document editing information generated in step S2504 is designated as the document editing information 608. The document editing information 608 is assigned a signature by the editing module 411 and is, therefore, not able to be tampered. Moreover, even if a value different from the hash value of a document actually targeted for editing is registered as the document hash value 602 or the source document hash value 607, such a registered value is inconsistent with the content of the document editing information 608. Therefore, even if, due to an invalid operation, application A 404 tries to register a document hash value 602 or source document hash value 607 of a different document as a post-editing or pre-editing document, the blockchain application 406 is able to detect such an invalid registration.

Application A 404 also passes the credential information A 408 to the blockchain application 406 in addition to the values to be designated to the transaction 601. The credential information A 408 is used by the blockchain application 406 to verify that a series of processing operations concerning editing is being performed by a legitimate application. Application A 404 also passes the credential information D 412 acquired in step S2504 to the blockchain application 406. The credential information D 412 is used by the blockchain application 406 to verify that the editing processing itself is being performed by a legitimate editing module.

In step S2511, application A 404 acquires, from the blockchain application 406, a result of registration processing with the blockchain apparatus 111. In step S2512, application A 404 performs the same processing as that in step S2509, and then advances the processing to step S2513. In step S2513, application A 404 displays the result of registration of the editing processing result acquired in step S2511 on the operation unit 209 via the operation unit I/F 205. In this respect, application A 404 displays, on a screen, information (not illustrated) about, for example, the success or failure of registration with the document management apparatus 103 or the success or failure of registration with the blockchain apparatus 111. After that, application A 404 ends the processing.

When having advanced the processing to step S2514, application A 404 displays, on the operation unit 209 via the operation unit I/F 205, any one of the failure of user authentication, the failure of editing processing, and the absence of an authority to use the blockchain apparatus 111 as a reason for error processing, and then ends the processing. At the time of ending of the present flow, application A 404 deletes information related to editing processing temporarily stored in the HDD 204.

Figure 26:
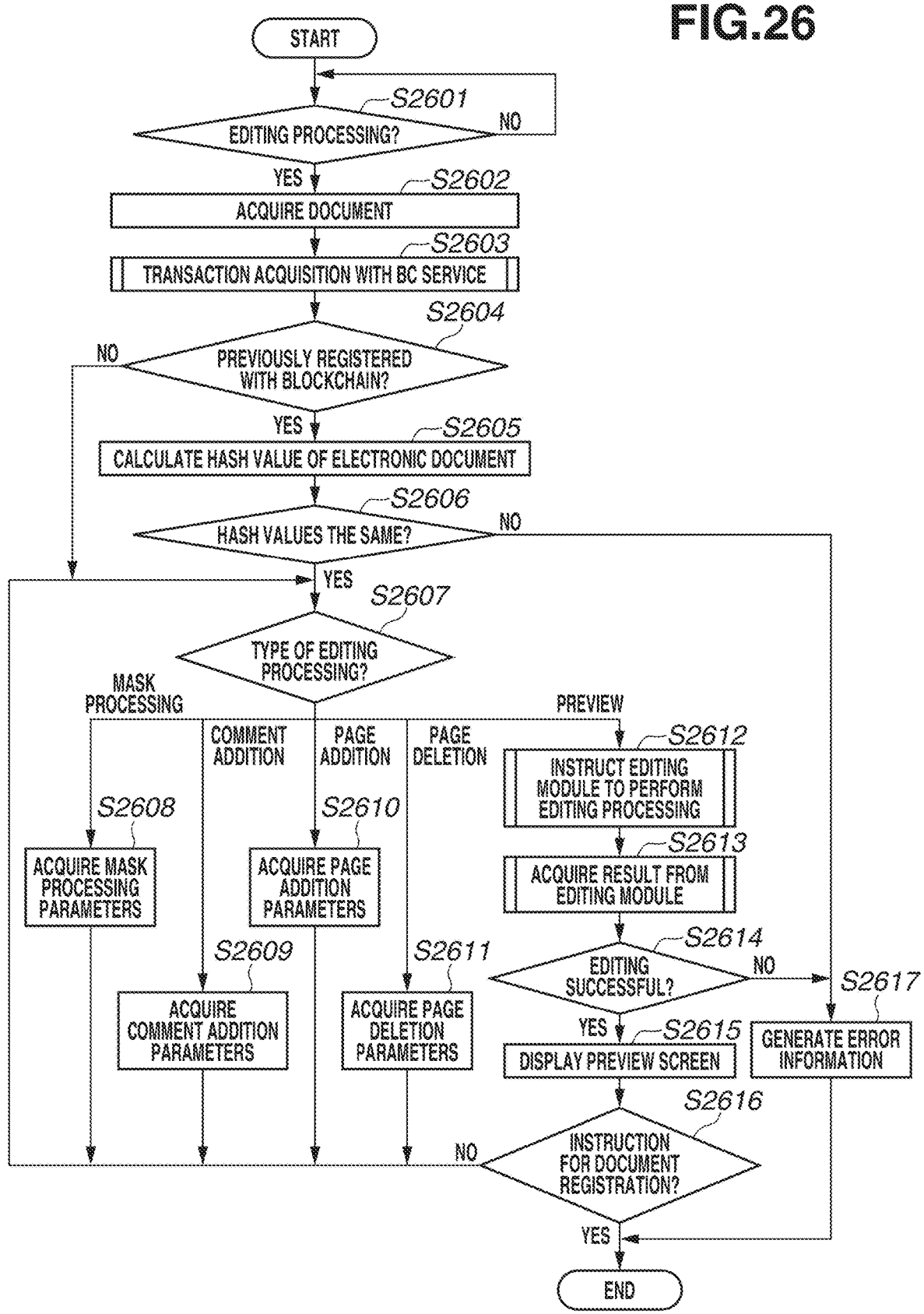
FIG. 26 is a flowchart illustrating the details of a main processing portion of the processing for editing an electronic document.

Details of step S2504 in the flowchart of FIG. 25 are described with reference to FIG. 26. The present flow is first performed by the CPU 201 serving as application A 404. In step S2601, application A 404 displays an editing screen 1800 illustrated in FIG. 18A on the operation unit 209 via the operation unit I/F 205, waits for the edit button 1802 to be pressed, and, when the edit button 1802 has been pressed (YES in step S2601), advances the processing to step S2602.

In step S2602, application A 404 acquires, from the document management apparatus 103, an electronic document selected from the document selection list 1801 in the editing screen 1800. Application A 404 temporarily stores document information about the acquired electronic document in the RAM 203 and a document file of the acquired electronic document in the HDD 204. The present exemplary embodiment includes a configuration in which a source document generated by scanning an original with the image forming apparatus 101 is included in electronic documents stored in the document management apparatus 103 and editing is performed on the source document. While, until step S2602, the processing is performed by application A 404, in step S2603, the processing is performed by the blockchain application 406.

In step S2603, the blockchain application 406 acquires a transaction 601 which holds, in the document identification information 603 thereof, an ID of the document information stored in the RAM 203. Such acquisition processing is described below with reference to FIG. 17. Here, application A 404 passes the credential information A 408 to the blockchain application 406. The credential information A 408 is used by the blockchain application 406 to verify that a series of processing operations concerning acquisition of an electronic document is being performed by a legitimate application.

In step S2604, application A 404 resumes the processing and determines whether the applicable transaction information has been acquired in step S2603. If it is determined that the applicable transaction information is not present (NO in step S2604), since the applicable transaction information is information which is not currently managed by the blockchain apparatus 111, application A 404 advances the processing to step S2607. If it is determined that the applicable transaction information is present (YES in step S2604), application A 404 advances the processing to step S2605.

In step S2605, application A 404 calculates a hash value of the document data stored in the HDD 204. In step S2606, application A 404 determines whether the calculated hash value is the same as the document hash value 602 of the transaction information acquired in step S2603. If it is determined that the respective hash values are not the same value (NO in step S2606), since the document file stored in the document management apparatus 103 is invalid data, application A 404 advances the processing to step S2617 for generation of error information. If it is determined that the respective hash values are the same value (YES in step S2606), application A 404 advances the processing to step S2607.

In step S2607, application A 404 displays the editing method selection screen 1900 illustrated in FIG. 19A on the operation unit 209 via the operation unit I/F 205, waits for a button included in the editing method selection buttons 1901 to be pressed, and advances the processing to a step corresponding to the pressed button. In a case where the mask button 1902 has been pressed (MASK PROCESSING in step S2607), application A 404 advances the processing to step S2608. In a case where the comment addition button 1903 has been pressed (COMMENT ADDITION in step S2607), application A 404 advances the processing to step S2609. In a case where the page addition button 1904 has been pressed (PAGE ADDITION in step S2607), application A 404 advances the processing to step S2610. In a case where the page deletion button 1905 has been pressed (PAGE DELETION in step S2607), application A 404 advances the processing to step S2611. In a case where the preview button 1906 has been pressed (PREVIEW in step S2607), application A 404 advances the processing to step S2612.

In step S2608, application A 404 displays the mask processing screen 2000 illustrated in FIG. 20A on the operation unit 209 via the operation unit I/F 205, and waits for the cancel button 2006 or the confirmation button 2007 to be pressed. In the editing target document display portion 2001, application A 404 can display a source document, or, in a case where there is a preview document stored in the HDD 204, can display the preview document. Generation of the preview document is described below.

In a case where the cancel button 2006 has been pressed, application A 404 does not perform any processing and then returns the processing to step S2607. In a case where the confirmation button 2007 has been pressed, application A 404 generates editing work information that is based on a user instruction issued in the mask processing screen 2000 and stores the generated editing work information in the RAM 203. Details of the editing work information are described below. Moreover, application A 404 can generate a preview document obtained by performing provisional editing processing that is based on the editing work information and store the generated preview document in the HDD 204. Then, application A 404 returns the processing to step S2607.

In step S2609, application A 404 displays the comment addition processing screen 2100 illustrated in FIG. 21A on the operation unit 209 via the operation unit I/F 205, and waits for the cancel button 2106 or the confirmation button 2107 to be pressed. In the editing target document display portion 2101, application A 404 can display a source document, or, in a case where there is a preview document stored in the HDD 204, can display the preview document.

In a case where the cancel button 2106 has been pressed, application A 404 does not perform any processing and then returns the processing to step S2607. In a case where the confirmation button 2107 has been pressed, application A 404 generates editing work information that is based on a user instruction issued in the comment addition processing screen 2100 and stores the generated editing work information in the RAM 203. Details of the editing work information are described below. Moreover, application A 404 can generate a preview document obtained by performing provisional editing processing that is based on the editing work information and store the generated preview document in the HDD 204. Then, application A 404 returns the processing to step S2607.

In step S2610, application A 404 displays the page insertion processing screen 2200 illustrated in FIG. 22A on the operation unit 209 via the operation unit I/F 205, and waits for the cancel button 2206 or the confirmation button 2207 to be pressed. In the editing target document display portion 2201, application A 404 can display a source document, or, in a case where there is a preview document stored in the HDD 204, can display the preview document.

In a case where the cancel button 2206 has been pressed, application A 404 does not perform any processing and then returns the processing to step S2607. In a case where the confirmation button 2207 has been pressed, application A 404 generates editing work information that is based on a user instruction issued in the page insertion processing screen 2200 and stores the generated editing work information in the RAM 203. Details of the editing work information are described below. Moreover, application A 404 can generate a preview document obtained by performing provisional editing processing that is based on the editing work information and store the generated preview document in the HDD 204. Then, application A 404 returns the processing to step S2607.

In step S2611, application A 404 displays the page deletion processing screen 2300 illustrated in FIG. 23A on the operation unit 209 via the operation unit IN 205, and waits for the cancel button 2305 or the confirmation button 2306 to be pressed. In the editing target document display portion 2301, application A 404 can display a source document, or, in a case where there is a preview document stored in the HDD 204, can display the preview document.

In a case where the cancel button 2305 has been pressed, application A 404 does not perform any processing and then returns the processing to step S2607. In a case where the confirmation button 2306 has been pressed, application A 404 generates editing work information that is based on a user instruction issued in the page deletion processing screen 2300 and stores the generated editing work information in the RAM 203. Details of the editing work information are described below. Moreover, application A 404 can generate a preview document obtained by performing provisional editing processing that is based on the editing work information and store the generated preview document in the HDD 204. Then, application A 404 returns the processing to step S2607.

Here, an example of the editing work information to be stored is shown in Table 5.

TABLE 5

| Editing ID | Source document editing target page | Edited document editing target page | Editing content | Position (upper left X-coordinate, upper left Y-coordinate, width, height) | Character string/ Insertion document |
|---|---|---|---|---|---|
| 1 | P.3 | P.3 | Mask processing | 115 mm, 120 mm, 16 mm, 4 mm | BBBB |
| 2 | P.3 | P.3 | Comment addition | 120 mm, 60 mm, 36 mm, 4 mm | Change to EEEE ten thousand yen |
| 3 | — | P.4 | Insertion processing | — | Document B |
| 4 | P.4 | — | Deletion processing | — | — |

Table 5 represents essentially the same editing processing as Table 4, but differs from Table 4 in that the column "number of characters" is changed to the column "character string/insertion document". The editing work information is information used for actually performing editing work, and includes specific character string information and information about an insertion document. The row the editing ID of which in Table 5 is "1" represents mask processing parameters generated via the mask processing screen 2000 in step S2608.

Unlike Table 4, the row the editing ID of which in Table 5 is "1" has "BBBB", which is specific character string information targeted for mask processing, in the column "character string/insertion document". The row the editing ID of which in Table 5 is "2" represents comment addition processing parameters generated via the comment addition processing screen 2100 in step S2609. Unlike Table 4, the row the editing ID of which in Table 5 is "2" has "change to EEEE ten thousand yen", which is specific character string information about a comment to be added, in the column "character string/insertion document". The row the editing ID of which in Table 5 is "3" represents page insertion processing parameters generated via the page insertion processing screen 2200 in step S2610. Unlike Table 4, the row the editing ID of which in Table 5 is "3" has "document B", which is specific information about a document serving as an insertion source, in the column "character string/insertion document". The row the editing ID of which in Table 5 is "4" represents page deletion processing parameters generated via the page deletion processing screen 2300 in step S2611. Because of deletion, the row the editing ID of which in Table 5 is "4" has no information in the column "character string/insertion document".

Next, step S2612 is described. In step S2612, application A 404 instructs the editing module 411 to perform actual editing processing. Specifically, application A 404 transmits, to the editing module 411, document data targeted for editing stored in the HDD 204 and editing work information stored in the RAM 203. Moreover, application A 404 also transmits, to the editing module 411, information indicating whether a document targeted for editing is currently registered with the blockchain apparatus 111 and information about a hash value of the user name of a user who is logged in. Details of editing processing performed in the editing module 411 are described below.

In step S2613, application A 404 acquires an editing result. In a case where editing is successful, application A 404 acquires a post-editing document, the document editing information 608, and the credential information D 412. Application A 404 temporarily stores these pieces of information in the HDD 204. In a case where editing is failed, application A 404 acquires error information.

In step S2614, application A 404 determines whether editing is successful. In a case where application A 404 has acquired the post-editing document and the other pieces of information in step S2613 (YES in step S2614), application A 404 advances the processing to step S2615. In a case where application A 404 has acquired error information in step S2613 (NO in step S2614), application A 404 advances the processing to step S2617.

In step S2615, application A 404 displays the preview screen 2400 illustrated in FIG. 24A or the preview screen 2410 illustrated in FIG. 24B on the operation unit 209 via the operation unit I/F 205. Then, application A 404 waits for the back button 2404 or the register button 2405 to be pressed. When any of the back button 2404 and the register button 2405 has been pressed, application A 404 advances the processing to step S2616. Application A 404 displays, as a preview screen, a screen in which a function restriction is reflected based on a role of the user who is logged in. In a case where "document editing—BC registration present" is allowed in the role of the user who is logged in, application A 404 displays the preview screen 2400. In the other cases, since BC registration is impossible, application A 404 displays the preview screen 2410.

In step S2616, application A 404 determines whether, in step S2615, the back button 2404 has been pressed or the register button 2405 has been pressed. If it is determined that the back button 2404 has been pressed (NO in step S2616), application A 404 returns the processing to step S2607 so as to enable performing correction of the editing content. Moreover, at this time, application A 404 deletes the editing result stored in the HDD 204, which has been acquired from the editing module 411. If it is determined that the register button 2405 has been pressed (YES in step S2616), application A 404 ends the present flow. In step S2617, application A 404 generates, as the error information, error information indicating failure of the editing processing, and then ends the present flow.

Figure 27:
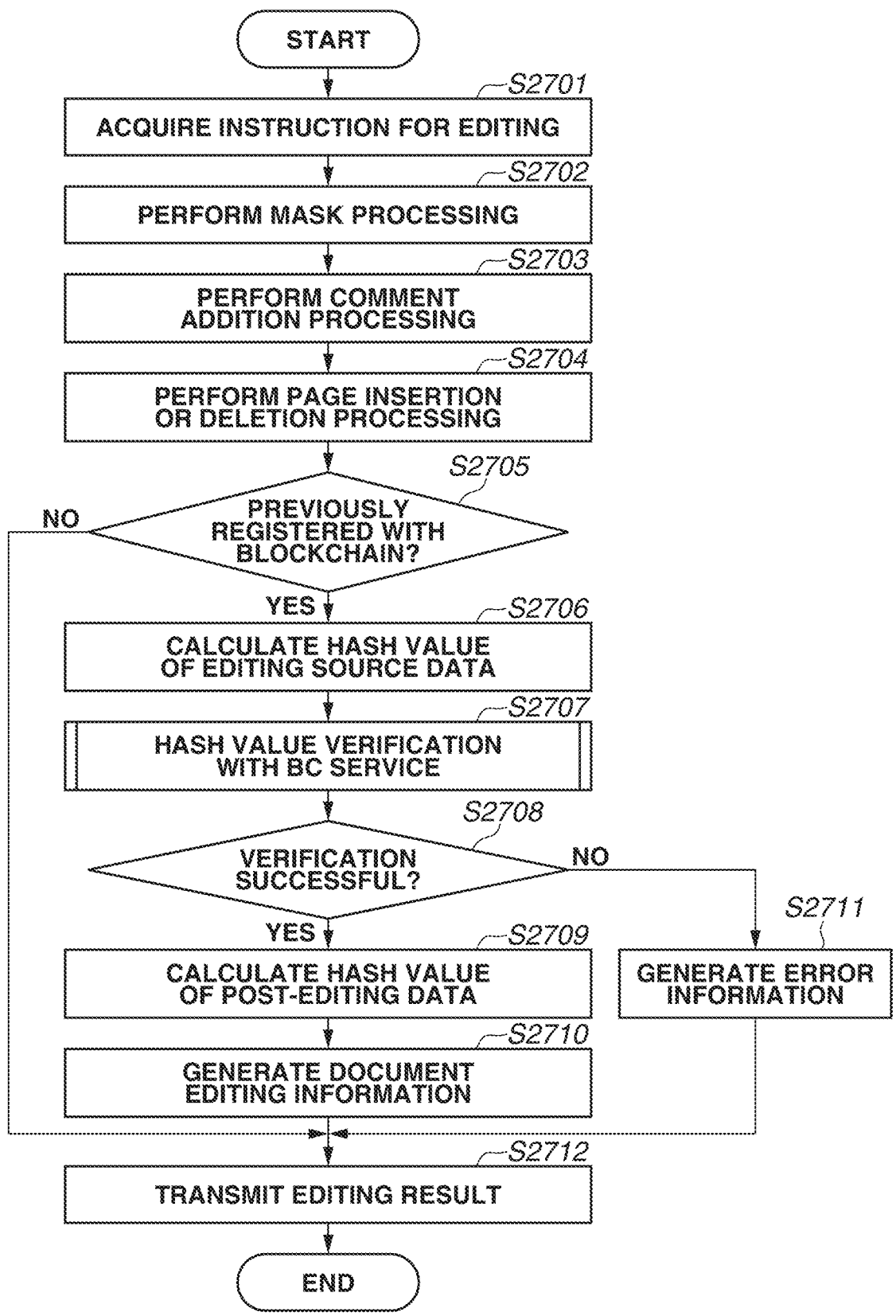
FIG. 27 is a flowchart illustrating processing for performing editing in the processing for editing an electronic document.

Next, editing processing performed in the editing module 411 is described with reference to the flowchart of FIG. 27. The present flowchart is started as the editing module 411 in response to an editing instruction being issued from application A 404, and is first executed by the CPU 201.

First, in step S2701, the editing module 411 acquires document data targeted for editing and the editing work information from application A 404. Moreover, the editing module 411 also acquires information indicating whether a document targeted for editing is currently registered with the blockchain apparatus 111 and information about a hash value of the user name of a user who is logged in. The editing module 411 temporarily stores the acquired pieces of data and information in the HDD 204. Alternatively, the editing module 411 can be configured to acquire, from application A 404, file path information on the HDD 204 in which information to be acquired is stored and use the acquired file path information.

Next, in step S2702, the editing module 411 performs mask processing on the document data targeted for editing based on the editing work information. In a case where an instruction for mask processing is not included in the editing work information, the editing module 411 does not perform mask processing. For example, when having received an editing work instruction such as that shown in Table 5, first, the editing module 411 searches for a row the column "editing content" of which is "mask processing". In the present example, the row the column "editing ID" of which is "1" is an applicable row. Next, the editing module 411 performs mask processing based on the content of the found row. In the present example, the editing module 411 adds a blacked-out region to page 3 of the document data targeted for editing. The blacked-out region is a rectangular region with an upper left X-coordinate of 115 mm, an upper left Y-coordinate of 120 mm, a width of 16 mm, and a height of 4 mm.

Next, in step S2703, the editing module 411 performs comment addition processing on the document data processed in step S2702, based on the editing work information. In a case where an instruction for comment addition processing is not included in the editing work information, the editing module 411 does not perform comment addition processing. For example, when having received an editing work instruction such as that shown in Table 5, first, the editing module 411 searches for a row the column "editing content" of which is "comment addition". In the present example, the row the column "editing ID" of which is "2" is an applicable row. Next, the editing module 411 performs comment addition processing based on the content of the found row. In the present example, the editing module 411 adds a comment to page 3 of the document data targeted for editing. The content of the comment is "change to EEEE ten thousand yen", and the added region is a rectangular region with an upper left X-coordinate of 120 mm, an upper left Y-coordinate of 60 mm, a width of 36 mm, and a height of 4 mm.

Additionally, in step S2704, the editing module 411 performs page insertion or deletion processing on the document data processed in step S2703, based on the editing work information. In a case where an instruction for page insertion or deletion processing is not included in the editing work information, the editing module 411 does not perform page insertion or deletion processing.

For example, when having received an editing work instruction such as that shown in Table 5, first, the editing module 411 searches for a row the column "editing content" of which is "insertion processing". In the present example, the row the column "editing ID" of which is "3" is an applicable row. Next, the editing module 411 performs insertion processing based on the content of the found row. In the present example, first, the editing module 411 acquires "document B", which is a document to be inserted. Then, the editing module 411 inserts "document B" as page 4 of the document data targeted for editing. This insertion processing causes page 4 of the processing target document to become page 5 and also increments page numbers of subsequent pages thereof one by one. The editing module 411 stores a correspondence relationship between the number of pages of the processing target document and the number of pages of the document obtained by insertion processing in the RAM 203. Next, the editing module 411 searches for a row the column "editing content" of which is "deletion processing". In the present example, the row the column "editing ID" of which is "4" is an applicable row. Next, the editing module 411 performs deletion processing based on the content of the found row. In the present example, while page 4 of the processing target document is to be deleted, the editing module 411 calculates that the deletion target page is page 5, from the page relationship information about documents obtained before and after insertion processing stored in the RAM 203. Then, the editing module 411 deletes page 5.

With the processing performed until step S2704, editing work on the document targeted for editing ends, so that a post-editing document is generated. The editing module 411 stores the post-editing document in the HDD 204. Next, in step S2705, the editing module 411 determines whether a document targeted for editing processing is currently registered with the blockchain apparatus 111, based on information acquired from application A 404. If it is determined that a document targeted for editing processing is currently registered with the blockchain apparatus 111 (YES in step S2705), the editing module 411 advances the processing to step S2706 and subsequent steps to generate information for registering editing processing with the blockchain apparatus 111. If it is determined that no document targeted for editing processing is currently registered with the blockchain apparatus 111 (NO in step S2705), the editing module 411 advances the processing to step S2712.

In step S2706, the editing module 411 calculates a hash value of the document acquired from application A 404 so as to verify whether the document targeted for editing is really a document which is currently registered with the blockchain apparatus 111.

While, until step S2706, the processing is performed by the editing module 411, in step S2707, the processing is performed by the blockchain application 406. In step S2707, the blockchain application 406 performs document verification processing using transaction information recorded in the blockchain apparatus 111. The document verification processing is described below with reference to FIG. 17. At that time, the type of processing set as document verification, a document hash value calculated in step S2706, and the credential information D 412 are passed to the blockchain application 406. In step S2708, upon receiving a response indicating a result of the requested processing, the editing module 411 determines a verification result. If it is determined that verification is successful (YES in step S2708), the editing module 411 advances the processing to step S2709. Moreover, if it is determined that verification is failed (NO in step S2708), the editing module 411 advances the processing to step S2711.

In step S2709, the editing module 411 calculates a hash value of the post-editing document generated in step S2704 and stored in the HDD 204 so as to prepare for generation of the document editing information 608. Next, in step S2710, the editing module 411 generates the document editing information 608. Here, information which is designated as each element of the document editing information 608 is described.

The editing module identification information 614 stores a hash value of the credential information D 412 as information for identifying the editing module 411. The editing date and time 615 stores a value of the date and time at which the present step is being performed as information representing a point of time at which a document was edited. The editor information 616 stores a hash value of the user name acquired from application A 404 as information representing a user who performed document editing.

The editing detail 617 stores information obtained by abstracting the editing work information into editing details as information indicating what editing processing was performed to change a source document into a post-editing electronic document targeted for transaction. In the present example, the editing module 411 abstracts the content of editing work information shown in Table 5 into editing details shown in Table 4 and stores the editing results. The editing module 411 performs abstraction processing by converting the column "character string/insertion document" into the column "number of characters". Thus, the editing module 411 converts a specific character string in the column "character string/insertion document" into the number of characters and deletes the name of an insertion document. The pre-editing document hash value 618 stores the hash value calculated in step S2706 as a hash value of a document serving as an editing source. The post-editing document hash value 619 stores the hash value calculated in step S2709 as a hash value of a document obtained after editing.

In step S2711, since the verification of the source document is failed, the editing module 411 generates error information indicating that editing is failed. Finally, in step S2712, in a case where the processing has come from step S2710, the editing module 411 transmits the post-editing document, the document editing information 608, and the credential information D 412 to application A 404. In a case where the processing has come from step S2711, the editing module 411 transmits the error information to application A 404. Then, the editing module 411 deletes data temporarily stored in the HDD 204, and then ends the present flow.

Figure 17:
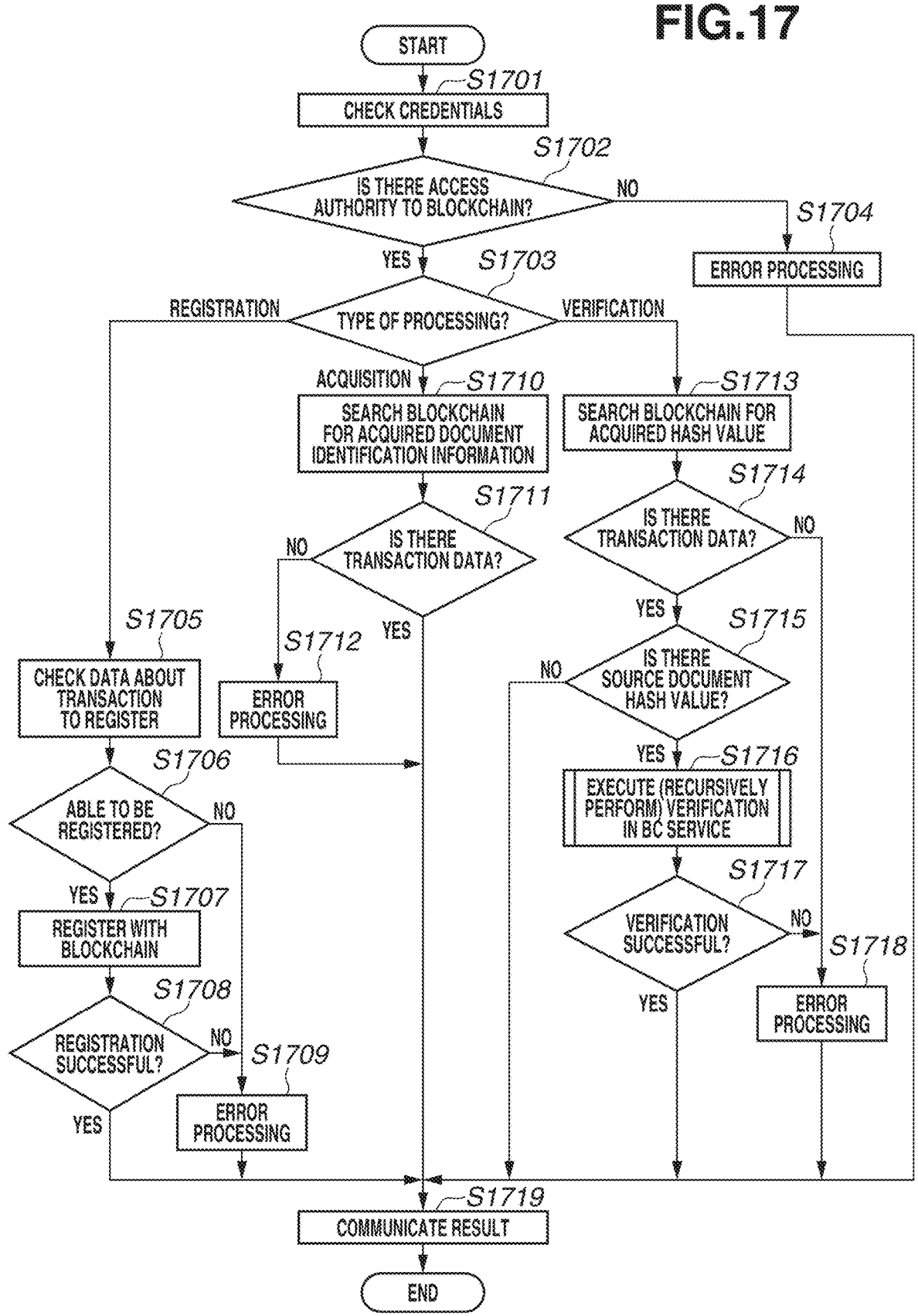
FIG. 17 is a flowchart illustrating transaction processing on the blockchain apparatus.

FIG. 17 is a flowchart illustrating transaction processing which the blockchain application 406 of the image forming apparatus 101 performs on the blockchain apparatus 111. The present flowchart is activated and executed by the CPU 201 serving as the blockchain application 406 during processing operations performed by application A 404 illustrated in FIG. 13 to FIG. 16, FIG. 25, and FIG. 26 or during a processing operation performed by the editing module 411 illustrated in FIG. 27.

At the time of starting of the present flowchart, the blockchain application 406 receives, from application A 404 or the editing module 411, the type of processing to be performed on the blockchain apparatus 111 and information required for each type of processing. The information required for each type of processing is the transaction 601 at the time of transaction registration, is the document hash value 602 required to be verified at the time of document verification, and is the document identification information 603 at the time of transaction acquisition.

In step S1701, when invoked from application A 404, the blockchain application 406 passes the credential information C 407 and the credential information A 408 to the blockchain apparatus 111. Then, the blockchain application 406 checks the correctness of such credential information. Moreover, when invoked from the flow illustrated in FIG. 25 and performing registration of the editing processing result, the blockchain application 406 passes the credential information D 412 to the blockchain apparatus 111. Then, the blockchain application 406 checks the correctness of such credential information.

Here, the credential information C 407 to be used is the one acquired from the credential information management unit 410 at the time of starting of the blockchain application 406, and the credential information A 408 to be used is the one acquired from application A 404. The credential information D 412 to be used is the one acquired via application A 404. Confirming that the service is trusted by the blockchain service in this way enables ensuring that a stored document is correct and/or correct editing has been performed from a source document.

In step S1701, when invoked from the editing module 411, the blockchain application 406 passes the credential information D 412 and the credential information A 408 to the blockchain apparatus 111. Then, the blockchain application 406 checks the correctness of such credential information. Here, the credential information C 407 to be used is the one acquired from the credential information management unit 410 at the time of starting of the blockchain application 406, and the credential information D 412 to be used is the one acquired from the editing module 411.

In step S1702, the blockchain application 406 determines whether the credential information checked in step S1701 is correct credential information. With respect to determination as to whether the checked credential information is correct credential information, in a case where the credential information is a digital certificate, when the certificate is verified and verification is successful, the blockchain application 406 determines that the checked credential information is correct credential information. Moreover, in a case where the credential information is a predetermined data value, when the values match each other, the blockchain application 406 determines that the checked credential information is correct credential information. If it is determined that the checked credential information is correct credential information, since there is an authority to access the blockchain apparatus 111 (YES in step S1702), the blockchain application 406 advances the processing to step S1703, and, if it is determined that the checked credential information is not correct credential information (NO in step S1702), the blockchain application 406 advances the processing to step S1704.

Here, performing a confirmation that the credential information D 412 included in the editing module 411 is correct information is to prevent a result obtained by editing performed by an untrusted editing module from being registered with the blockchain apparatus 111. Registering a result obtained by editing performed by a trusted editing module with the blockchain apparatus 111 enables ensuring that the edited document has no tampering.

In step S1703, the blockchain application 406 determines the received type of processing. If it is determined that the received type of processing is transaction registration (REGISTRATION in step S1703), the blockchain application 406 advances the processing to step S1705, if it is determined that the received type of processing is transaction acquisition (ACQUISITION in step S1703), the blockchain application 406 advances the processing to step S1710, and, if it is determined that the received type of processing is document verification (VERIFICATION in step S1703), the blockchain application 406 advances the processing to step S1713.

In step S1704, the blockchain application 406 generates error information indicating that an access authority to the blockchain apparatus 111 is not satisfied in the present processing flowchart. In step S1705, the blockchain application 406 determines whether the transaction information received at the time of start-up of processing is complete.

Moreover, the blockchain application 406 searches the blockchain apparatus 111 to check whether the document hash value 602 is still not registered in the blockchain apparatus 111. Additionally, the blockchain application 406 searches the blockchain apparatus 111 to check whether the source document hash value 607 is currently registered in the blockchain apparatus 111. In a case where the document editing information 608 is present, the blockchain application 406 verifies the validity of the document editing information 608.

For example, the blockchain application 406 performs verification by verifying whether a signature associated with the credential information D 412 has been performed. Moreover, the blockchain application 406 also checks whether the document hash value 602 and the post-editing document hash value 619 match each other and whether the source document hash value 607 and the pre-editing document hash value 618 match each other, thus also verifying the validity of the editing operation. In a case where the transaction information is not complete or the hash values are not in the respective correct states, the transaction information is invalid information. In step S1706, the blockchain application 406 determines the result of checking in step S1705, and, if it is determined that the transaction information is valid (YES in step S1706), the blockchain application 406 advances the processing to step S1707, and, if it is determined that the transaction information is invalid information (NO in step S1706), the blockchain application 406 advances the processing to step S1709 for error processing.

In step S1707, the blockchain application 406 requests the blockchain apparatus 111 to register the checked transaction 601. In the present step, the blockchain application 406 receives success or failure as a result of the registration processing from the blockchain apparatus 111. In step S1708, the blockchain application 406 determines the result of the registration processing received from the blockchain apparatus 111, and, if it is determined that the result is failure (NO in step S1708), the blockchain application 406 advances the processing to step S1709 for error processing, and, if it is determined that the result is success (YES in step S1708), the blockchain application 406 advances the processing to step S1719.

In step S1709, the blockchain application 406 generates error information indicating that the transaction registration is not able to be performed in the present processing flowchart. In step S1710, the blockchain application 406 searches the blockchain apparatus 111 to acquire a transaction which holds the document identification number received at the time of start-up of processing. In step S1711, the blockchain application 406 determines a result of the searching, and, if it is determined that no transaction data has been acquired (NO in step S1711), since the target document is not registered with the blockchain apparatus 111, the blockchain application 406 advances the processing to step S1712 for error processing. If it is determined that transaction data has been acquired (YES in step S1711), the blockchain application 406 advances the processing to step S1719. In step S1712, the blockchain application 406 generates error information indicating that the transaction acquisition is failed in the present processing flowchart.

In step S1713, the blockchain application 406 searches the blockchain apparatus 111 to acquire a transaction which holds the hash value received at the time of start-up of processing as a document hash value. In step S1714, the blockchain application 406 determines a result of the searching, and, if it is determined that transaction data has been acquired (YES in step S1714), the blockchain application 406 determines that the received hash value is a valid hash value and advances the processing to step S1715, and, if it is determined that no transaction data has been acquired (NO in step S1714), the blockchain application 406 determines that the received hash value is an invalid hash value and advances the processing to step S1718 for error processing.

In step S1715, the blockchain application 406 determines whether the transaction acquired in step S1713 contains a source document hash value. If it is determined that the acquired transaction contains no source document hash value (NO in step S1715), since the hash value acquired in step S1713 indicates a leading document, the blockchain application 406 terminates verification processing and then advances the processing to step S1719. If it is determined that the acquired transaction contains a source document hash value (YES in step S1715), since it is necessary to check the presence of a source document corresponding to the source document hash value, the blockchain application 406 advances the processing to step S1716.

In step S1716, the blockchain application 406 designates document verification as the type of processing and a source document hash value as the information required for processing, and recursively executes the flowchart illustrated in FIG. 17. In step S1717, the blockchain application 406 determines a result of this verification, and, if it is determined that verification including that of a source document is successful (YES in step S1717), the blockchain application 406 advances the processing to step S1719. If it is determined that the verification is failed (NO in step S1717), the blockchain application 406 advances the processing to step S1718 for error processing. In step S1718, the blockchain application 406 generates error information indicating that the document verification is failed in the present processing flowchart.

In step S1719, as information obtained when processing is successful for each type of processing, the blockchain application 406 communicates, to processing serving as an invoker, a registration completion status in the case of transaction registration and a verification success status in the case of document verification. The blockchain application 406 communicates, to processing serving as an invoker, the acquired transaction information in the case of transaction acquisition and error information in the case of error processing being performed.

According to the present exemplary embodiment, causing editing processing on a document previously registered with a blockchain to be performed by only a trusted editing module enables preventing tampering caused by, for example, replacement of a document itself which is currently managed by the blockchain service. Additionally, causing editing processing for managing a strict document file to be performed by an image forming apparatus in a consolidated manner enables efficiently verifying the validity of the editing processing and, since the number of apparatuses which a system administrator ought to manage is reduced, enables reducing a load on management work.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-005256 filed Jan. 16, 2020, which is hereby incorporated by reference herein in its entirety.

What is claimed is:

1. An information processing apparatus which cooperates with a management service for receiving a document via a network and storing the document and a blockchain service for managing information about the document on a block-by-block basis, defining an association with a previous and/or subsequent block for each block, and then managing a plurality of blocks with a plurality of nodes, the information processing apparatus comprising:
at least one processor and at least one memory coupled to the at least one processor and having instructions stored thereon that, when executed by the at least one processor, cooperate to act as:
a provision unit configured to provide an editing screen for receiving an instruction for editing the source document, the editing screen being also used for receiving an instruction for using the blockchain service;
an editing unit configured to perform editing processing on a source document to generate a new document;
a transmission unit configured to transmit the generated document to the management service; and
a cooperation unit configured to register information indicating that the source document was edited with the blockchain service,
wherein, in response to the editing unit being confirmed to be a service trusted by the blockchain service, the information indicating that the source document was edited is registered with the blockchain service.

2. The information processing apparatus according to claim 1, wherein the source document is a document generated by scanning an original with a scanning unit included in the information processing apparatus.

3. The information processing apparatus according to claim 1, wherein, in a case where a user who operates the information processing apparatus has authority to register the generated document with the blockchain service, the provision unit provides the editing screen.

4. The information processing apparatus according to claim 3, wherein, in a case where a user who operates the information processing apparatus does not have authority to register the generated document with the blockchain service, the provision unit provides the editing screen in such a way as not to receive an instruction for using the blockchain service.

5. The information processing apparatus according to claim 1, wherein the editing unit confirms that the source document has not been tampered by calculating a hash value of the source document and checking whether the calculated hash value is currently registered with the blockchain service, and then generates information indicating that the source document was edited.

6. A control method for an information processing apparatus which cooperates with a management service for receiving a document via a network and storing the document and a blockchain service for managing information about the document on a block-by-block basis, defining an association with a previous and/or subsequent block for each block, and then managing a plurality of blocks with a plurality of nodes, the control method comprising:
providing an editing screen for receiving an instruction for editing the source document, the editing screen being also used for receiving an instruction for using the blockchain service;
performing editing processing on a source document to generate a new document;
transmitting the generated document to the management service; and
registering information indicating that the source document was edited with the blockchain service,
wherein, in response to the editing processing being confirmed to be a service trusted by the blockchain service, the information indicating that the source document was edited is registered with the blockchain service.

7. The control method according to claim 6, wherein the source document is a document generated by scanning an original with a scanning unit included in the information processing apparatus.

8. The control method according to claim 6, wherein, in a case where a user who operates the information processing apparatus has authority to register the generated document with the blockchain service, the editing screen is provided.

9. The control method according to claim 8, wherein, in a case where a user who operates the information processing apparatus does not have authority to register the generated document with the blockchain service, the editing screen is provided in such a way as not to receive an instruction for using the blockchain service.

10. The control method according to claim 6, further comprising confirming that the source document has not been tampered by calculating a hash value of the source document and checking whether the calculated hash value is currently registered with the blockchain service, and then generating information indicating that the source document was edited.

11. A non-transitory computer-readable storage medium storing computer-executable instructions that, when executed by a computer, cause the computer to perform a control method for an information processing apparatus which cooperates with a management service for receiving a document via a network and storing the document and a blockchain service for managing information about the document on a block-by-block basis, defining an association with a previous and/or subsequent block for each block, and then managing a plurality of blocks with a plurality of nodes, the control method comprising:

providing an editing screen for receiving an instruction for editing the source document, the editing screen being also used for receiving an instruction for using the blockchain service;

performing editing processing on a source document to generate a new document;

transmitting the generated document to the management service; and registering information indicating that the source document was edited with the blockchain service, wherein, in response to the editing processing being confirmed to be a service trusted by the blockchain service, the information indicating that the source document was edited is registered with the blockchain service.

* * * * *